United States Patent
Hasegawa et al.

(10) Patent No.: US 10,237,542 B2
(45) Date of Patent: Mar. 19, 2019

(54) STEREOSCOPIC IMAGE DISPLAY DEVICE, STEREOSCOPIC IMAGE DISPLAY METHOD, AND STEREOSCOPIC IMAGE DISPLAY PROGRAM

(71) Applicant: NLT TECHNOLOGIES, LTD., Kanagawa (JP)

(72) Inventors: Takefumi Hasegawa, Kanagawa (JP); Koji Shigemura, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 218 days.

(21) Appl. No.: 14/694,507

(22) Filed: Apr. 23, 2015

(65) Prior Publication Data
US 2015/0312546 A1 Oct. 29, 2015

(30) Foreign Application Priority Data
Apr. 24, 2014 (JP) .................................. 2014-089883

(51) Int. Cl.
*H04N 13/128* (2018.01)
*H04N 13/305* (2018.01)
(Continued)

(52) U.S. Cl.
CPC ......... *H04N 13/366* (2018.05); *H04N 13/305* (2018.05); *H04N 13/373* (2018.05); *H04N 13/398* (2018.05); *H04N 13/128* (2018.05)

(58) Field of Classification Search
None
See application file for complete search history.

(56) References Cited

U.S. PATENT DOCUMENTS

| 6,157,424 A | 12/2000 | Eichenlaub |
| 6,377,295 B1 * | 4/2002 | Woodgate .......... G02B 27/0093 348/59 |

(Continued)

FOREIGN PATENT DOCUMENTS

| CN | 102638695 A | 8/2012 |
| CN | 103595986 A | 2/2014 |

(Continued)

OTHER PUBLICATIONS

Communication dated Jan. 9, 2018 from the Japanese Patent Office in counterpart Japanese application No. 2014-089883.

(Continued)

*Primary Examiner* — William C Vaughn, Jr.
*Assistant Examiner* — Lindsay J Uhl
(74) *Attorney, Agent, or Firm* — Sughrue Mion, PLLC

(57) ABSTRACT

The stereoscopic image display device displaying a stereoscopic image by being placed on a movable object includes: a stereoscopic display panel module which projects images of different parallaxes for each of neighboring spatial regions; a movable object state detecting module which detects state information regarding a position state of the movable object; an observing distance calculation module which calculates a relative distance between the stereoscopic display panel module and a specific observer located on a display surface side thereof based on the state information; a device characteristic data saving module which saves device characteristic data regarding the stereoscopic display panel module; and a display setting adjusting module which adjusts display setting of the stereoscopic image by referring to the relative distance and the device characteristic data.

14 Claims, 69 Drawing Sheets

(51) Int. Cl.
*H04N 13/366* (2018.01)
*H04N 13/373* (2018.01)
*H04N 13/398* (2018.01)

(56) References Cited

U.S. PATENT DOCUMENTS

| | | | | |
|---|---|---|---|---|
| 2005/0200183 | A1* | 9/2005 | Morinet | B60N 2/0248 |
| | | | | 297/354.1 |
| 2010/0045088 | A1* | 2/2010 | Kunou | A47C 7/62 |
| | | | | 297/354.1 |
| 2010/0087951 | A1* | 4/2010 | Mimura | B60R 11/0229 |
| | | | | 700/213 |
| 2011/0228180 | A1* | 9/2011 | Lo | H04N 13/315 |
| | | | | 349/15 |
| 2012/0206444 | A1* | 8/2012 | Takahashi | H04N 13/0022 |
| | | | | 345/419 |
| 2013/0181892 | A1* | 7/2013 | Liimatainen | G06F 3/011 |
| | | | | 345/156 |
| 2013/0208099 | A1* | 8/2013 | Ohmi | H04N 13/0409 |
| | | | | 348/54 |
| 2014/0036046 | A1* | 2/2014 | Hasegawa | H04N 13/0409 |
| | | | | 348/54 |
| 2014/0036174 | A1* | 2/2014 | Oka | G02B 27/2214 |
| | | | | 349/15 |
| 2015/0138044 | A1* | 5/2015 | Rawlinson | G06F 3/1454 |
| | | | | 345/2.2 |
| 2015/0314682 | A1* | 11/2015 | Enriquez Ortiz | B60K 35/00 |
| | | | | 701/49 |

FOREIGN PATENT DOCUMENTS

| | | |
|---|---|---|
| JP | 07-056171 A | 3/1995 |
| JP | 2000-152285 A | 5/2000 |
| JP | 2001-028767 A | 1/2001 |
| JP | 2005332218 A | 12/2005 |
| JP | 2006-516753 A | 7/2006 |
| JP | 2008-15188 A | 1/2008 |
| JP | 2008209916 A | 9/2008 |
| JP | 2008-279155 A | 11/2008 |
| JP | 2009-75842 A | 4/2009 |
| JP | 2010-285118 A | 12/2010 |
| JP | 2010285118 A * | 12/2010 |
| JP | 2010285118 A * | 12/2010 |
| JP | 2012044308 A | 3/2012 |
| JP | 2012-170502 A | 9/2012 |
| JP | 2013121031 A | 6/2013 |
| JP | 2014-032246 A | 2/2014 |
| JP | 2014-44396 A | 3/2014 |
| JP | 2014-45473 A | 3/2014 |
| JP | 2014-45474 A | 3/2014 |
| WO | 2012/023509 A1 | 2/2012 |

OTHER PUBLICATIONS

Notification of the First Office Action, dated Nov. 30, 2017, in corresponding Chinese Application No. 201510202519.2, 26 pages in Chinese and English.

Communication dated Sep. 4, 2018 from the Japanese Patent Office in counterpart Application No. 2014-089883.

Ju et al., "Viewer's Eye Position Estimation using Single Camera", LG Display Co., Ltd., Deogeun-ri, Wollong-Myeon, Paju-si, Gyeonggi-do, Korea, SID Digest, 2013, pp. 671-674.

Notification of Reasons for Refusal, dated Jan. 8, 2019, issued in corresponding JP Application No. 2018-043738, 11 pages in English and Japanese.

* cited by examiner

FIG. 28

[CLASSIFIED TABLE I OF DISPLAY SETTING ADJUSTING METHODS ACCORDING TO DIFFERENCE IN OPTICAL SEPARATION CHARACTERISTICS OF STEREOSCOPIC DISPLAY PANEL MODULES]

| | OPTICAL SEPARATION CHARACTERISTIC IS DYNAMICALLY CHANGEABLE (ACTIVE ELEMENT) | OPTICAL SEPARATION CHARACTERISTIC IS STATIC AND UNCHANGEABLE (STATIC ELEMENT) |
|---|---|---|
| ADJUSTING METHOD BY CHANGING OPTIMAL VISIBLE DISTANCE OD | ○ | × |
| ADJUSTING METHOD BY CHANGING PARALLAX VALUES OF IMAGE DATA | ○ | ○ |

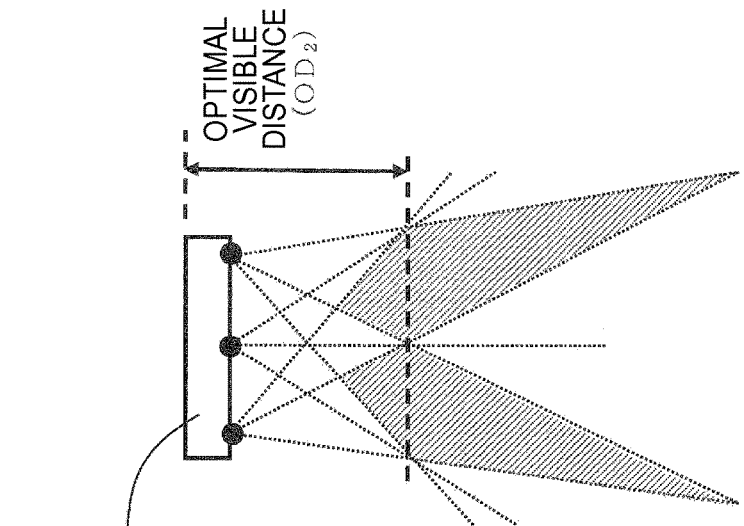
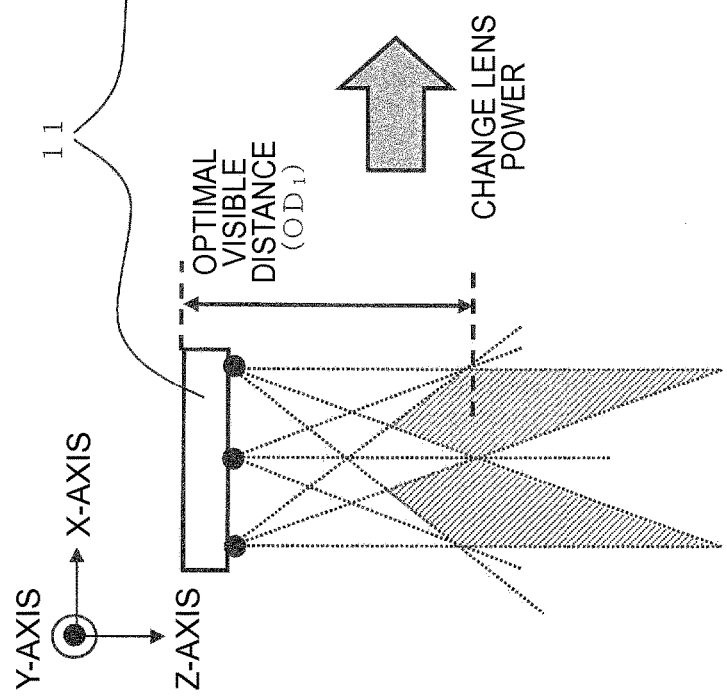

FIG. 35A
FIG. 35B
CHANGE IN OBSERVING DISTANCE DUE TO INCLINATION OF FRONT SEAT
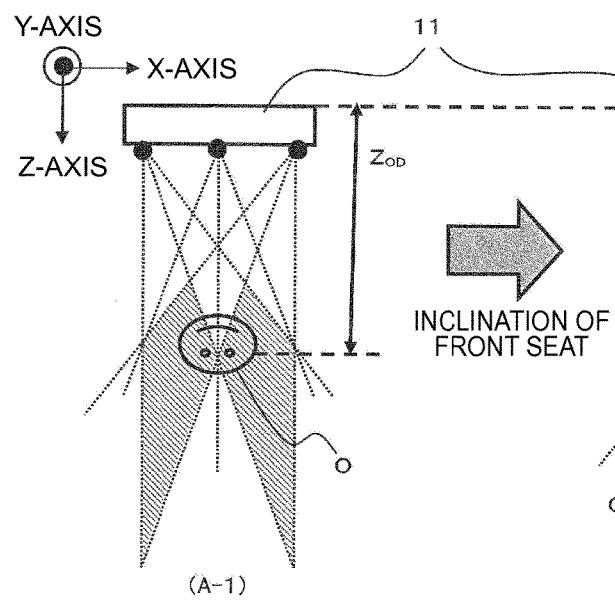
INCLINATION OF FRONT SEAT
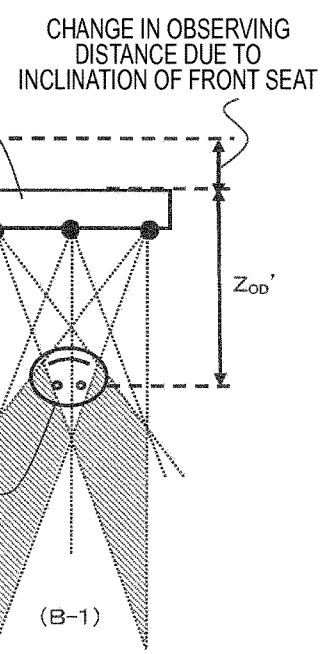
(A-1)
(B-1)
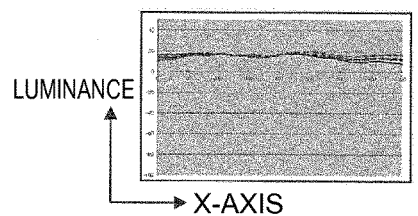
LUMINANCE → X-AXIS
(A-2)
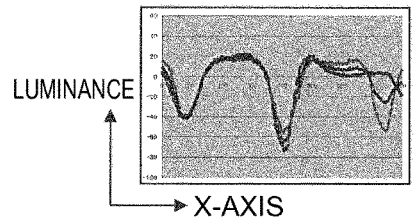
LUMINANCE → X-AXIS
(B-2)
DISPLAY SURFACE OF STEREOSCOPIC DISPLAY PANEL MODULE 120
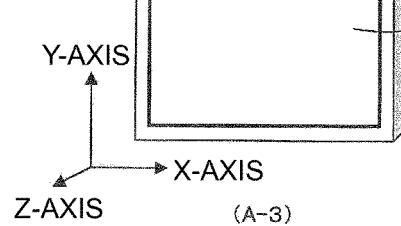
(A-3)
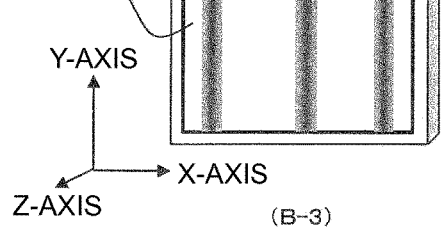
(B-3)

FIG. 36

[CLASSIFIED TABLE II OF DISPLAY SETTING ADJUSTING METHODS ACCORDING TO DIFFERENCE IN OPTICAL SEPARATION CHARACTERISTICS OF STEREOSCOPIC DISPLAY PANEL MODULES]

| | OPTICAL SEPARATION CHARACTERISTIC IS DYNAMICALLY CHANGEABLE (ACTIVE ELEMENT) | OPTICAL SEPARATION CHARACTERISTIC IS STATIC AND UNCHANGEABLE (STATIC ELEMENT) |
|---|---|---|
| ADJUSTING METHOD BY CHANGING OPTIMAL VISIBLE DISTANCE OD | ○ | × |
| ADJUSTING METHOD BY CHANGING LUMINANCE VALUES OF IMAGE DATA | ○ | ○ |

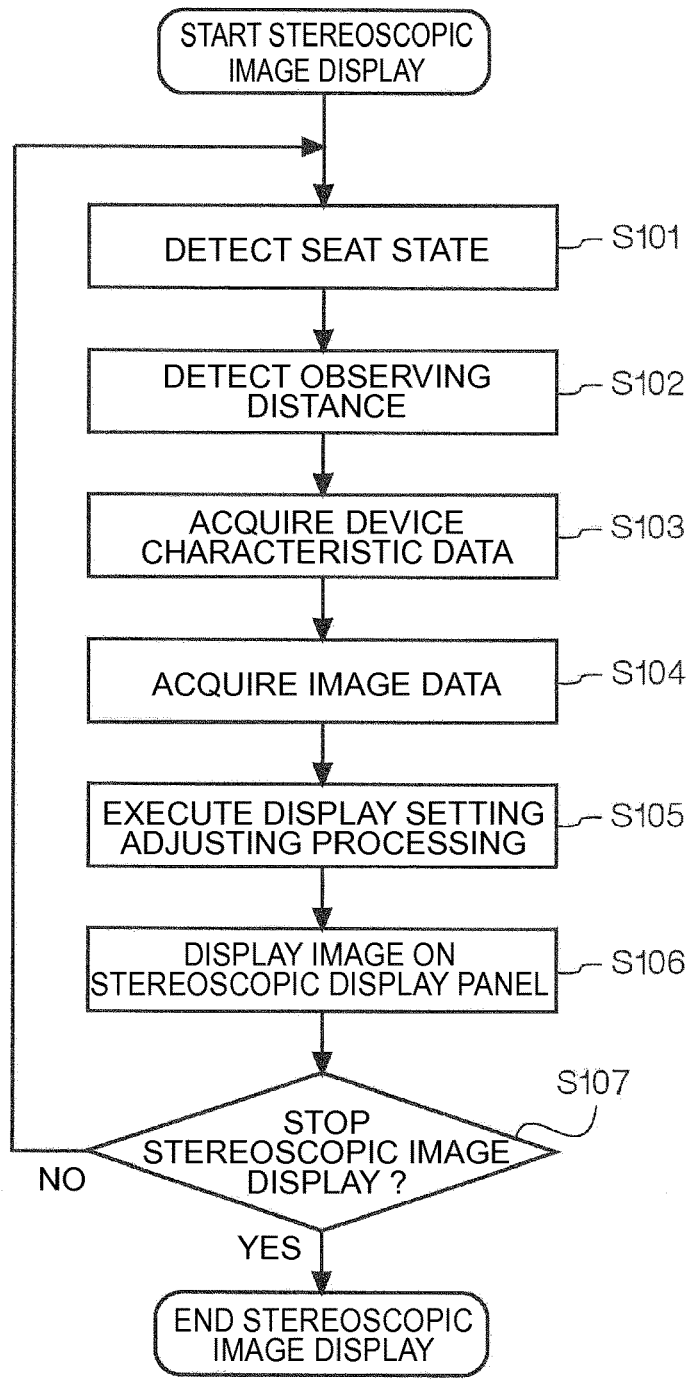

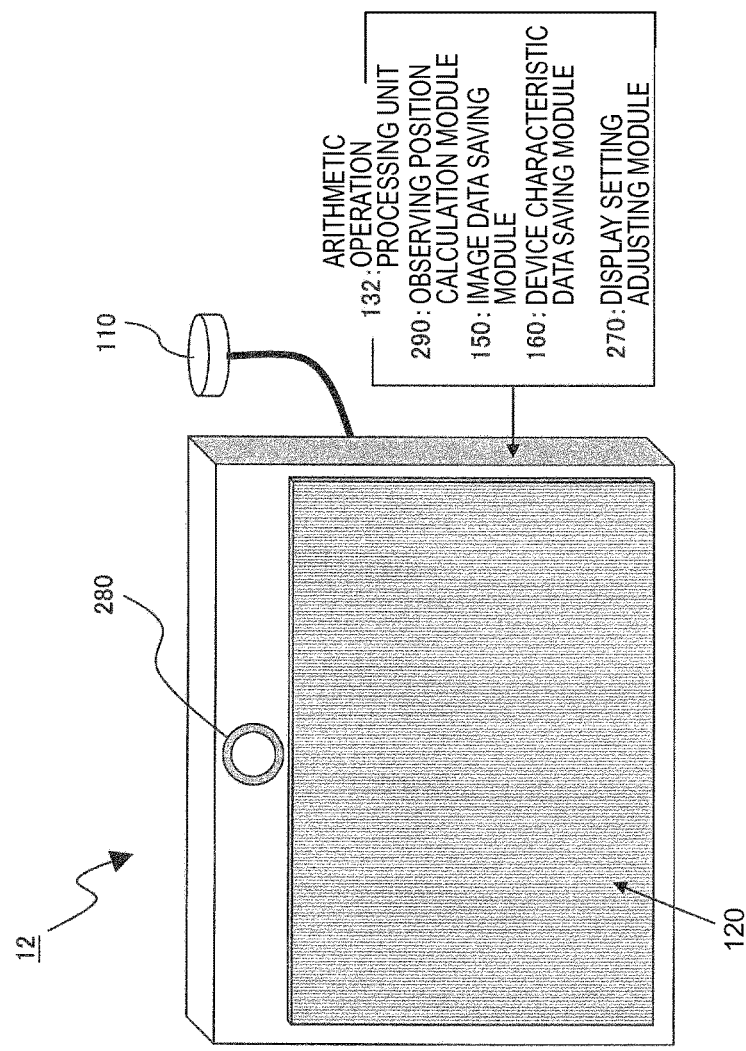

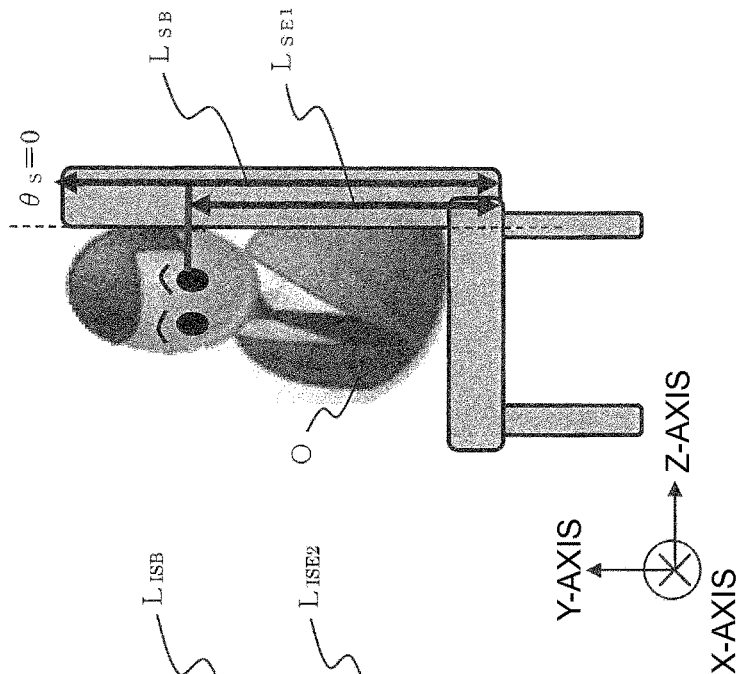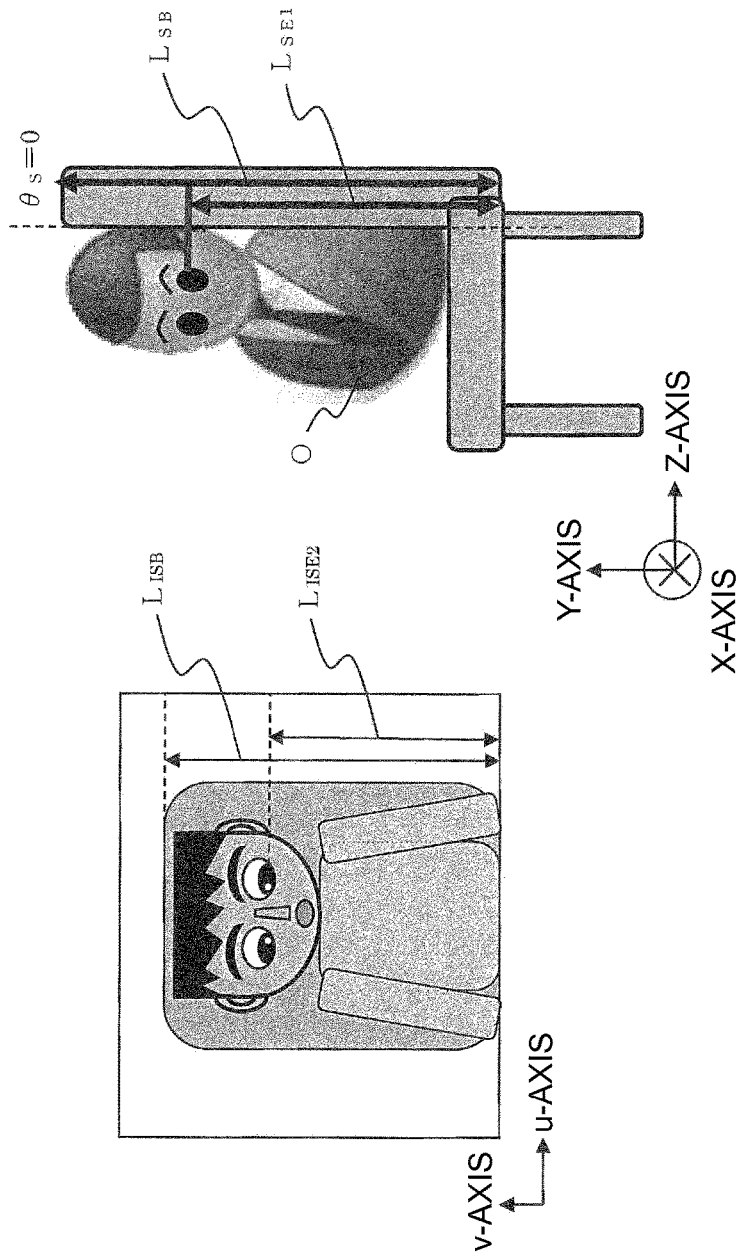
FIG. 41A
FIG. 41B

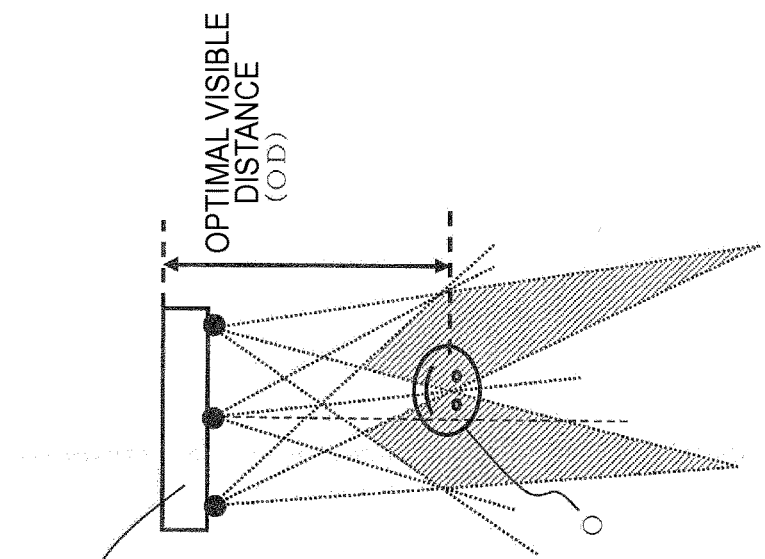
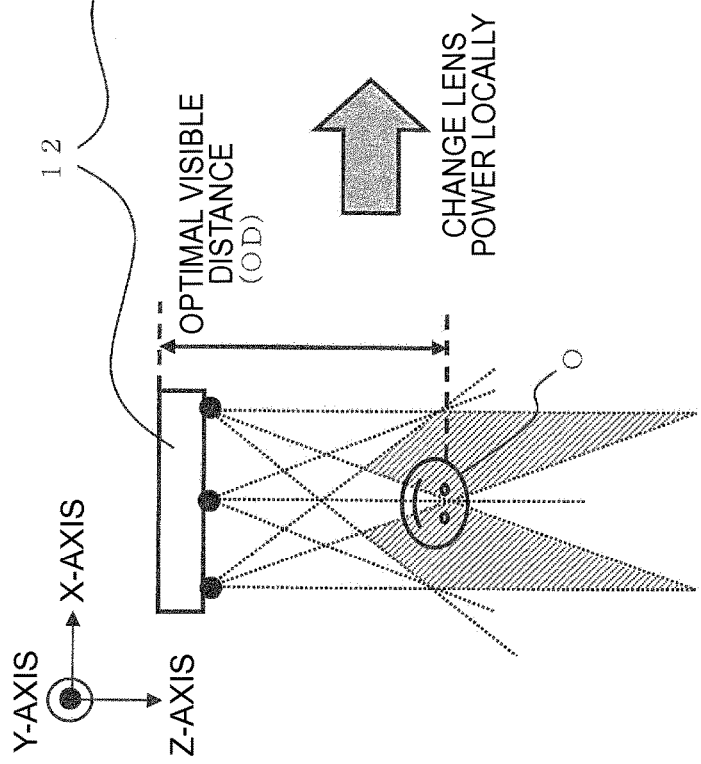

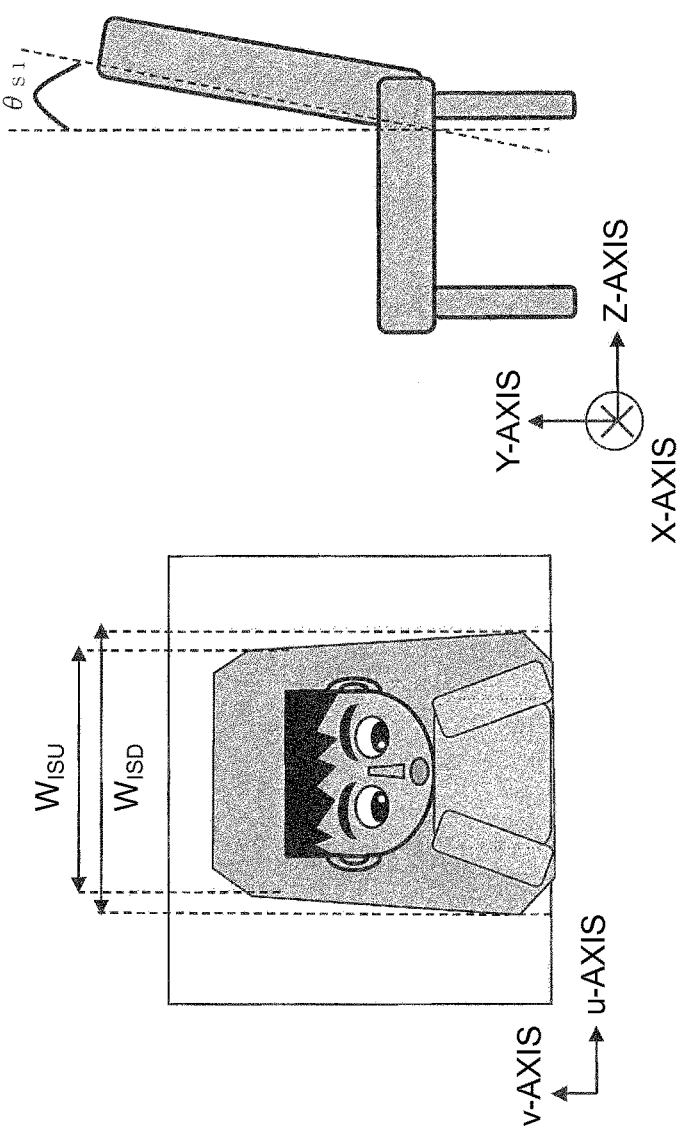

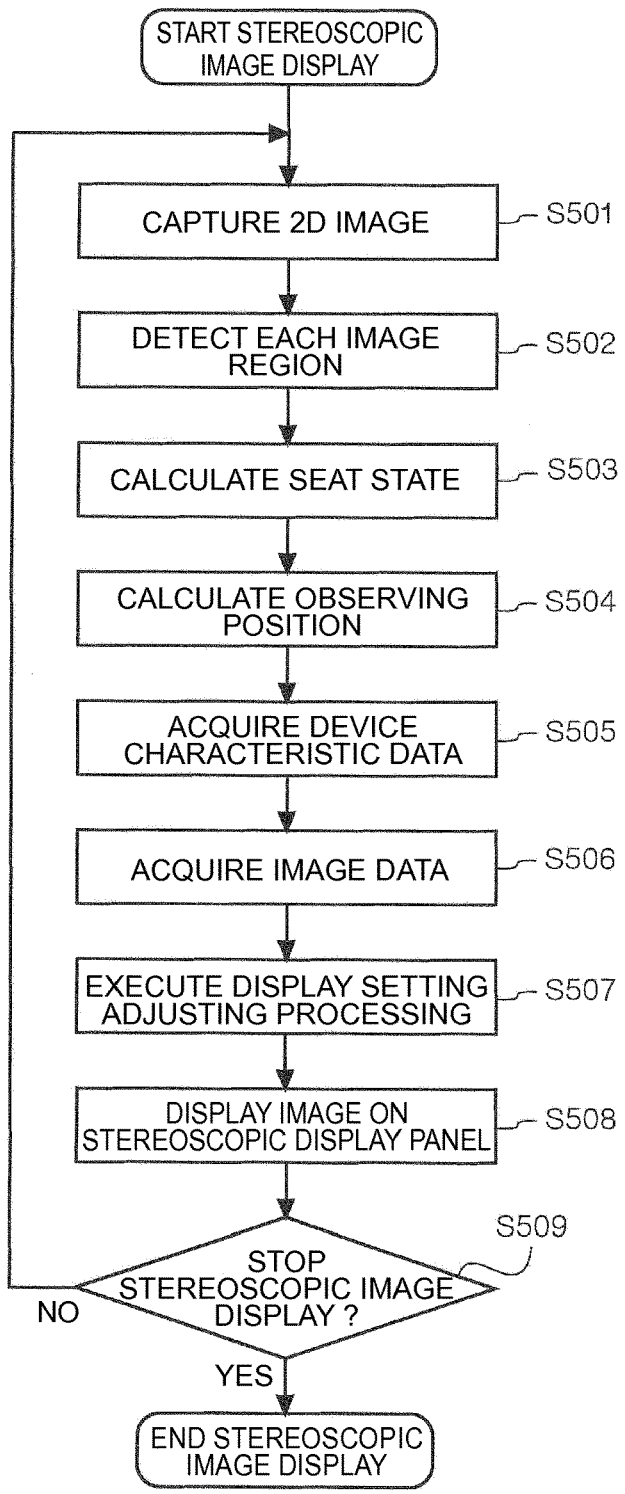

STEREOSCOPIC IMAGE DISPLAY DEVICE, STEREOSCOPIC IMAGE DISPLAY METHOD, AND STEREOSCOPIC IMAGE DISPLAY PROGRAM

CROSS-REFERENCE TO RELATED APPLICATION

This application is based upon and claims the benefit of priority from Japanese patent application No. 2014-089883, filed on Apr. 24, 2014, the disclosure of which is incorporated herein in its entirety by reference.

BACKGROUND OF THE INVENTION

1. Field of the Invention

The present invention relates to a stereoscopic image display technique. More specifically, the present invention relates to a stereoscopic image display device, a stereoscopic image display method, and a stereoscopic image display program for displaying stereoscopic images without giving a sense of discomfort to the observer even when the relative distance between the stereoscopic image display device placed on a back face part of a seat and the observer changes.

2. Description of the Related Art

Recently, small and middle sized displays are placed on each of the back face parts of passengers' seats of airplanes and long-distance trains, so that each passenger can view favorite program contents by using the display provided on the back face part of the respective front seat.

There are many stereoscopic image display contents contained in the program contents for the passengers, typically movie films. Thus, it is desired to be able to display stereoscopic images on the displays placed on the back face part of the seats.

Note here that there are an eyeglass type and a naked-eye type as the stereoscopic image display devices having a display for displaying stereoscopic images.

With the eyeglass type stereoscopic image display device, the observer wears eyeglasses for stereoscopic image display and images of different parallaxes are projected to the left and right eyes to display stereoscopic images for the observer. However, there are many observers who feel a sense of discomfort to wear the eyeglasses for stereoscopic image display, and the naked-eye type stereoscopic image display device which does not requires such eyeglasses is more desired.

With the naked-eye type stereoscopic image display device, it is typical to use a method which projects images of different parallaxes to the left and right eyes of the observer through dividing a spatial region for projecting a stereoscopic image and projecting images of different parallaxes to each of the divided spatial regions.

With such method, employed is a technique which provides a lenticular lens, a parallax barrier, or the like as an optical light-ray separating module to the stereoscopic display panel of the stereoscopic image display device to separate the image to be projected for each spatial region so as to project images of different parallaxes to each of a plurality of the spatial regions.

The stereoscopic image display device provided with the optical light-ray separating module such as a lenticular lens or a parallax barrier does not require the eyeglasses for stereoscopic image display, so that it is excellent in respect that the user feels no sense of having a trouble.

However, the spatial region where the observer can visually recognize a stereoscopic image properly (a normal stereopsis viewable region) is limited to a case where the position of the left eye of the observer is within a spatial region to which a left-eye image is projected and the position of the right eye of the observer is within a spatial region to which a right-eye image is projected.

When the position of the left and right eyes of the observer is shifted out from the normal stereopsis viewable region, the left-eye image and the right-eye image may be viewed in an overlapped manner (a double image (CT-image) caused by the so-called 3D crosstalk) and a stereoscopic image of reversed sense of depth may be viewed (the so-called pseudoscopic view).

Other than those, another issue known to be generated with the naked-eye type stereoscopic image display device is that luminance unevenness (luminance fluctuation) occurs on the surface of the stereoscopic display panel when the observing position of the observer is shifted out from the normal stereopsis viewable region and an image region that is displayed still darker than the peripheral image region appears within the stereoscopic image.

This phenomenon is called 3D moiré, which is caused when a non-display region (a light-shielding part generally called a black matrix in a liquid crystal panel) between pixels for each of the viewpoints is visually recognized by being interfered with the optical light-separating module such as the lenticular lens or the parallax barrier. That is, 3D moiré is periodical luminance unevenness (may sometimes indicate color unevenness) caused by projecting different images to different angular directions.

3D moiré is the fluctuation in the angular direction of the luminance (luminance angular fluctuation), which may not be an issue depending on the observing positions. However, when the luminance angular fluctuation in the angular direction is large, the display quality of the stereoscopic image is deteriorated so that the observer feels a sense of discomfort.

The issues of CT-images and pseudoscopic view caused by 3D crosstalk and the issues of 3D moiré (referred to as "each issue in 3D display" hereinafter) which are peculiar to the naked-eye type stereoscopic image display device depend on the relative distance between the stereoscopic image display device and the observer.

Further, there may be cases where the backrest in the back face part of the passenger's seat may be inclined due to the convenience of the passenger of the front seat in an airplane, a train, or the like. Accordingly, the stereoscopic image display device placed on the back face part is moved.

Thus, in a case where the stereoscopic image display device is placed on the back face part of a seat, the relative distance (observing distance) between the stereoscopic image display device and the observer is changed rapidly due to the convenience of the passenger of the front seat even when the observer does not move. Thereby, each of the issues of the 3D display occurs, so that the display quality of the stereoscopic images is deteriorated greatly. This deterioration in the display quality gives a sense of discomfort to the observer, so that there is a strong demand for a stereoscopic image display device with which each of the issues of the 3D display does not occur even when the observing distance changes.

As a technique for lightening the influences of each of the issues of the 3D display, there is considered a structural content in which: the observing distance showing the relative distance between the stereoscopic image display device and the observer and the observing position showing the relative position of the observer with respect to the stereoscopic image display device are calculated by measuring the position of the observer; and the display setting of the stereoscopic image is adjusted according the information regarding the calculated observing distance or observing position. When such structure is employed, a device for measuring the position of the observer is required since the observing distance information or the observing position information is used.

Especially, in order to lighten the influences of the CT-images as well as pseudoscopic views caused by the crosstalk and the influences of the 3D moiré more effectively, it is necessary to measure the observing distance showing the depth-direction distance between the observer and the stereoscopic image display device. As the device for measuring the observing distance, there is known a measuring device (a three-dimensional position measuring device) which is capable of measuring the position on the three-dimensional space by measuring the depth-direction distance.

Recently, the prices of such three-dimensional position measuring devices have been lowered. However, compared to USB cameras (small camera modules of mobile apparatuses) capable of capturing the position of the observer as captured image data on a two-dimensional plane, tilt sensors for measuring the inclined state of a seat, etc., the measuring devices are still expensive.

That is, to provide such expensive measuring device to the stereoscopic image display device leads to an increase in the entire device cost, which is a cause for hindering popularization of the stereoscopic image display devices placed on the back face parts of the seats.

As the techniques related to overcoming such issues, following contents (Patent Documents 1 to 9) are known, for example.

Japanese Unexamined Patent Publication 2009-75842 (Patent Document 1) discloses a technique which calculates the observing position including the observing distance from the state of the seat of the observer and the captured images acquired by an in-vehicle camera attached to a back mirror for correcting distortions generated by image tailing generated when the display surface is observed from oblique directions.

WO 2012-023509 (Patent Document 2) discloses a technique which, in a calibration system for adjusting the position and posture of a display according to the position of the observer, calculates the relative position of the observer with respect to the display by measuring an infrared ray emitted from the display by an infrared camera placed at the position of the observer.

Japanese Unexamined Patent Publication 2000-152285 (Patent Document 3) discloses an image processing technique which measures the position of the observer from captured image data picked up by a camera for displaying stereoscopic images without giving a sense of discomfort even when the observer moves. Further, as a processing method of this technique, there is also depicted a method of adjusting the focal distance of the camera for capturing a face image within an arbitrary image range other than the image processing method which measures the position of the observer from the captured image data on a two-dimensional plane.

Japanese Unexamined Patent Publication 2012-170502 (Patent Document 4) discloses a technique which informs the observer to move to a spatial region where stereoscopic images can be visually recognized when the position of the observer is shifted out from the spatial region where the stereoscopic images can be visually recognized properly.

At the stereoscopic image display device according to Japanese Unexamined Patent Publication 2008-15188 (Patent Document 5), a tilt sensor such as an acceleration sensor is placed in order to provide the stereoscopic images without giving a sense of discomfort even when the observer moves. That is, disclosed is a technical content in which the tilt of the stereoscopic image display device is detected by the tilt sensor and the observing position is measured.

Japanese Unexamined Patent Publication 2008-279155 (Patent Document 6) discloses a technique which adjusts the placed angle of the display surface by considering the tilt angle between the seat of the observer and the front seat in order to align the display direction of the display surface and the direction of the sight of the observer even when the display direction of the display surface placed at the back face part of the front seat changes due to the change in the reclining state of the passenger at the front seat.

The stereoscopic image display devices according to Japanese Unexamined Patent Publication 2014-45474 (Patent Document 7), Japanese Unexamined Patent Publication 2014-45473 (Patent Document 8), and Japanese Unexamined Patent Publication 2014-44396 (Patent Document 9) employ a technique which lightens the influences of CT-image as well as pseudoscopic views caused by the crosstalk and the influences of the 3D moiré to display stereoscopic images without giving a sense of discomfort through performing image conversion processing on the right-eye image and the left-eye image in accordance with the position of the observer even when the position of the observer is shifted.

Further, S-H. Ju, et al, "Viewer's Eye Position Estimation Using Camera" 2013 International Symposium Digest of Technical Papers, 48.3, pp 671-674 (Non-Patent Document 1) discloses a technique which, for measuring the observing position only with an inexpensive measuring device, registers in advance the actual distance between the pupils of the observer, and compares the distance between the pupils of the observer shown in the captured image data on a two-dimensional plane captured by a USB camera or the like with the distance between the pupils of the observer registered in advance to calculate the observing distance that shows the distance in the depth direction between the stereoscopic image display device and the observer.

However, the observing position calculating method depicted in Patent Document 1 is a technique used on the assumption that the set positions of the in-vehicle camera and the display are fixed, so that it cannot be employed in a case where the set position of the display moves depending on the convenience of the passenger at the front seat (e.g., in a case where the display placed at the back face part of the seat is used).

Further, with the technique disclosed in Patent Document 2, it is necessary to place an infrared camera at the position of the observer. Thus, it is difficult to place the measuring device, and the device cost is increased.

Incidentally, in order to lighten the influences of the CT-images as well as pseudoscopic views caused by the crosstalk and the influences of the 3D moiré more effectively, it is necessary to measure the observing distance showing the depth-direction distance between the observer and the stereoscopic image display device. However, in Patent Document 3, there is no method disclosed for measuring the distance in the depth direction between the stereoscopic image display device and the observer from the captured face image. Therefore, it is not possible to display fine stereoscopic images without giving a sense of discomfort even if the technique disclosed in Patent Document 3 is employed.

With the technique disclosed in Patent Document 4, a distance sensor is used for measuring the observing distance. Thus, the cost for the measuring device is increased.

Further, while the technique for detecting the tilt angle of the stereoscopic image display device by using the tilt sensor is depicted in Patent Document 5, there is no method disclosed for measuring the observing distance by using the inclining angles of the seat of the observer and the seat in front thereof. Therefore, even with the use of the technique disclosed in Patent Document 5, it is not possible to measure the relative distance between the stereoscopic image display device placed at the back face part of the seat and the observer only with an inexpensive measuring device.

The technique disclosed in Patent Document 6 employs the method which calculates the relative angle between the display direction of the display surface and the direction of the eyesight of the observer from the inclined angle between the seat of the observer and the front seat. However, there is no content disclosed regarding calculation of the distance in the depth direction between the display surface and the observer.

Unlike the case of a normal image display device (a display which displays two-dimensional images), the display quality is greatly deteriorated in a naked-eye type stereoscopic image display device due to the influences of CT-images as well as pseudoscopic views caused by the crosstalk and the influences of the 3D moiré not only in the case where the relative angle changes but also in the case where the observing distance changes. Thus, even with the use of the method disclosed in Patent Document 6, it is not possible to lighten the influences of CT-images and pseudoscopic views caused by the 3D crosstalk and the influences of the 3D moiré, which are peculiar to the naked-eye type stereoscopic image display device.

The techniques disclosed in Patent Documents 7 to 9 do not employ the structure in which the inclined angle between the seat of the observer and the front seat is used when measuring the observing position showing the relative distance between the stereoscopic image display device and the observer. Thus, even if such techniques are employed in a state where the stereoscopic image display device is placed at the back face part of the seat, the observing distance cannot be measured only by the use of an inexpensive measuring device.

Further, while it is possible with the technique depicted in Non-Patent Document 1 to measure the observing distance only by the use of an inexpensive measuring device, it is necessary to register in advance the distance between the pupils of the observer to the stereoscopic image display device prior to the measurement. Therefore, in a case where the technique is employed for highly public stereoscopic image display devices used by a great number of observers, it is necessary to register the distance between the pupils every time the observer changes, which makes the processing complicated. That is, when the technique in which no method for easily registering the distance between the pupils of a great number of observers is not disclosed at all is applied to highly public stereoscopic image display devices and the like, the advantages thereof cannot be brought out.

It is therefore an exemplary object of the present invention to overcome the above-described issues and, more specifically, to effectively lighten the influences of CT-image as well as pseudoscopic views caused by the crosstalk and the influences of the 3D moiré by an inexpensive structure so as to provide a stereoscopic image display device which displays significant stereoscopic images without giving a sense of discomfort to observers, a display method thereof, and a display program thereof.

SUMMARY OF THE INVENTION

In order to achieve the foregoing object, the stereoscopic image display device according to an exemplary aspect of the invention is a stereoscopic image display device which displays a stereoscopic image by being placed on a movable object, which includes: a stereoscopic display panel module which projects images of different parallaxes for each of neighboring spatial regions; a movable object state detecting module which detects state information regarding a position state of the movable object; a relative distance calculation module which calculates a relative distance between the stereoscopic display panel module and a specific observer located on a display surface side thereof based on the state information; a device characteristic data saving module which saves device characteristic data regarding the stereoscopic display panel module; and a display setting adjusting module which adjusts display setting of the stereoscopic image by referring to the relative distance and the device characteristic data.

Further, the stereoscopic image display method according to another exemplary aspect of the invention is a stereoscopic image display method applied to a stereoscopic image display device which includes a stereoscopic display panel module for projecting images of different parallaxes for each of neighboring spatial regions and displays a stereoscopic image by being placed on a movable object, and the method includes: a movable object state detecting step which detects state information regarding a position state of the movable object; a relative distance calculating step which calculates a relative distance between the stereoscopic display panel module and a specific observer located on a display surface side thereof based on the state information; a device characteristic data receiving step which receives device characteristic data regarding the stereoscopic display panel module; a display setting adjusting step which adjusts display setting of the stereoscopic image by referring to the relative distance and the device characteristic data; and a stereoscopic image display step which displays the stereoscopic image by projecting the images of the different parallaxes for each of the spatial regions based on the display setting after being adjusted.

Furthermore, the stereoscopic image display program according to still another exemplary aspect of the invention is a stereoscopic image display program applied to a stereoscopic image display device which includes a stereoscopic display panel module for projecting images of different parallaxes for each of neighboring spatial regions and displays a stereoscopic image by being placed on a movable object, and the program causes a computer provided in advance within the stereoscopic image display device to execute: a movable object state detecting function which detects state information regarding a position state of the movable object; a relative distance calculating function which calculates a relative distance between the stereoscopic display panel module and a specific observer located on a display surface side thereof based on the state information; a device characteristic data receiving function which receives device characteristic data regarding the stereoscopic display panel module; a display setting adjusting function which adjusts display setting of the stereoscopic image by referring to the relative distance and the device characteristic data; and a stereoscopic image display function which displays the stereoscopic image by projecting the images of the different parallaxes for each of the spatial regions based on the display setting after being adjusted.

As described above, the present invention employs the structure which calculates the distance (the observing distance) in the depth direction between the stereoscopic image display device placed at the back face part of the seat and the observer by using only an inexpensive measuring device, and the display setting of the stereoscopic image is adjusted according to the observing distance. Thus, in particular, it becomes possible to effectively lighten the influences of CT-image as well as pseudoscopic views caused by the 3D crosstalk and the influences of the 3D moiré by an inexpensive structure so as to provide a stereoscopic image display device which displays significant stereoscopic images without giving a sense of discomfort to observers, a display method thereof, and a display program thereof.

BRIEF DESCRIPTION OF THE DRAWINGS

FIG. 4 is a schematic view showing an example of an optical model formed by the stereoscopic display panel module in a structure to which a lenticular lens is employed to the stereoscopic display panel module shown in FIG. 1 and the like;

FIG. 5 is a schematic view showing an example of an optical model formed by the stereoscopic display panel module in a structure to which a parallax barrier is employed to the stereoscopic display panel module shown in FIG. 1 and the like;

FIGS. 12A and 12B show schematic charts of a state where the stereoscopic image display device disclosed in FIG. 1 and the like is moved due to inclination of the front seat, in which FIG. 12A shows a positional relation of a case where the position of the observer is within a stereoscopic viewing space and FIG. 12B shows a positional relation of a case where the position of the observer is out of the normal vision region;

FIGS. 14A and 14B show explanatory charts of inclined angle calculation processing done by the tilt sensor shown in FIG. 13, in which FIG. 14A shows a case where the gravity acceleration direction and the $Y_A$ axis direction of the acceleration coordinate system are equivalent and FIG. 14B shows a case where the gravity acceleration direction and the $Y_A$ axis direction of the acceleration coordinate system are inequivalent;

FIGS. 17A and 17B show external views of a seat to which a gear rotation detecting sensor is placed, in which FIG. 17A shows a case of $\theta_{S1}$ and FIG. 17B shows a case of $\theta_{S2}$ that is larger than $\theta_{S1}$ regarding inclined angle of the backrest of the seat;

FIGS. 19A and 19B are schematic views showing a joint relation between the stereoscopic image display device of FIG. 1 and the like and the back face part of the seat, in which FIG. 19A is an external view when the back face part of the seat is viewed from the rear side of the seat and FIG. 19B is an external view when the back face part of the seat is viewed from the lateral direction of the seat;

FIG. 21 is an explanatory chart showing a 3D-crosstalk viewing space corresponding to a threshold value set to be relatively high out of an optical model chart formed by the stereoscopic display panel module that is provided to the stereoscopic image display device shown in FIG. 1 and the like;

FIG. 22 is an explanatory chart showing a 3D-crosstalk viewing space corresponding to a threshold value set to be relatively low out of an optical model chart formed by the stereoscopic display panel module that is provided to the stereoscopic image display device shown in FIG. 1 and the like;

FIGS. 23A-23D show changes in the optical models caused due to the individual differences in the stereoscopic image display panel modules provided to the stereoscopic image display device of FIG. 1 and the like, in which FIG. 23A is a case where the light-ray direction at the center position of the stereoscopic image display panel module is the front-face direction, FIG. 23B is a case where the light-ray direction is tilted by about an allowable value $-\Delta\theta_{LIM}$ of a manufacture margin of error, FIG. 23C is a case where the light-ray direction is tilted by about an allowable value $\Delta\theta_{LIM}$ of a manufacture margin of error in the opposite direction, and FIG. 23D is a view in which the optical models of FIGS. 23A, 23B, and 23C are superimposed;

FIG. 24 is view showing a sample of image data saved in an image data saving module included in the stereoscopic image display device of FIG. 1 and the like;

FIG. 28 is a classified table corresponding to 3D crosstalk and pseudoscopic views regarding display setting adjusting methods used according to the differences in the optical separation characteristic of the stereoscopic display panel modules;

FIGS. 31A and 31B are explanatory charts showing changes in the optimal visible distance caused by changes in the refractive index of the liquid crystal lens;

FIGS. 35A and 35B are explanatory charts showing appearance of 3D moiré caused by inclination of the backrest of the front seat;

FIG. 36 is a classified table corresponding to 3D moiré regarding a display setting adjusting method depending on the differences in the optical separation characteristic of the stereoscopic display panel modules;

FIG. 37 is a flowchart of image processing actions done by the stereoscopic image display device disclosed in FIG. 1 and the like;

FIG. 39 is an external view of the stereoscopic image display device disclosed in FIG. 38;

FIGS. 41A and 41B are relational views showing captured image data picked up in the same manner as the case of FIGS. 40A and 40B and the seat state;

FIGS. 51A and 51B are charts showing positional changes of a stereoscopic viewing space caused by changes in the refractive index of the liquid crystal lens;

FIG. 57 is a flowchart of image processing actions done by the stereoscopic image display device disclosed in FIG. 38 and the like;

FIGS. 67A and 67B are relational charts regarding the captured image data picked up by the imaging module and inclination of the backrest part of the seat;

FIG. 69 is a flowchart regarding stereoscopic image display processing done by the stereoscopic image display device disclosed in FIG. 65.

DETAILED DESCRIPTION OF THE PREFERRED EMBODIMENTS

Figure 1:
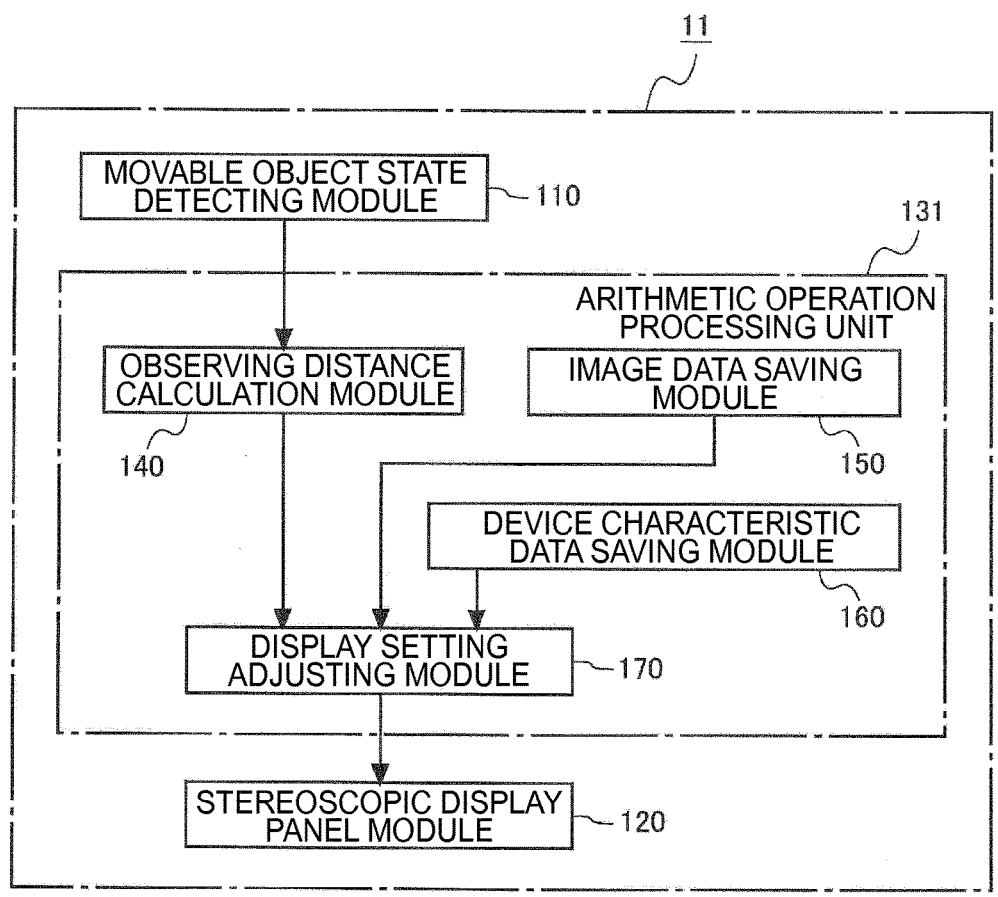
FIG. 1 is a block diagram showing a stereoscopic image display device according to a first exemplary embodiment of the present invention.

Hereinafter, modes for embodying the present invention (referred to as "exemplary embodiments" hereinafter) will be described by referring to accompanying drawings.
(First Exemplary Embodiment)

A first exemplary embodiment of a stereoscopic image display device according to the present invention will be described by referring to FIG. 1 to FIG. 37. While addition, modification, and the like may be applied as appropriate to each of structural members of the stereoscopic image display device according to the first exemplary embodiment in each of following explanations, a common reference numeral "11" is used as a general term for the stereoscopic display device including those.
(Entire Structure)

As shown in FIG. 1, the stereoscopic image display device 11 according to the first exemplary embodiment includes: a movable object state detecting module 110 which detects the state (positional state) of a movable object; a stereoscopic display panel module 120 which projects images of different parallaxes for each of neighboring spatial regions; and a arithmetic operation processing unit 131 which performs arithmetic operation processing regarding various kinds of information.

The arithmetic operation processing unit 131 includes: an observing distance calculation module (a relative distance calculation module) 140 which calculates an observing distance showing a relative distance between the stereoscopic display panel module 120 and a specific observer located on the display surface side thereof based on state information that is a result of detection done by the movable object state detecting module 110; an image data saving module 150 which saves or receives image data; a device characteristic data saving module 160 which saves device characteristic data that shows the optical characteristic of the stereoscopic display panel module 120; and a display setting adjusting module 170 which adjusts stereoscopic image display setting based on the observing distance calculated by the observing distance calculation module 140 and the device characteristic data saved in the device characteristic data saving module 160. Note here that the relative distance depicted in current Specification means the distance in the depth direction between the stereoscopic image display device and the observer, which is a synonym for the observing distance.

That is, employed is a structure in which the stereoscopic display panel module 120 separates image data into a right-eye image and a left-eye image and projects those towards the right eye and the left eye of the observer after adjusting the display setting by the display setting adjusting module 170.

Figure 2:
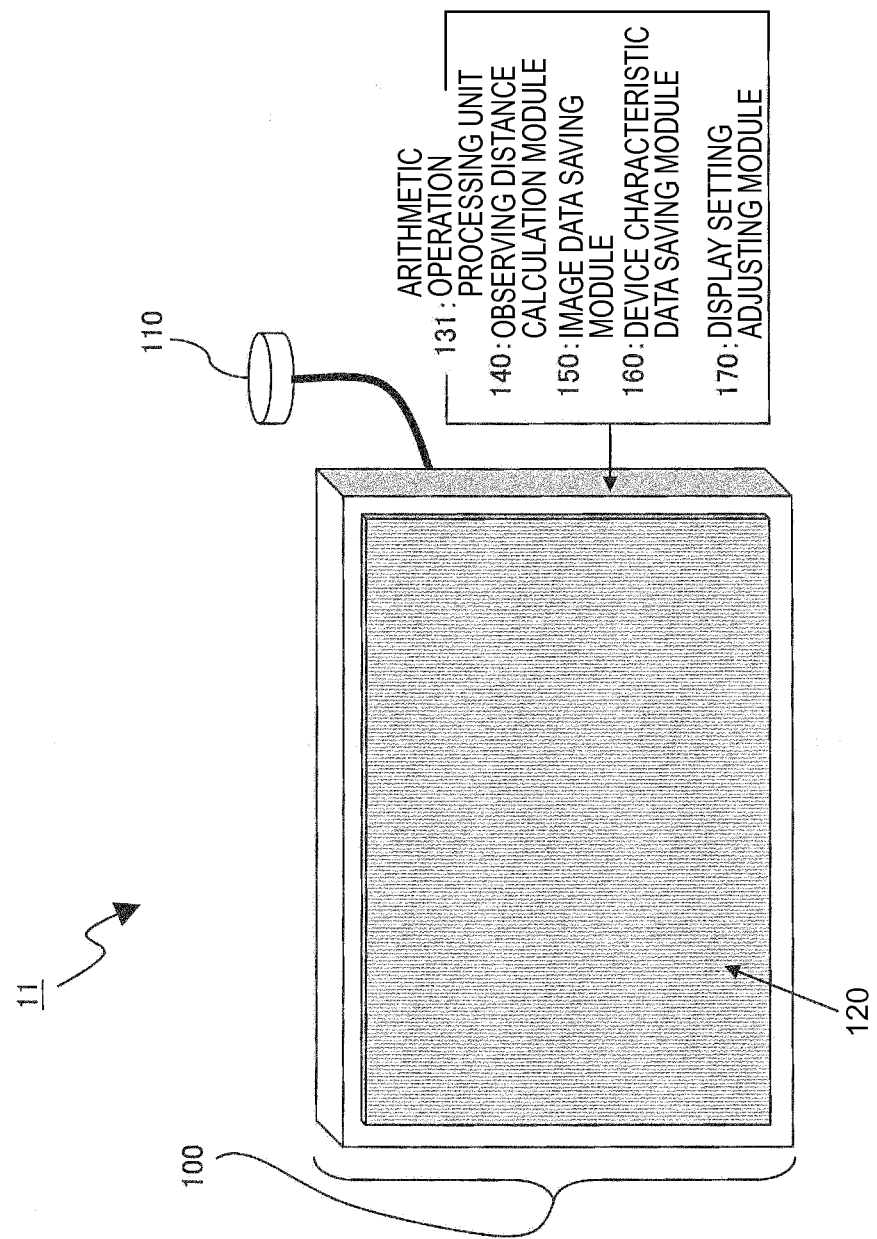
FIG. 2 is an external view of the stereoscopic image display device disclosed in FIG. 1.

Further, as shown in the external view in FIG. 2, in the stereoscopic image display device 11, the device main body 10 that includes the stereoscopic display panel module 120 and the arithmetic operation processing unit 131 is connected to the movable object state detecting module 110 via a wire.

In the first exemplary embodiment, a seat of an airplane, a long-distance train, or the like is assumed as the movable object, and the backrest part of the seat is assumed to be of a reclining type. Thus, the movable object state detecting module 110 is provided to the seat to which the corresponding device main body 10 is placed by adhesion or the like.

That is, the movable object state detecting module 110 detects the seat state such as the inclining state of the seat, and transmits the information of the seat state (state information) to the observing distance calculation module 140 that is provided to the arithmetic operation processing unit 131.

While explanations are provided above by referring to FIG. 2 which shows an example in which the device main body 10 and the movable object state detecting module 110 are connected via a wire, it is also possible to employ a structure which makes it possible to perform radio communications between the device main body 10 and the movable object state detecting module 110 instead of using wire connection. That is, it is possible to employ a structure in which a function of transmitting information of the seat state via radio communications is provided to the movable object state detecting module 110 and the wire connection is omitted.

As shown in FIG. 2, the arithmetic operation processing unit 131 is disposed in the rear part of the stereoscopic display panel module 120, and structured to perform various kinds of arithmetic operation processing by utilizing the state information inputted from the movable object state detecting module 110.

The stereoscopic display panel module 120 is constituted with: an image display panel as an electro-optic module in which a plurality of pixels each including at least a sub-pixel for displaying a first-viewpoint image and a sub-pixel for displaying a second-viewpoint image are arranged in matrix; and a light-ray separating panel as a light-ray separating module which is capable of separating the images of each of the viewpoints to prescribed different directions.

That is, as the electro-optic module, it is possible to use an image display panel of a liquid crystal type, an organic EL type, a plasma type, or the like. As the light-ray separating module, it is possible to use a light-ray separating panel constituted with a lenticular lens, a liquid crystal lens, a parallax barrier, or the like.

Among those, the lens refractive index of the lenticular lens is invariable. However, the distribution of the lens refractive index can be changed with the liquid crystal lens by voltage control.

Figure 3:
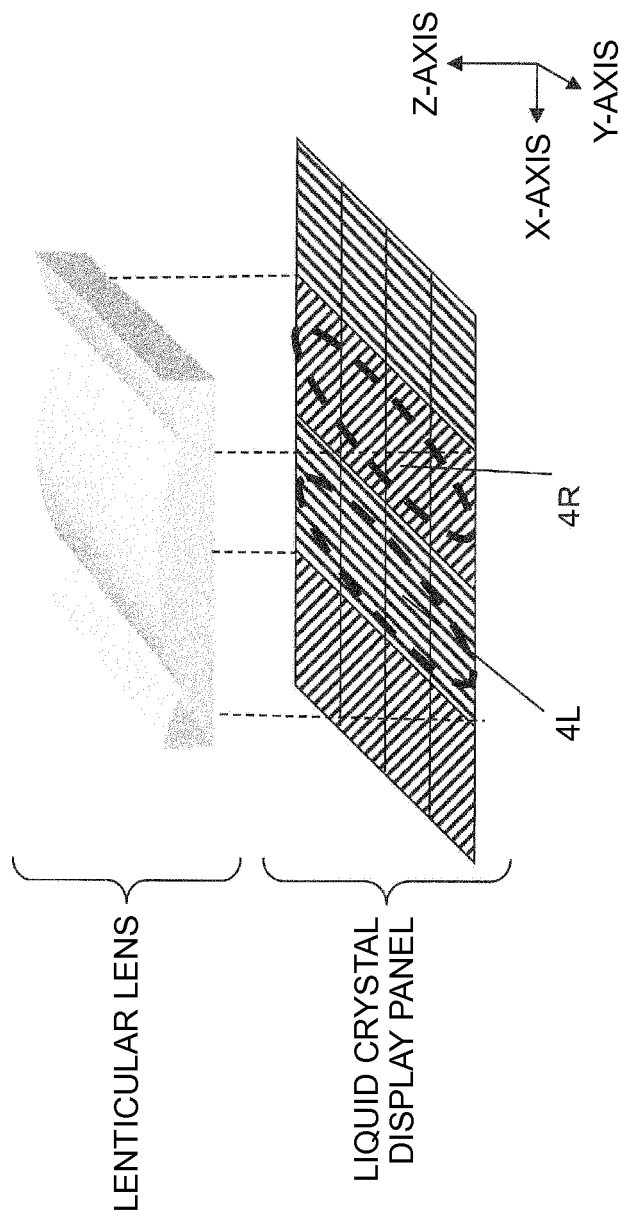
FIG. 3 is an enlarged view of a stereoscopic display panel module disclosed in FIG. 2.

In FIG. 3 which shows an enlarged view of an example of the stereoscopic display panel module 120, employed is a structure in which a liquid crystal panel is employed as the electro-optic module and a lenticular lens is employed as the optical separating module, respectively, and those are combined.

In FIG. 3, a left-eye pixel 4L within the liquid crystal display panel shows a sub-pixel which displays a left-eye image projected to the left-eye of an observer from the stereoscopic display panel module 120. Similarly, a right-eye pixel 4R shows a sub-pixel which displays a right-eye image projected to the right eye of the observer. The left-eye image 4L and the right-eye image 4R are arranged to be lined alternately.

Next, the spatial regions divided by the light-ray separating module of the stereoscopic display panel 120 will be described by referring to FIG. 4 to FIG. 7 showing lenticular-type optical models. Each of those charts is sectional views regarding the observer and the periphery of the stereoscopic image display device 11 viewed from the above the head of the observer.

Figure 4:
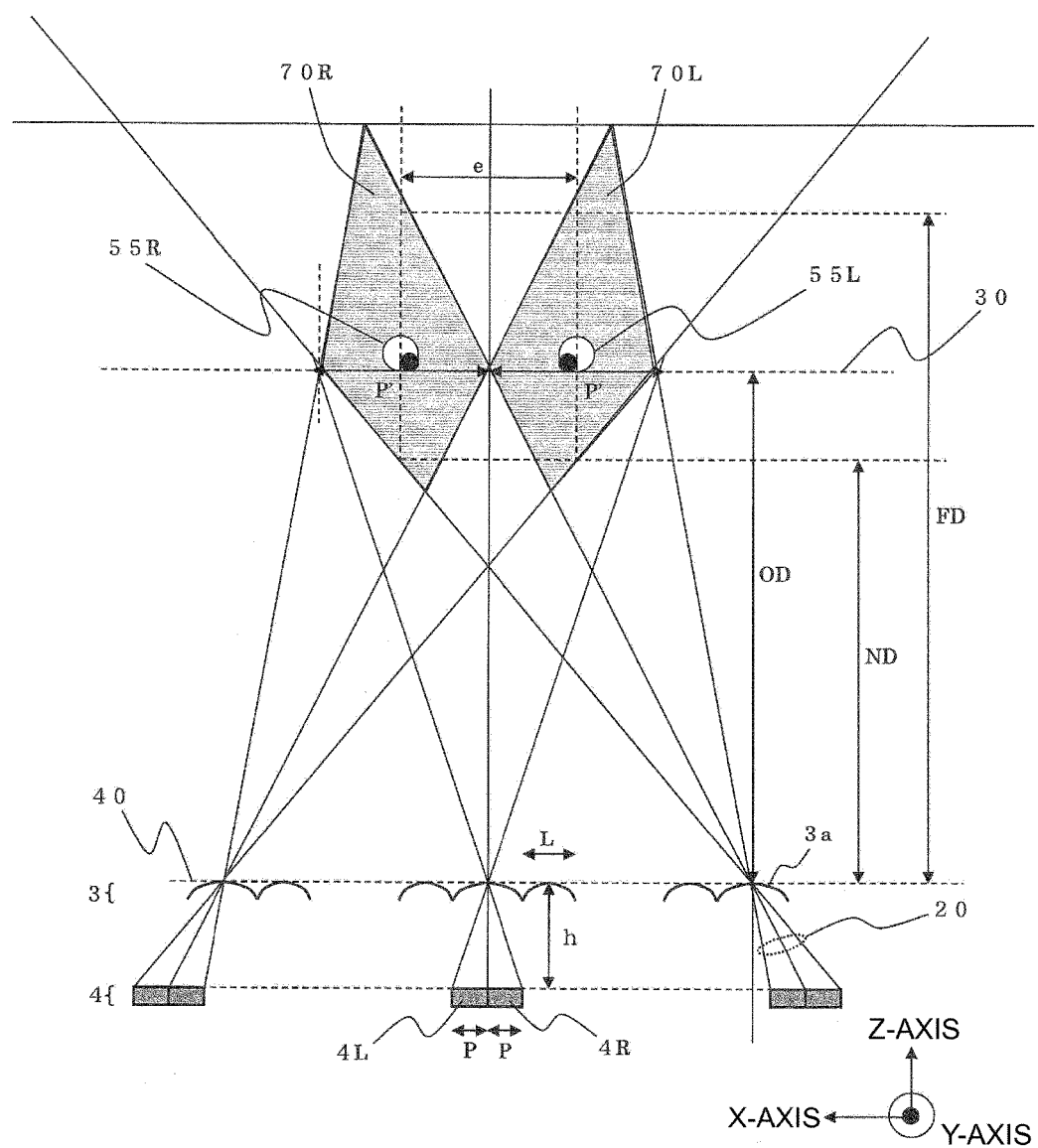

First, FIG. 4 shows an example of the optical model with which image of different parallaxes are projected to the left and right eyes of the observer by the stereoscopic image display device 11 that employs the lenticular lens system.

FIG. 4 shows a positional relation in which the both eyes (right eye 55R and left eye 55L) of the observer are located at an observing plane 30 that is distant from a display surface 40 of the stereoscopic display panel module 120 by about an optimal visible distance (optimal observing distance) OD, and the center of the both eyes of the observer and the center of the display panel coincide with each other.

The image display panel (not shown) is constituted with a light-modulation element group to be the pixels arranged in matrix (e.g., a liquid crystal panel). FIG. 4 shows only each pixel located at the both ends and the center part of the image display panel among the right-eye pixels 4R and the left-eye pixels 4L lined alternately (a pixel group 4).

A lenticular lens 3 functioning as a means for projecting images by dividing the spatial region is disposed on the front side of the image display panel when viewed from the observer side.

The lenticular lens 3 is an optical element formed with a large number of thin and long semicylindrical-shaped convex cylindrical lenses 3a (simply referred to as lenses hereinafter: lens width L), which are disposed in such a manner that the longitudinal direction (Y-axis direction) of the lens 3a is orthogonal to the direction (pixel arranged direction: X-axis direction) along which the left-eye pixels 4L and the right-eye pixels 4R of the image display panel are disposed alternately.

Further, a light source (not shown: so-called backlight) is placed on the inner side of the image display panel. The light emitted from the light source passes the pixels in the image display panel, and passes the lenses 3a thereafter. Then, it is projected towards the observer. The projection direction of the right-eye pixel 4R and the projection direction of the left-eye pixel 4L are limited by the existence of the lenses 3a.

As shown in FIG. 4, assuming that the tracks of the light passing the pixels closest from each of the lenses 3a are light rays 20 out of the light emitted from each of the lenses 3a, a right-eye image region 70R (spatial region where the right-eye image is projected) where projected images of all the right-eye pixels 4R corresponding thereto are superimposed and also a left-eye image region 70L (spatial region where the left-eye image is projected) where projected images of all the left-eye pixels 4L corresponding thereto are superimposed can be acquired. That is, it is a state where only the projected images from the right-eye pixels 4R can be observed in the right-eye region 70R and only the projected images from the left-eye pixels 4L can be observed in the left-eye region 70L.

Thus, when parallax images are projected from the stereoscopic display panel module 120 under a state where the right eye 55R of the observer is located within the right-eye region 70R and the left-eye 55L is located within the left-eye region 70L, the observer can visually recognize stereoscopic images. In other words, the observer can observe desired stereoscopic images when the right eye 55R is located within the right-eye region 70R and the left eye 55L is located within the left-eye region 70L.

When the distance between the observer and the stereoscopic display panel module 120 (display surface 40) becomes shorter than the minimum visible distance (minimum observing distance) ND, the right eye 55R of the observer comes to be outside of the right-eye region 70R and the left eye 55L comes to be outside of the left-eye region 70L. Thus, the observer cannot visually recognize the stereoscopic images.

Similarly, when the distance between the observer and the stereoscopic display panel module 120 (display surface 40) becomes longer than the maximum visible distance (maximum observing distance) FD, the right eye 55R of the observer comes to be outside of the right-eye region 70R and the left eye 55L comes to be outside of the left-eye region 70L. Thus, the observer cannot visually recognize the stereoscopic images either.

The stereoscopic display panel 120 shown in FIG. 4 is designed in such a manner that the width of the right-eye region 70R and the left-eye region 70L becomes the maximum on the observing plane 30 and that the each of the projected images (width P') of each of the right-eye pixels 4R and the left-eye pixels 4L (pixel width P) at the position of the optimal visible distance OD are all superimposed.

That is, employed is a structure with which the projected images of each of the right-eye pixels 4R and the projected images of the left-eye pixels 4L become continuous without a break at the position of the optimal visible distance OD.

The projected image width (pixel width projected on the observing plane) P' is mainly determined by a distance h between the principal point of the lens 3a and the pixel, a pixel pitch p, and the optimal visible distance OD.

When the width P' is widened, the width of the right-eye region 70R and the left-eye region 70L is expanded. Meanwhile, the distance between the pupils showing the distance between the both eyes of the observer is fixed and the range between the positions in the regions corresponding to the both eyes of the observer is constant. Thus, the spatial region (stereopsis region) where the stereoscopic image can be visually recognized is not necessarily expanded.

As shown in FIG. 4, defining that the space between the both eyes is e, it is preferable to design the width P' to be equivalent to the space e between the both eyes. This is because the region capable of achieving stereopsis is limited to the width P' in a case where the width P' is smaller than the space e between the both eyes while the positions of the both eyes are located in the right-eye region 70R or the left-eye region 70L and the region where stereoscopic images cannot be visually recognized is increased in a case where the space e between both eyes is larger than the space e between both eyes.

Figure 5:
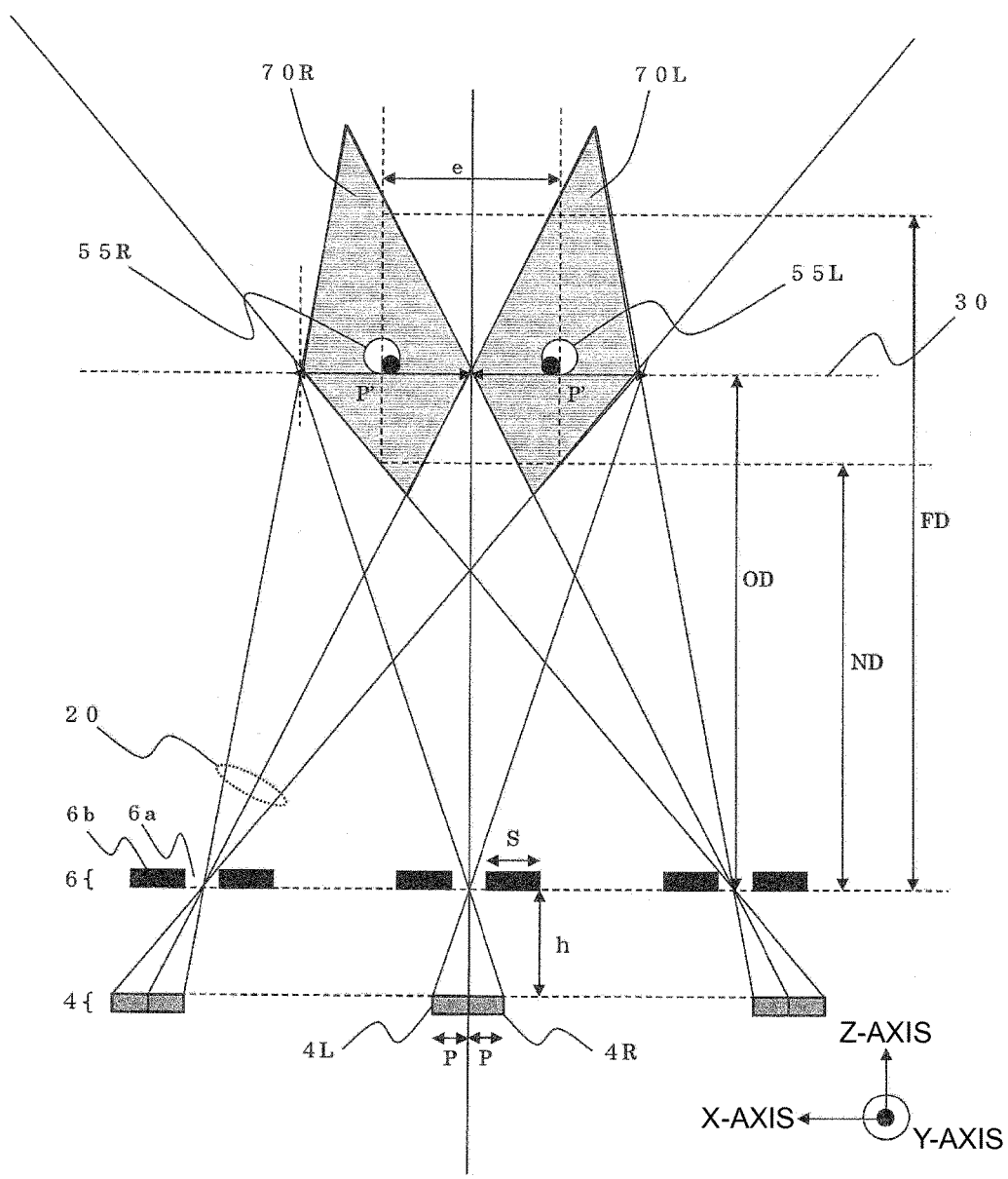

Next, FIG. 5 shows spatial regions divided when a parallax barrier is used as the light-ray separating module of the stereoscopic display panel module 120 instead of the lenticular lens. That is, the structure shown in FIG. 5 is different from the case of FIG. 4 only in the point that it employs a parallax barrier 6 instead of the lenticular lens 3.

The parallax barrier 6 is a barrier (light-shielding plate) in which a large number of thin and stripe-shaped slits 6a are formed, and it is disposed in such a manner that the longitudinal direction of the barrier becomes orthogonal to the direction along which the left-eye pixels 4L and the right-eye pixels 4R of the image display panel are disposed. The sectional view of FIG. 5 shows a state where a barrier 6b of a barrier width S and the slit 6a are disposed alternately.

The intensity of the light emitted from a light source such as a backlight is modulated at the pixels within the image display panel, and the light then passes the slits 6a thereafter to be projected towards the observer. The projection direction of the right-eye pixels 4R and the projection direction of the left-eye pixels 4L are limited by the existence of the slits 6a.

As shown in FIG. 5, assuming that the tracks of the light passing the pixels closest from each of the slits 6a are the light rays 20 out of the light emitted from each of the slits 6a, the right-eye image region 70R where projected images of all the right-eye pixels 4R corresponding thereto are superimposed and also the left-eye image region 70L where projected images of all the left-eye pixels 4L are superimposed can be acquired as in the case of FIG. 4.

Figure 6:
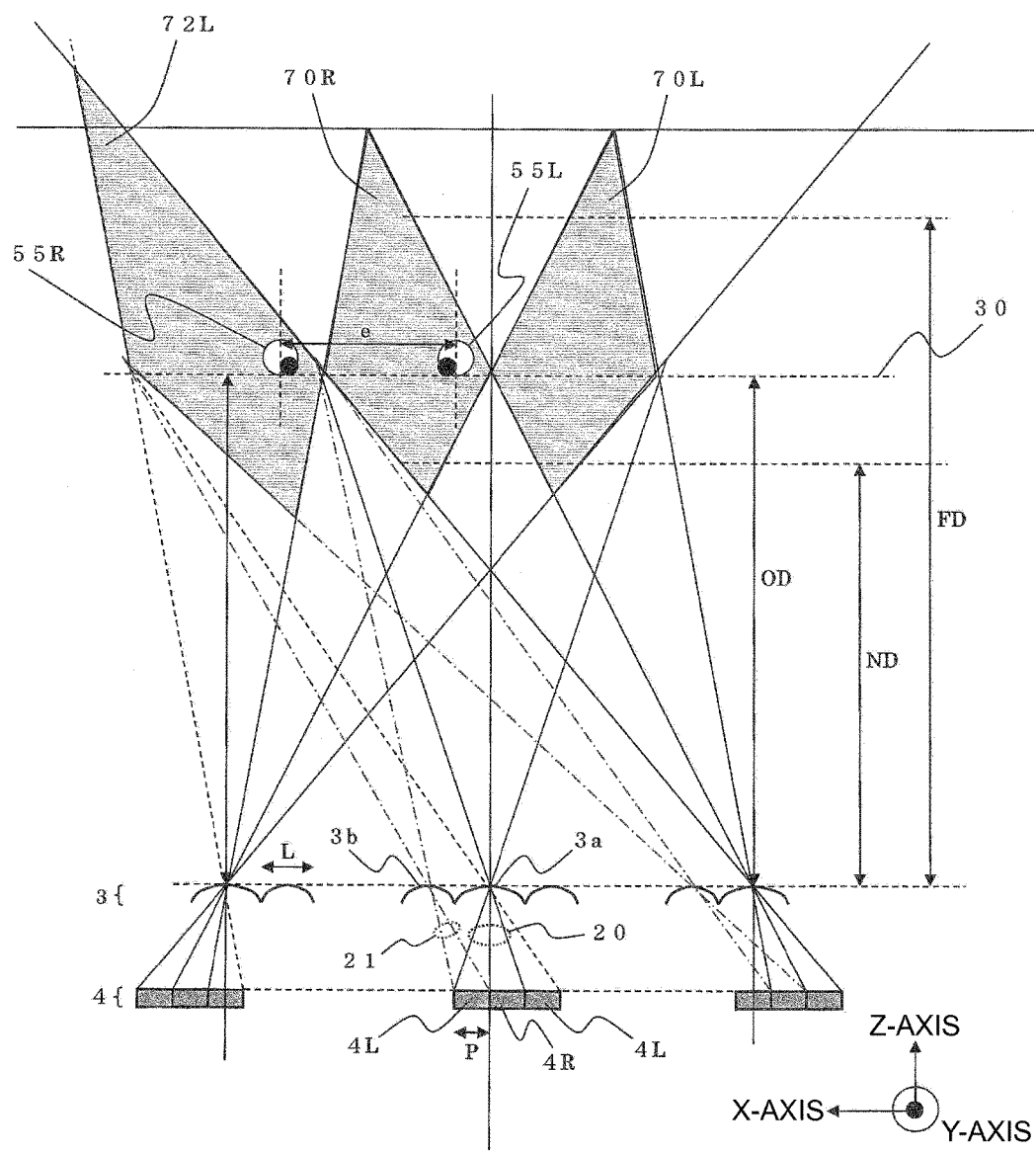
FIG. 6 is a schematic view for describing pseudoscopic views out of the view showing the optical model formed by the stereoscopic display panel module same as that shown in FIG. 4.

Next, described by referring to FIG. 6 is a case where the observer moves out of the spatial region (stereoscopic viewing space) where the stereoscopic image can be viewed properly and is located in the spatial region (pseudoscopic viewing space) where the popup direction and the depth direction of the stereoscopic image are inversely recognized.

FIG. 6 is a sectional view taken from the above the head of the observer in a case where the observer moves to the right side so that the right eye 55R is moved out of the right-eye region 70R and located within the left-eye region 70L while the left eye 55L is moved out of the left-eye region 70L and located within the right-eye region 70R.

In this case, the light ray 20 passing at the principal point (vertex) of the closest cylindrical lens 3a out of the light emitted out from the left-eye pixels 4L and the right-eye pixels 4R does not reach the position of the right eye 55R of the observer. However, assuming that the light passing the principal points (vertex) of cylindrical lenses 3b that are the second closest out of the light emitted from the left-eye pixels 4L as light rays 21 (long-dashed short-dashed line of FIG. 6), it can be found that a second left-eye region 72L is acquired by the light rays 21.

As described, in FIG. 6, the observer observes the projected image from the left-eye pixels 4L by the right eye 55R and observes the projected image from the right-eye pixels by the left eye 55L. Thus, the popup direction and the depth direction are reversed when observing the stereoscopic images (so-called pseudoscopic view), so that it is not possible to visually recognize the desired stereoscopic images.

Note here that the right-eye region 70R is the stereoscopic viewing space, and the left-eye regions 70L and 72L are the pseudoscopic viewing spaces, for the right eye 55R. Further, the left-eye regions 70L and 72L are the stereoscopic viewing spaces, and the right-eye region 70R is the pseudoscopic viewing space, for the left eye 55L.

Subsequently, a case where the observer moves out of the stereoscopic viewing space and is located at a 3D-crosstalk viewing space will be described by referring to FIG. 7.

Figure 7:
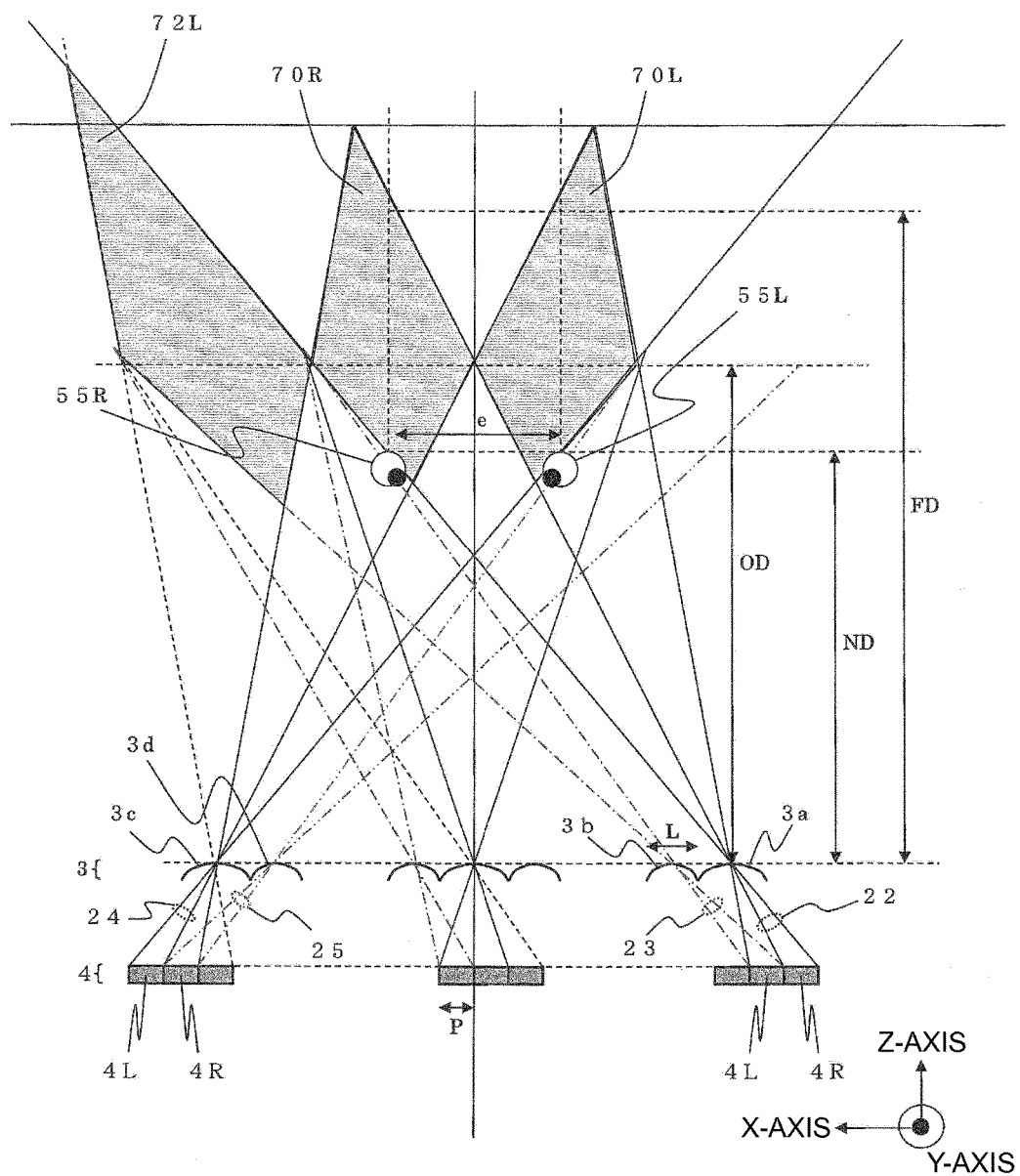
FIG. 7 is a schematic view for describing 3D crosstalk out of the view showing the optical model formed by the stereoscopic display panel module same as that shown in FIG. 4.

FIG. 7 is a sectional view taken form the above the head of the observer when the distance between the observer and the stereoscopic display panel module 120 becomes shorter than the minimum visible distance ND so that the right eye 55R is located in the vicinity of the boundary of the right-eye region 70R and the left eye 55L is located in the vicinity of the boundary of the left-eye region 70L.

In this case, light rays 22 passing the principal point (vertex) of the closest cylindrical lens 3a out of the light emitted from the right-eye pixel 4R at the right end of the liquid crystal display panel and light rays 23 (illustrated with long-dashed short-double-dashed line) passing the principal point (vertex) of the second closest cylindrical lens 3b out of the light emitted from the left-eye pixel 4L are both projected to the position of the right eye 55R of the observer.

Thus, when observing the stereoscopic image under the state shown in FIG. 7, the observer observes the projected images from the right-eye pixel 4R and the left-eye pixel 4L by the right eye 55R. That is, the image viewed by the right eye 55R is a CT-image in which the right-eye image and the left-eye image are superimposed (so-called 3D crosstalk), so that a desired stereoscopic image cannot be visually recognized.

Here, the spatial region in the vicinity of the boundary between the right-eye region 70R and the left-eye region 70L or the left-eye region 72L is the 3D-crosstalk viewing space.

Further, light rays 24 passing the principal point (vertex) of the closest cylindrical lens 3c out of the light emitted from the left-eye pixel 4L at the left end of the liquid crystal display panel and light rays 25 (illustrated with long-dashed short-double-dashed line) passing the principal point (vertex) of the second closest cylindrical lens 3d out of the light emitted from the right-eye pixel 4R are both projected to the position of the left eye 55L of the observer as well. Thus, the image viewed by the left eye 55L is a CT-image in which the right-eye image and the left-eye image are superimposed, so that a desired stereoscopic image cannot be visually recognized.

As described, with the naked-eye type stereoscopic image display device, influences of CT-images and pseudoscopic views by 3D crosstalk appear so that the display quality of the stereoscopic images is greatly deteriorated when the observing distance changes and the observer is moved out from the stereoscopic viewing space.

Next, the positional relation and the like of a seat and the stereoscopic image display device 11 will be described by referring to FIG. 8 which shows an external view of a case where the stereoscopic image display device 11 is placed at the back face part of the seat as a movable object.

Figure 8:
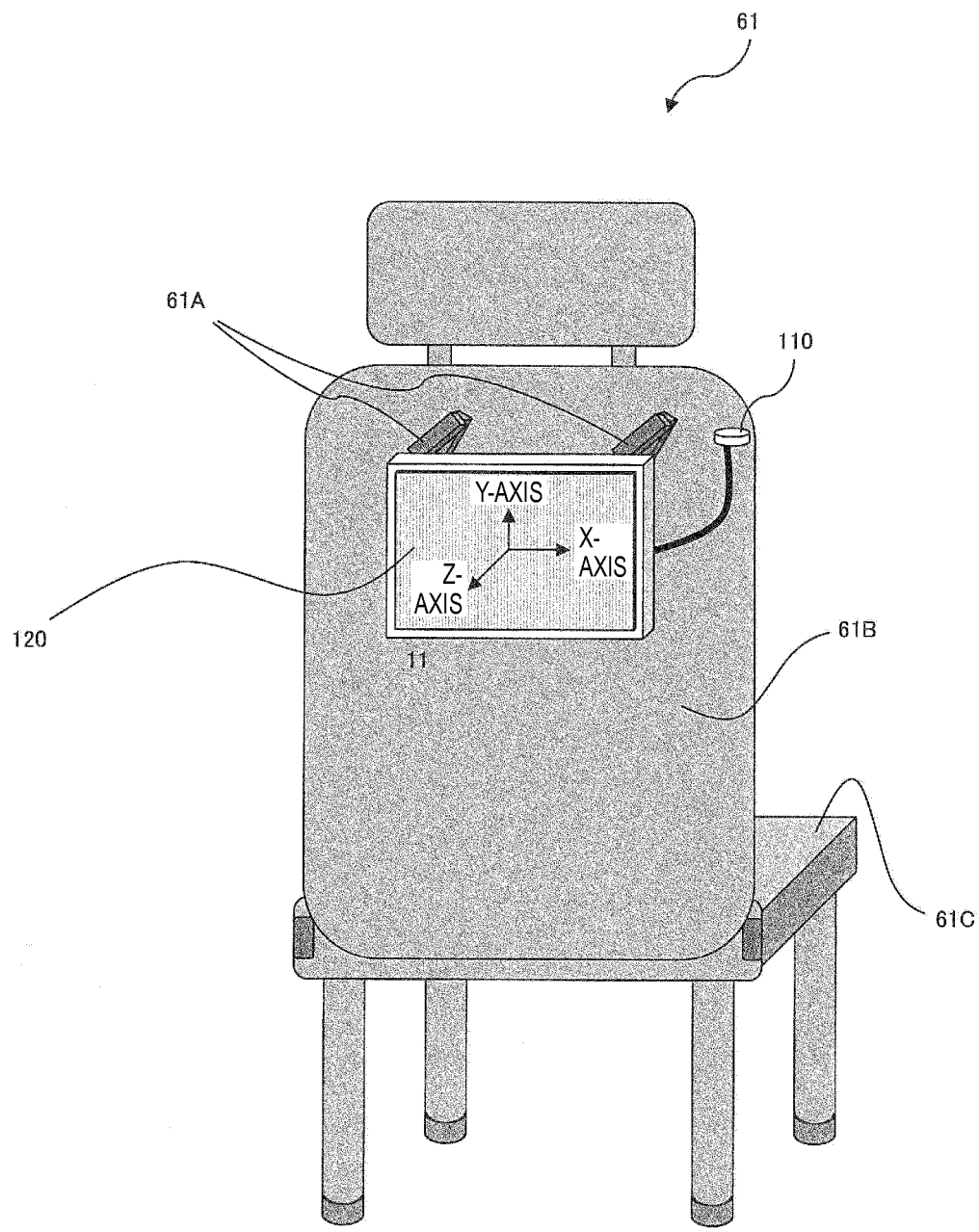
FIG. 8 is an external view showing a state where the stereoscopic image display device disclosed in FIG. 1 and the like is placed at a back face part of a seat.

Under the state shown in FIG. 8, the stereoscopic image display device 11 is placed at a seat back face part 61B of a seat 61 via a joint member 61A. By a rotational mechanism of the joint member 61A interposed between with the seat back face part 61B, the stereoscopic image display device 11 is capable of making rotational movements (rotational movements on the X-axis) on a Y-axis-Z-axis plane.

Without the rotational mechanism of the joint member 61A, the display surface of the stereoscopic display panel module 120 is maintained in a facedown state when the seat back face part 61 is inclined. Thus, preferable images cannot be visually recognized by the observer seated on a seat surface part (sitting part) 61C of the seat. That is, employed herein is a structure with which the rotational mechanism is provided for avoiding the display surface from being faced down, and for changing the facing direction of the display surface of the stereoscopic display panel module 120 thereby.

Further, the display coordinate system of the stereoscopic image display device 11 is defined as shown in FIG. 8.

That is, the position of the origin of the display coordinate system is defined as the center position of the display surface of the stereoscopic display panel module 120, the lateral direction (longitudinal direction herein) on the display surface of the stereoscopic display panel module 120 is defined as the X-axis direction, the vertical direction (short-side direction) on the display surface is defined as the Y-axis direction, and the direction perpendicular to the display surface of the stereoscopic display panel module 120 is defined as the Z-axis direction.

In each of the charts hereinafter, the observing distance (relative distance between the stereoscopic image display device 11 and the observer) showing the distance in the depth direction between the stereoscopic image display device 11 and the observer is written by the display coordinate system of the stereoscopic image display device 11, and each explanation is provided based thereupon.

Figure 10:
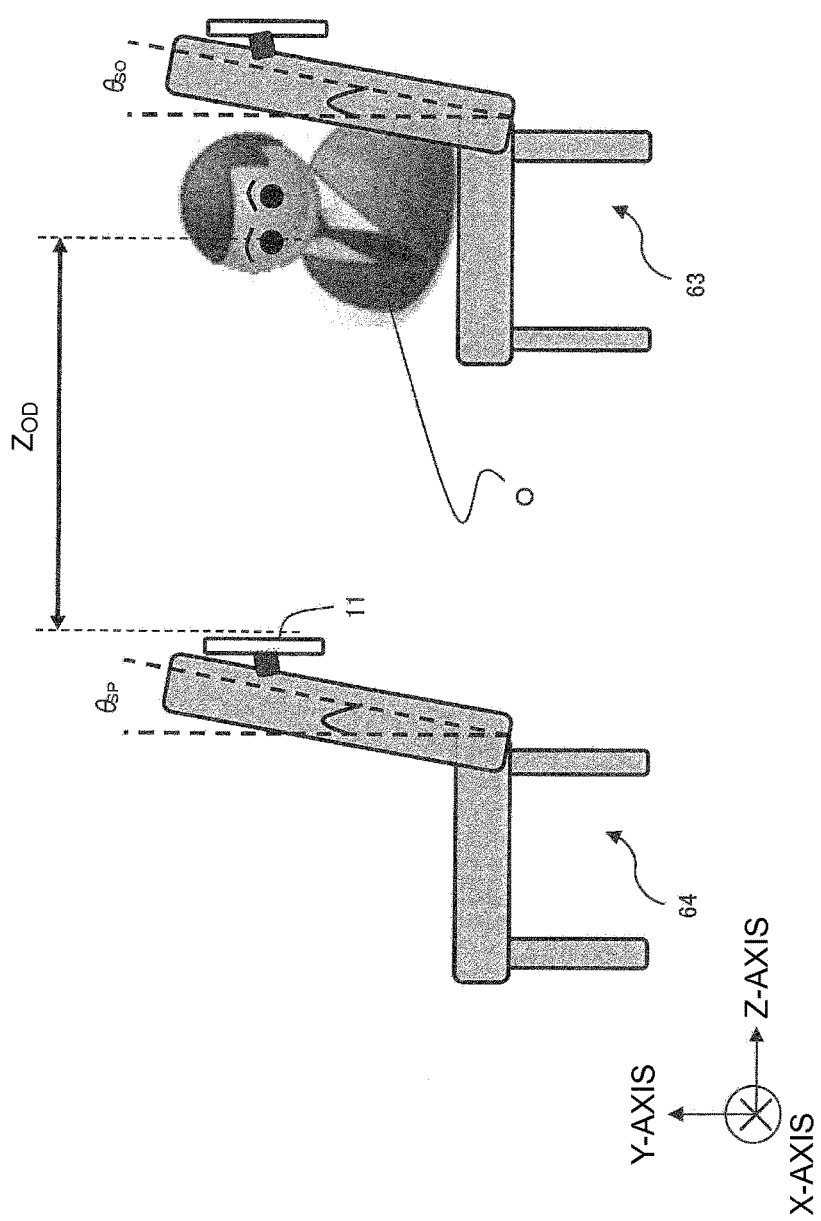
FIG. 10 is a schematic chart showing a positional relation between the stereoscopic image display device of FIG. 1 and the like placed at the back face part of the seat and an observer.

For example, as shown in FIG. 10 to be described later, the distance in the Z-axis direction from the center position of the display surface of the stereoscopic display panel module 120 to the observer is the observing distance $Z_{OD}$. In FIG. 10 and the like (FIG. 1, FIG. 18), the positions of the both eyes of the observer is shown as the position of the right eye of the observer (O) for convenience.

Subsequently, another example of placing the stereoscopic image display device 11 at the back face part of the seat will be described by referring to an external view shown in FIG. 9.

Figure 9:
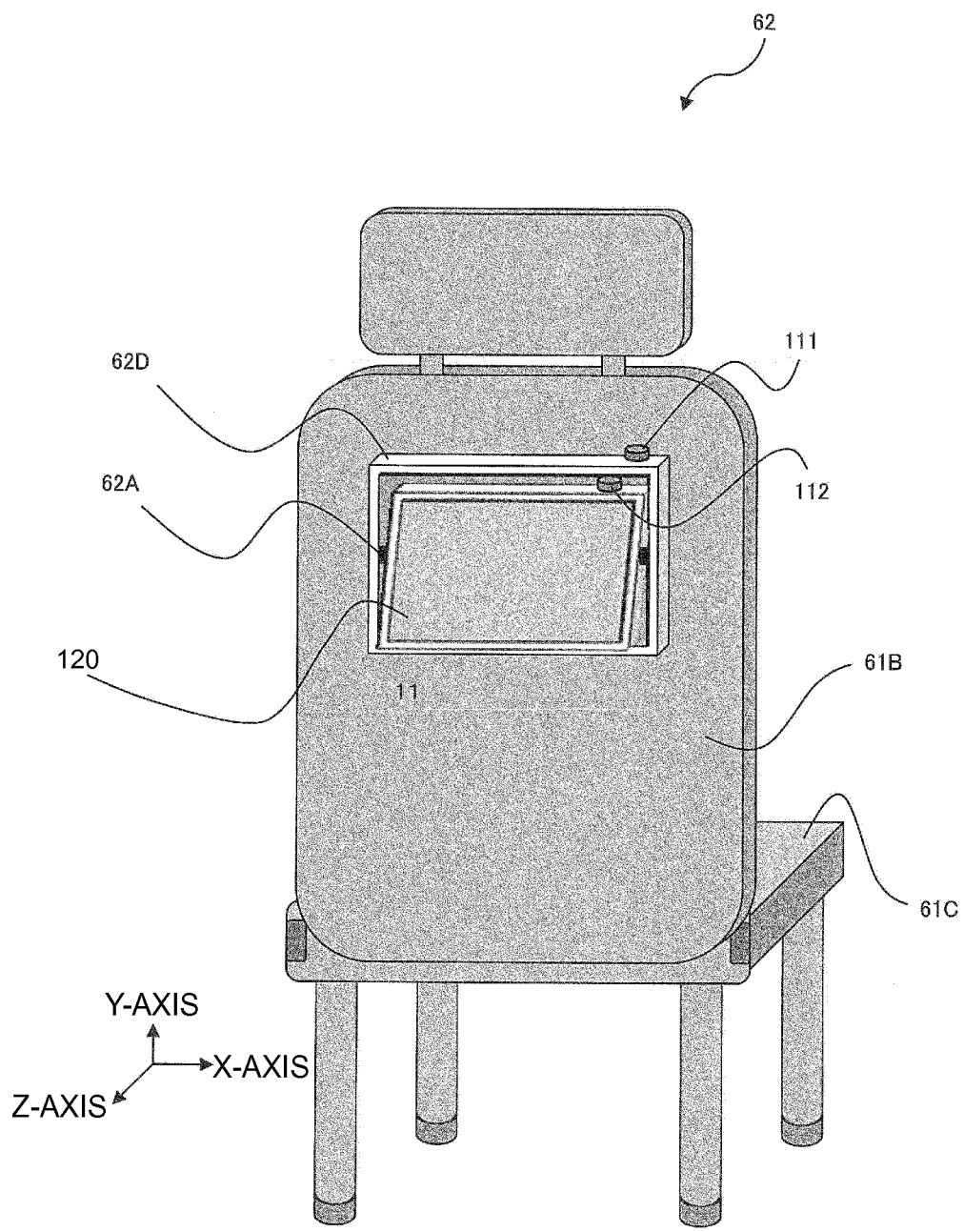
FIG. 9 is an external view showing a state where an outer frame is provided to the stereoscopic image display device disclosed in FIG. 1 and the like, and the stereoscopic image display device is placed at a back face part of a seat.

Regarding the stereoscopic image display device 11 shown in FIG. 9, an outer frame part 62D integrated with the stereoscopic display panel module 120 via a joint member 62A is provided at a seat 62. The outer frame part 62D is in a state fixedly placed at a seat back face part 61B. Further, a first movable object state detecting module 111 provided to the outer frame part 62D is a structural member for detecting the inclined angle of the seat back ace part 61B, and has a same function as that of the above-described movable object state detecting module 110.

That is, not only the structure with which the movable object state detecting module 110 shown in FIG. 8 is placed at the seat back face part 61B but also the structure with which the first movable object state detecting module 111 as the same structural member is placed at the outer frame part 62D may be employed.

When the structure with which the first movable object state detecting module 111 is provided to the outer frame part 62D which integrally moves with the seat back face part 61B is employed, the inclined angle detected in the outer frame part 62D of the stereoscopic image display device 11 when the seat back face part 61B is inclined coincides with the inclined angle of the seat back face part 61B.

Further, the stereoscopic display panel module 120 becomes capable of making rotational movements (rotational movements by having the X-axis as the rotation axis) on a Y-axis-Z-axis plane due to the rotational mechanism using the joint member 62A as shown in FIG. 9, so that the observer can perform position adjustment to become perpendicular to the panel display surface.

Further, as shown in FIG. 9, it is also possible to employ a structure with which a second movable object state detecting module 112 for detecting the rotation angle of the stereoscopic display panel done by the rotational mechanism is added also to the stereoscopic display panel 120. This makes it possible to perform calculation processing of the observing distance by taking also the positional relation between the seat back face part 61B (backrest part) and the stereoscopic display panel module 120 into consideration.

Next, FIG. 10 shows a model chart of a case where the observer is sitting on the seat and observes the stereoscopic image display device 11 placed at the back face part of the front seat. In FIG. 10, shown is a state where both the seat 63 of the observer and the front seat 64 are at a normal inclined angle.

Note here that the inclined angle of the seat 63 of the observer from the perpendicular direction (Y-axis direction in the chart) is defined as $\theta_{SO}$, and the inclined angle of front seat 64 of the observer (O) from the perpendicular direction (Y-axis direction in the drawing) is defined as $\theta_{SP}$. Further, the observing distance showing the distance between the display surface of the stereoscopic display panel module 120 of the stereoscopic image display device 11 in that state and the observer (O) in the depth direction (Z-axis direction in the drawing) is defined as $Z_{od}$.

Figure 11:
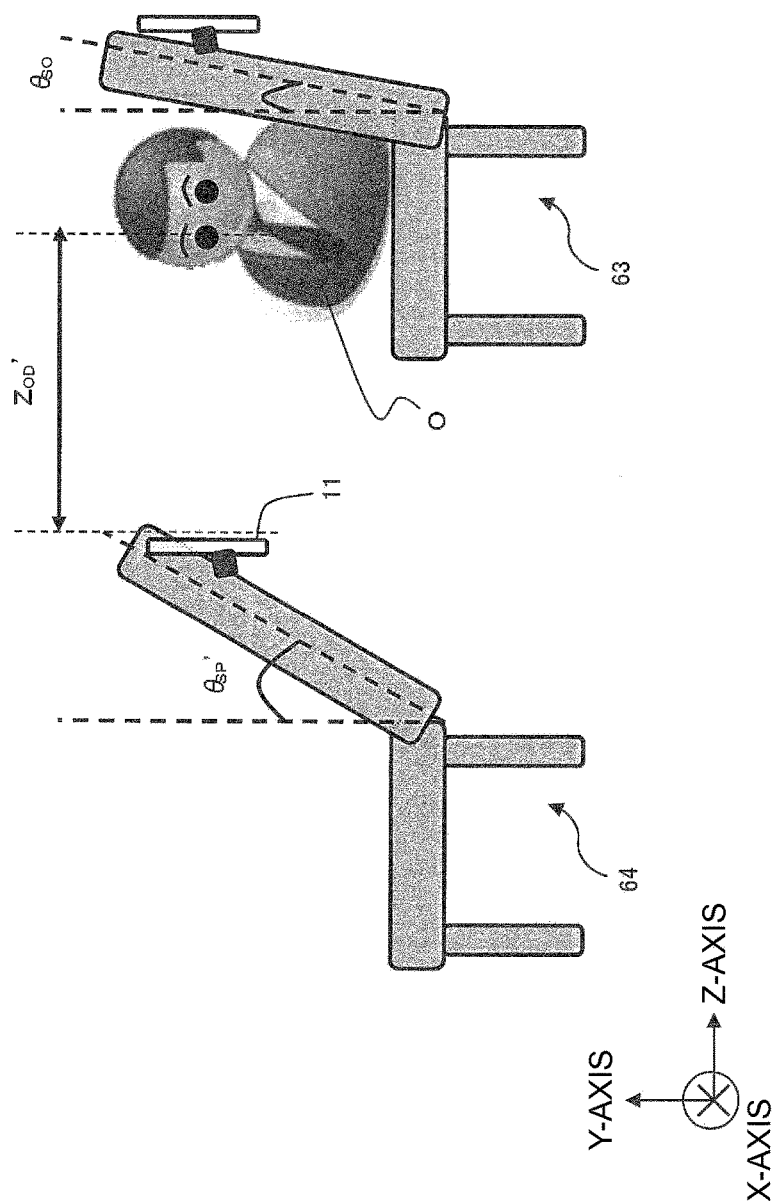
FIG. 11 is a schematic chart showing the positional relation between the stereoscopic image display device and the observer when the seat in front of the observer is inclined from the state shown in FIG. 10.

Next, FIG. 11 shows a model chart of a case where the backrest part of the front seat 64 is inclined from the state of FIG. 10 (a case where the inclined angle is changed from $\theta_{SP}$ to $\theta_{SP'}$).

The set position of the stereoscopic image display device 11 placed at the seat back face part of the front seat 64 moves in accordance with inclination of the backrest part of the front seat 64.

That is, with the stereoscopic image display device 11 under such state, the observing distance $Z_{OD}$ rapidly changes when the backrest part is inclined for the convenience of the passenger on the front seat 64 even when the observer (O) does not move. FIG. 11 shows the state where the observing distance is changed to $Z_{OD}'$.

Figure 12:
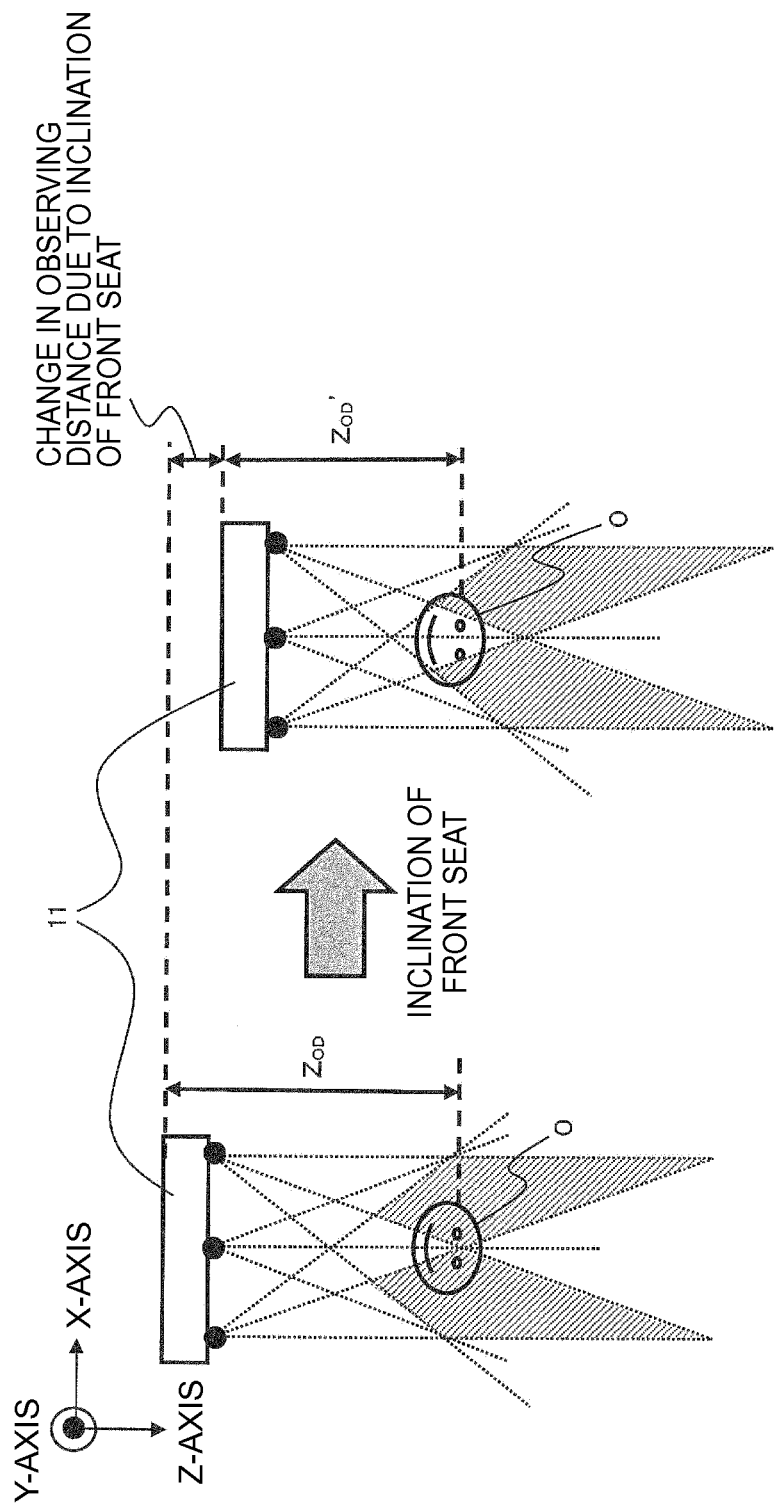

Subsequently, FIG. 12 shows a positional relation between the position of the observer (O) and the stereoscopic viewing space defined from the optical characteristic of the stereoscopic display panel module 120.

In the state of FIG. 12A where the both eyes of the observer (O) are located within the stereoscopic viewing space, the observer can visually recognize proper stereoscopic images. In the meantime, in the state of FIG. 12B where the observing distance is changed rapidly (changed from $Z_{OD}$ to $Z_{OD'}$) in accordance with inclination of the front seat 64, the positions of the both eyes of the observer (O) are shifted to the outside of the normal vision region. Thus, CT-images and pseudoscopic views by 3D crosstalk are generated, so that the observer (O) cannot visually recognize proper stereoscopic images.

Considering such changes in the state, the stereoscopic image display device 11 according to first exemplary embodiment employs the structures for calculating the change amount from the observing distance $Z_{OD}$ caused due to inclination of the front seat 64 and for adjusting the display setting of the stereoscopic images in accordance with the changed observing distance $Z_{OD'}$.

In the followings, a calculation method of the observing distance (change amount from the observing distance $Z_{OD}$) is depicted.

When calculating the observing distance, first, the seat state information (state information) showing the inclined angle $\theta_{SO}$ of the seat 63 of the observer (O) and the inclined angle $\theta_{SP}$ of the seat (front seat) 64 on the front side thereof is detected by the movable object state detecting module 110.

That is, the movable object state detecting module 110 is placed at the back face parts (seat back face parts) of both of the seat 63 of the observer (O) and the front seat 64. First, however, a method for calculating the inclined angle of a seat 60 that is the general term of those seats will be described by referring to FIG. 13 to FIG. 16.

Figure 13:
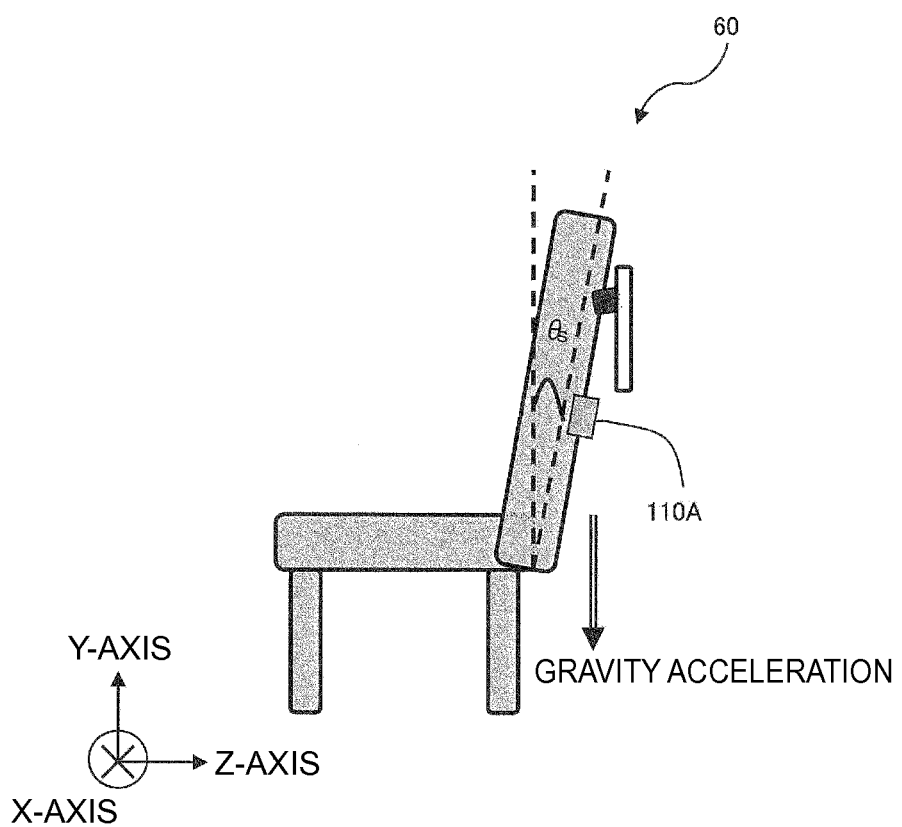
FIG. 13 is an external view of a seat to which a tilt sensor within a movable object state detecting module shown in FIG. 1 and the like is placed.

FIG. 13 shows an example where a tilt sensor 110A for detecting the inclined angle $\theta_S$ of the backrest part is placed at the back face part of the seat 60. An example of the tilt sensor 110A may be a biaxial acceleration sensor. In FIG. 13, shown is a case where the acceleration sensor is placed at the seat back face part as the tilt sensor 110A. That is, the movable object state detecting module 110 connected to the device main body 10 via a wire or without a wire is structured to detect the state of the seat 60 as the movable object based on a detected value (detected data) acquired by the tilt sensor 110A.

Here, FIG. 14 shows an enlarged view of the biaxial acceleration sensor as the tilt sensor 110A.

The biaxial acceleration sensor detects the acceleration in the $Y_A$-axis direction and the $Z_A$-axis direction with respect to the acceleration coordinate system. Note here that the acceleration coordinate system is a coordinate system in which an arbitrary direction with respect to the acceleration sensor is defined as $Y_A$-axis direction and an arbitrary direction perpendicular to the $Y_A$-axis direction is defined as the $Z_A$-axis direction. Further, in this case, the direction of the $X_A$-axis (not shown) which is orthogonal to the $Y_A$-axis and the $Z_A$-axis is set to coincide with the X-axis direction of the display coordinate system.

Figure 14A:
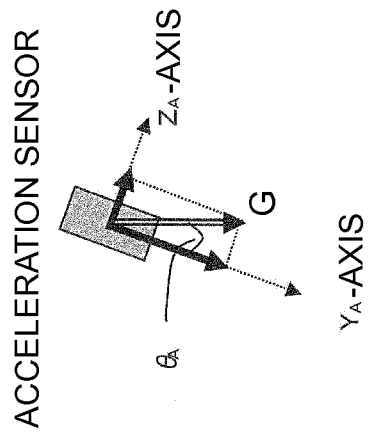
Figure 14B:
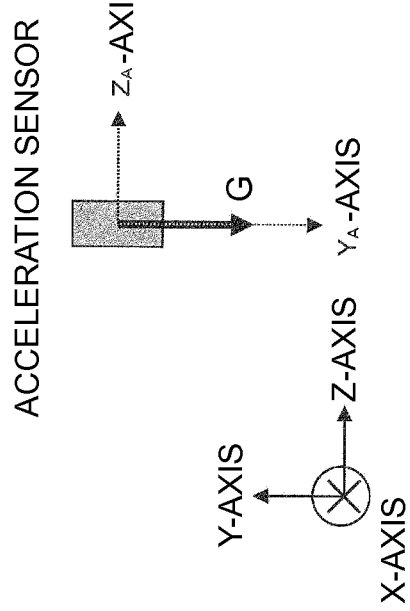

While FIG. 14A shows a case where the gravity acceleration direction is equivalent to the $Y_A$-axis direction of the acceleration coordinate system, FIG. 14B shows a case where the gravity acceleration direction is inequivalent to the $Y_A$-axis direction of the acceleration coordinate system.

The acceleration sensor has a function of detecting the gravity acceleration G, so that it is possible to calculate the inclined angle $\theta_A$ with respect to the gravity acceleration direction on a plane of the $Y_A$-axis and $Z_A$-axis from the detected value. That is, it is designed to calculate the inclined angle $\theta_A$ with respect to the gravity acceleration G from following Expression (1).

(Expression 1)

$$\theta_A = \tan^{-1}\left(\frac{Z_A}{Y_A}\right) \quad (1)$$

In Expression (1), $Y_A$ shows the acceleration in the $Y_A$-axis direction detected by the acceleration sensor, and $Z_A$ shows the acceleration in the $Z_A$-axis direction.

When the gravity acceleration direction coincides with the perpendicular direction of the sitting part of the seat, the inclined angle $\theta_S$ of the seat back face part coincides with the inclined angle $\theta_A$ of the acceleration sensor with respect to the gravity acceleration.

Regarding the seats of an airplane and the like, the body of the airplane is inclined during the flight. Thus, it is assumed that the gravity acceleration direction and the direction perpendicular to the sitting part of the seat do not coincide with each other. In that case, the inclined angle $\theta_S$ of the seat back face part does not coincide with the inclined angle $\theta_A$ of the acceleration sensor with respect to the gravity acceleration.

Thus, a method for detecting the inclined angle when the gravity acceleration direction does not coincide with the direction perpendicular to the sitting part will be described by referring to FIG. 15. Here, assumed is a state where the body of the airplane is inclined obliquely due to pitching.

Figure 15:
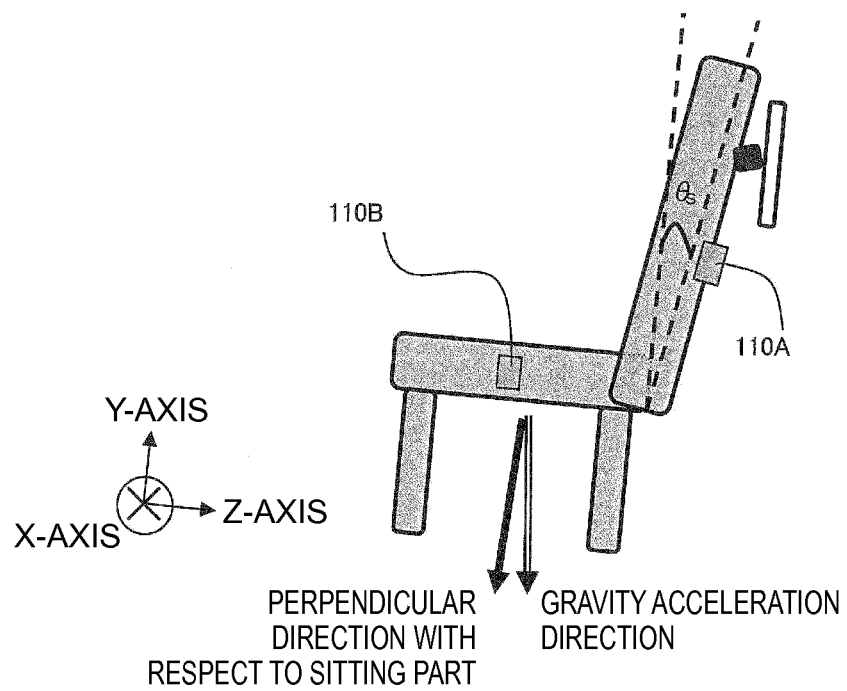
FIG. 15 is an external view of a seat to which two tilt sensors are placed.

That is, by considering the state where the body of the airplane is inclined due to pitching, the case shown in FIG. 15 employs a structure in which the tilt sensor is placed not only at the seat back face part (the tilt sensor 110A (first tilt sensor)) but also at the sitting part of the seat (a tilt sensor 110B (second tilt sensor)).

When the stereoscopic image display device 11 is loaded to the seat of an airplane or the like where the body is inclined as in this case, it is possible to provide the two tilt sensors and provide a function to the movable object state detecting module 110 for calculating a difference value between the inclined angle detected by the tilt sensor 110B placed at the sitting part of the seat and the inclined angle detected by the tilt sensor 110A placed at the seat back face part so as to calculate the inclined angle $\theta_S$ of the seat back face part by that function.

In the meantime, only for calculating the difference vale between the inclined angle ($\theta_{SO}$: FIG. 10) of the back face part of the seat where the observer sits and the inclined angle ($\theta_{SP}$: FIG. 10) of the back face part of the front seat thereof, it is possible to employ a structure in which the tilt sensor is placed only at the seat back face part and the movable object state detecting module 110 acquires the difference value of the inclined angles detected by the tilt sensor.

When the body of the airplane makes yawing actions, there is no change in the relation between the perpendicular direction of the sitting part of the seat and the gravity acceleration direction. In addition, there is a change in the relation between the perpendicular direction of the sitting part of the seat and the gravity acceleration direction when the body makes rolling actions but there is no change in the ratio of the gravity accelerations detected in the $Y_A$-axis direction and the $Z_A$-axis direction. Thus, the inclined angle $\theta_A$ can be calculated from Expression (1) described above (note, however, that the inclined angle $\theta_A$ cannot be calculated when the body is inclined by 90 degrees by a rolling action since the gravity accelerations detected in the $Y_A$-axis direction and the $Z_A$-axis direction become 0).

Further, when the acceleration sensor is used as the tilt sensor as described above, it is possible to detect the timing at which the seat back face part is inclined through detecting the change amount in the acceleration.

Figure 16:
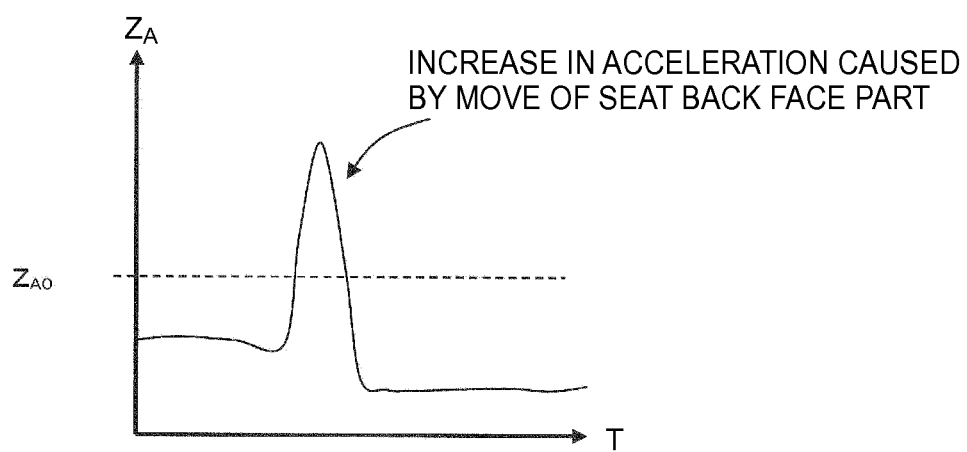
FIG. 16 is a graph showing chronological changes in the acceleration generated by inclination of a backrest of a seat.
Figure 17:
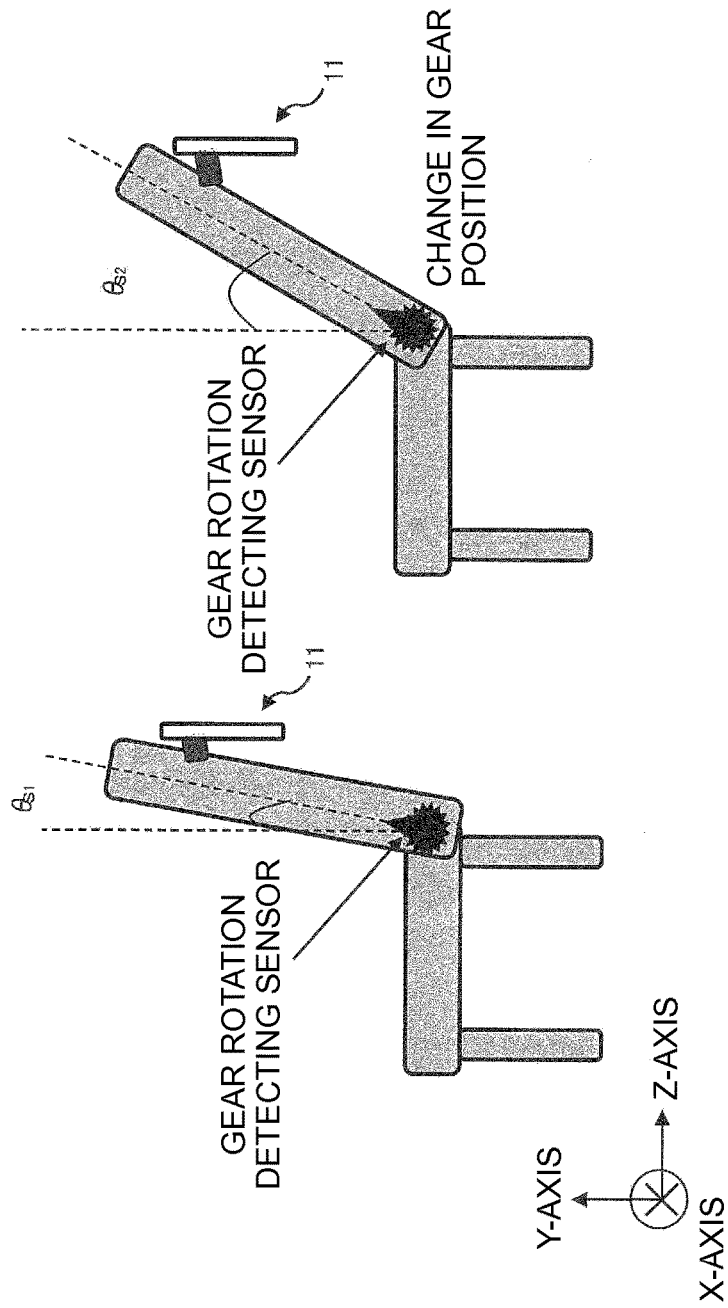

As an example, chronological fluctuations in the acceleration $Z_A$ detected by the acceleration sensor placed at the seat back face part is shown in FIG. 16. Here, the longitudinal axis shows the acceleration $Z_A$ of the $Z_A$-axis direction, and the lateral axis shows the detected time of the acceleration $Z_A$.

When the seat back face part is set still, the acceleration sensor mainly detects only the gravity acceleration. However, when the seat back face part is inclined and moved, the acceleration sensor detects the acceleration for the movement of the seat back face part other than the gravity acceleration. Thus, the acceleration $Z_A$ is increased. Therefore, in order to correspond to such condition, an arbitrary threshold value $Z_{AO}$ may be set in advance to judge that the seat back face part is inclined and moved when the acceleration $Z_A$ exceeds the threshold value $Z_{AO}$.

Through the above-described processing, the movable object state detecting module 110 can detect the timing at which the seat back face part is inclined.

Further, there are changes generated in the acceleration $Z_A$ by increasing and decreasing the speed of the airplane itself. However, the changes in the acceleration $Z_A$ by increasing and decreasing the speed of the airplane itself influence all the seats within the airplane. Therefore, the movable object state detecting module 110 may be structured to judge that the change is caused due to the increase and decrease in the speed of the airplane itself when the acceleration $Z_A$ detected by the acceleration sensors of all the seats change all at once so as to judge that the seat back face part is not inclined when the acceleration exceeds an arbitrary threshold value $Z_{AO}$.

In the explanations above, described is an example of using the acceleration sensor as the tilt sensor which detects the inclined angle $\theta_S$ of the backrest part of the seat. However, the tilt sensor is not limited only to that. It is also possible to use a gear rotation detecting sensor, an electric motor rotation detecting sensor, or the like instead of the acceleration sensor.

Here, FIGS. 17A and 17B show a case where a gear rotation detecting sensor is placed at a joint part of the sitting part of a seat and a backrest part thereof. FIG. 17A shows a case where the inclined angle of the backrest part of the seat is $\theta_{S1}$, and FIG. 17B shows a case where the inclined angle of the backrest part of the seat is $\theta_{S2}$.

With the gear rotation detecting sensor, the position of the gear (the meshed position of the gear) changes according to the inclined angle $\theta_S$ of the backrest part of the seat. Therefore, it is possible to detect the inclined angle $\theta_S$ from the positions through registering the relation between the positions of the gear and the inclined angle $\theta_S$ in advance.

Further, it is also possible to measure the number of rotated times when the backrest part of the seat inclines (number of times in the shift of the meshed positions of the gear) and to detect inclined angle $\theta_S$ of the backrest part of the seat from the number of rotated times.

Next, the observing distance calculation module 140 has a function which calculates the observing distance $Z_{OD}$ from the inclined angle $\theta_S$ of the seat back face part detected by the movable object state detecting module 110 and the seat reference information registered in advance to the observing distance calculating module 140.

Figure 18:
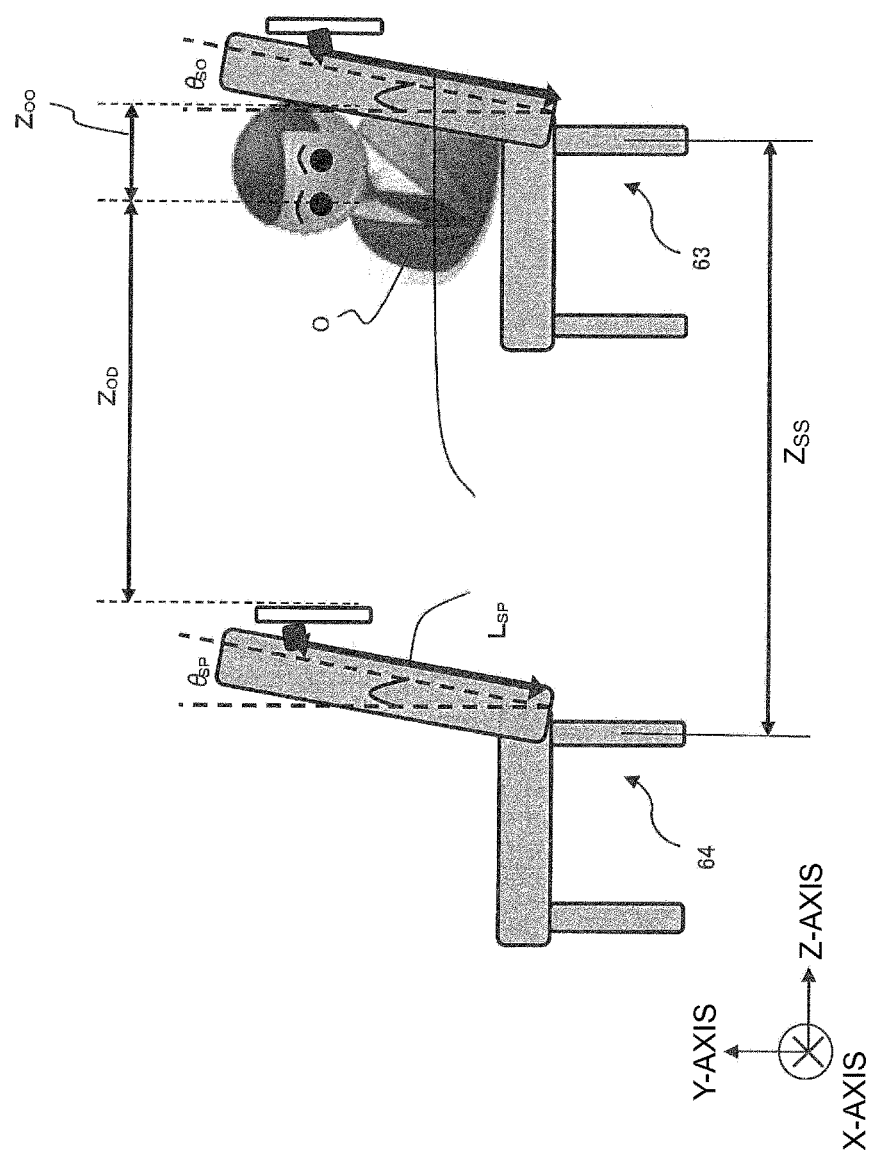
FIG. 18 is a schematic view showing the positional relation between the stereoscopic image display device shown in FIG. 1 and the like placed at a back face part of a seat and the observer.
Figure 19:
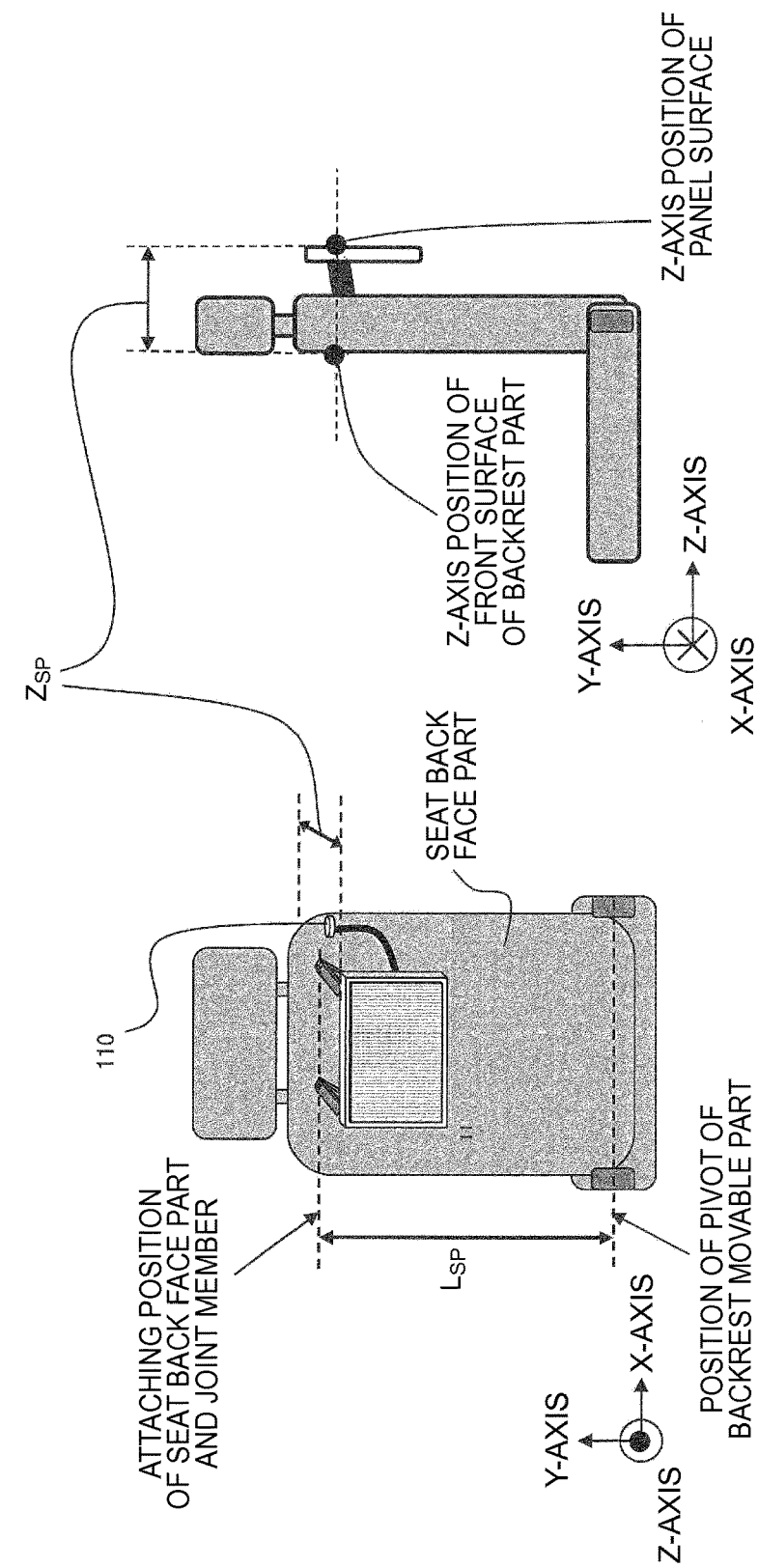

Note here that the seat reference information registered in advance contains the distance information $Z_{SS}$ regarding the placing space between the seat of the observer and the seat in front thereof (see FIG. 18) and the set position information of the stereoscopic image display device 11 placed at the seat back face part (see FIG. 19).

In FIG. 18, the distance information $Z_{SS}$ of the placed space is defined as the distance from the positions of the rear legs of the seat 63 of the observer to the positions of rear legs of the front seat 64 as a way of example.

Further, in FIGS. 19A and 19B showing the set position information, FIG. 19A is an external view of the seat back face part when viewed from the rear side of the seat, and FIG. 19B is an external view of the seat back face part when viewed from the lateral side of the seat.

The set position information is constituted with: the joint member attached length $L_{SP}$ that is from the fulcrum position of a movable part of the backrest part to the attached position of the seat back face part and the joint member; and the backrest width $Z_{SP}$ showing the distance from the position of the display surface of the stereoscopic display panel module 120 in the Z-axis direction to the position of the front face of the backrest part of the seat in the Z-axis direction (backrest width $Z_{SP}$ showing the distance from the position of the display surface of the stereoscopic display panel module 106 in the Z-axis direction at the position in the Y-axis direction which is equivalent to the position of the attached position of the joint member in the Y-axis direction to the position of the front face of the backrest part of the seat in the Z-axis direction at the position in the Y-axis direction which is equivalent to the position of the attached position of the joint member in the Y-axis direction).

In the stereoscopic image display device 11 according to the first exemplary embodiment, the observing distance calculation module 140 can be structured to calculate the observing distance $Z_{OD}$ by following Expression (2) by using the seat reference information $Z_{SS}$, the joint member attached length $L_{SP}$, and the backrest width $Z_{SP}$ registered in advance and the inclined angles $\theta_S$ ($\theta_{SO}$, $\theta_{SP}$) of each of the seat back face parts. Note here that $\theta_{SO}$ shows the inclined angle of the seat 63 of the observer, and $\theta_{SP}$ shows the inclined angle of the front seat, respectively.

(Expression 2)

$$Z_{OD} = Z_{SS} - Z_{SP} + L_{SP}(\sin\theta_{SO} - \sin\theta_{SP}) \quad (2)$$

However, the observing distance $Z_{OD}$ calculated by Expression (2) is the distance from the display surface of the stereoscopic display panel module 120 of the stereoscopic image display device 11 placed at the seat back face part in front of the observer (O) to the front face position of the backrest part of the seat 63 of the observer.

That is, in this observing distance $Z_{OD}$, the distance $Z_{OO}$ from the front face position of the backrest part of the seat where the observer (O) sits down to the positions of the both eyes of the observer (O) is not taken into consideration.

Incidentally, the distance $Z_{OO}$ is almost consistent with the length from the back of the head to the positions of the both eyes of the observer (O). According to the materials of human body measurement database reported in 2006 by Research Institute of Human Engineering for Quality Life as an outsourcing contract of the Ministry of Economy, Trade and Industry, the average value of the length (head length) from the back of the head of a typical observer to the position of the both eyes (the middle of the forehead) is said to be about 19 cm.

Therefore, it is possible to assume that the distance $Z_{OO}$ from the front face position of the backrest part of the seat on which the observer sits down to the position of the both eyes of the observer as about 19 cm (19 cm is employed as the distance $Z_{OO}$), and the observing distance calculating module 140 may calculate the value acquired by subtracting the distance Zoo from the observing distance $Z_{OD}$ calculated by Expression (2) described above as the observing distance.

This makes it possible to acquire the calculated value which corresponds to the observing distance $Z_{OD}$ in FIG. 10 or $Z_{OD}'$ in FIG. 11.

Further, in Expression (2), it is assumed that the height of the eyes (the positions in the Y-axis direction) of the observer (O) coincides with the height of the attached position of the joint member of the stereoscopic image display device 11 (the position in the Y-axis direction) to calculate the observing distance $Z_{OD}$.

Through the above-described processing, the observing distance calculation module 140 can calculate the observing distance (relative distance between the stereoscopic display panel module 120 and the observer) showing the distance between the observer and the stereoscopic image display device 11 in the depth direction.

The display setting adjusting module 170 is a structural member which adjusts the display setting of the stereoscopic images to lighten the influences of 3D crosstalk and pseudoscopic views generated due to inclination of the seat back face part by referring to the observing distance $Z_{OD}$ calculated by the observing distance calculation module 140 and the device characteristic data saved in the device characteristic data saving module 160.

Note here that the device characteristic data within the device characteristic data saving module 160 shows the optical characteristic of the stereoscopic display panel module 120 as described above. An example of the device characteristic data is 3D crosstalk characteristic data shown in FIG. 20.

Figure 20:
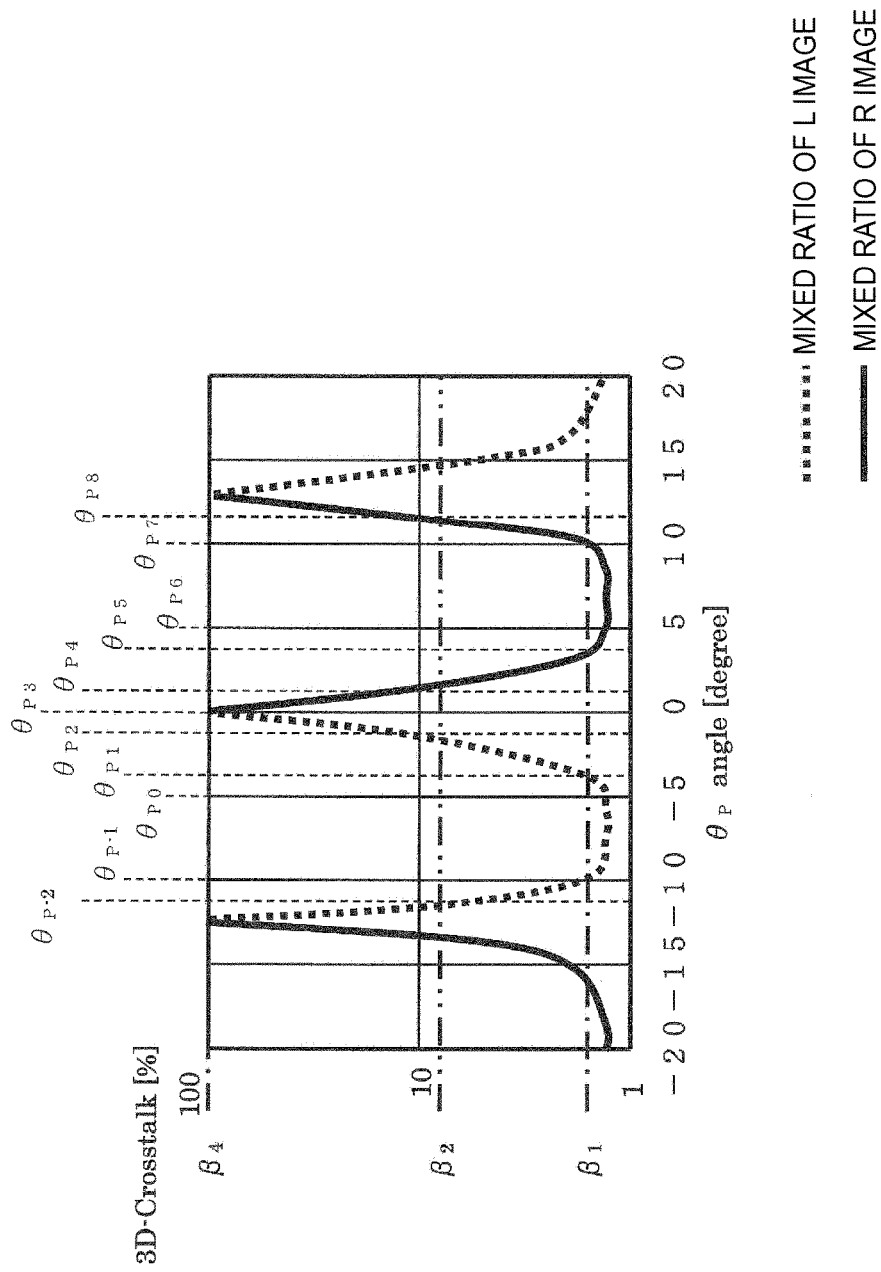
FIG. 20 is a graph showing 3D crosstalk characteristic data.

In FIG. 20, the lateral axis shows the viewing angles $\theta_P$ (degrees), and the longitudinal axis shows the 3D crosstalk amount (%). The 3D crosstalk amount shows the proportion of the left-eye image mixed in the right-eye image, and the ratio of the right-eye image mixed in the left-eye image.

The 3D crosstalk characteristic data takes different values depending on the optical characteristics of the stereoscopic display panel module 120, and it is determined at the time of designing the stereoscopic display panel module 120. Further, it is also possible to acquire the 3D crosstalk characteristic data through measuring the stereoscopic display panel module 120 by a 3D crosstalk evaluation device.

In the stereoscopic image display device 11, the right-eye region, the left-eye region, and the 3D-crosstalk viewing space are determined depending on the 3D crosstalk characteristic data. As an example, when it is defined that the threshold value of the 3D crosstalk amount with which the observer can properly recognize stereoscopic images is $\beta_2$ or less (see long-dashed short-double-dashed line in FIG. 20), the region of viewing angles $\theta_{P-2}$ to $\theta_{P2}$ is the right-eye region, the region of viewing angles $\theta_{P2}$ to $\theta_{P4}$ is the 3D-crosstalk viewing space, and the region of viewing angles $\theta_{P4}$ to $\theta_{P8}$ is the left-eye region.

Figure 21:
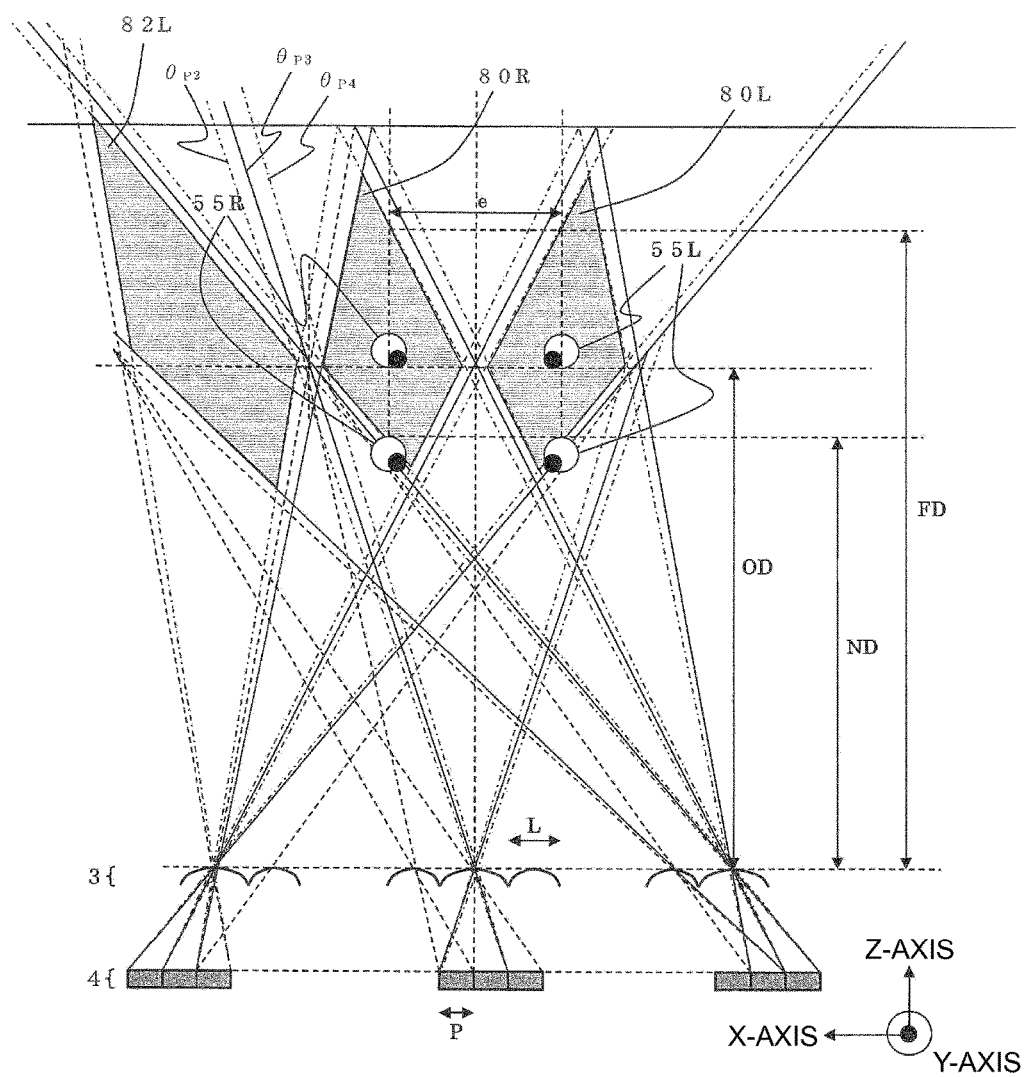

Here, an optical model in which the right-eye image and the left-eye image are projected towards the positions of the both eyes of the observer associated with FIG. 20 is shown in FIG. 21.

In FIG. 21, the part with the viewing angles of $\theta_{P2}$ to $\theta_{P4}$ is the 3D-crosstalk viewing space. Thus, compared to the case of FIG. 6, the right-eye region and the left-eye region to be formed become narrower as in the right-eye region 80R and the left-eye regions 80L, 82L. For the right eye 55R, the right-eye region 80R is the stereoscopic viewing space, the left-eye regions 80L, 82L are the pseudoscopic viewing spaces, and other regions are the 3D-crosstalk viewing spaces.

Figure 22:
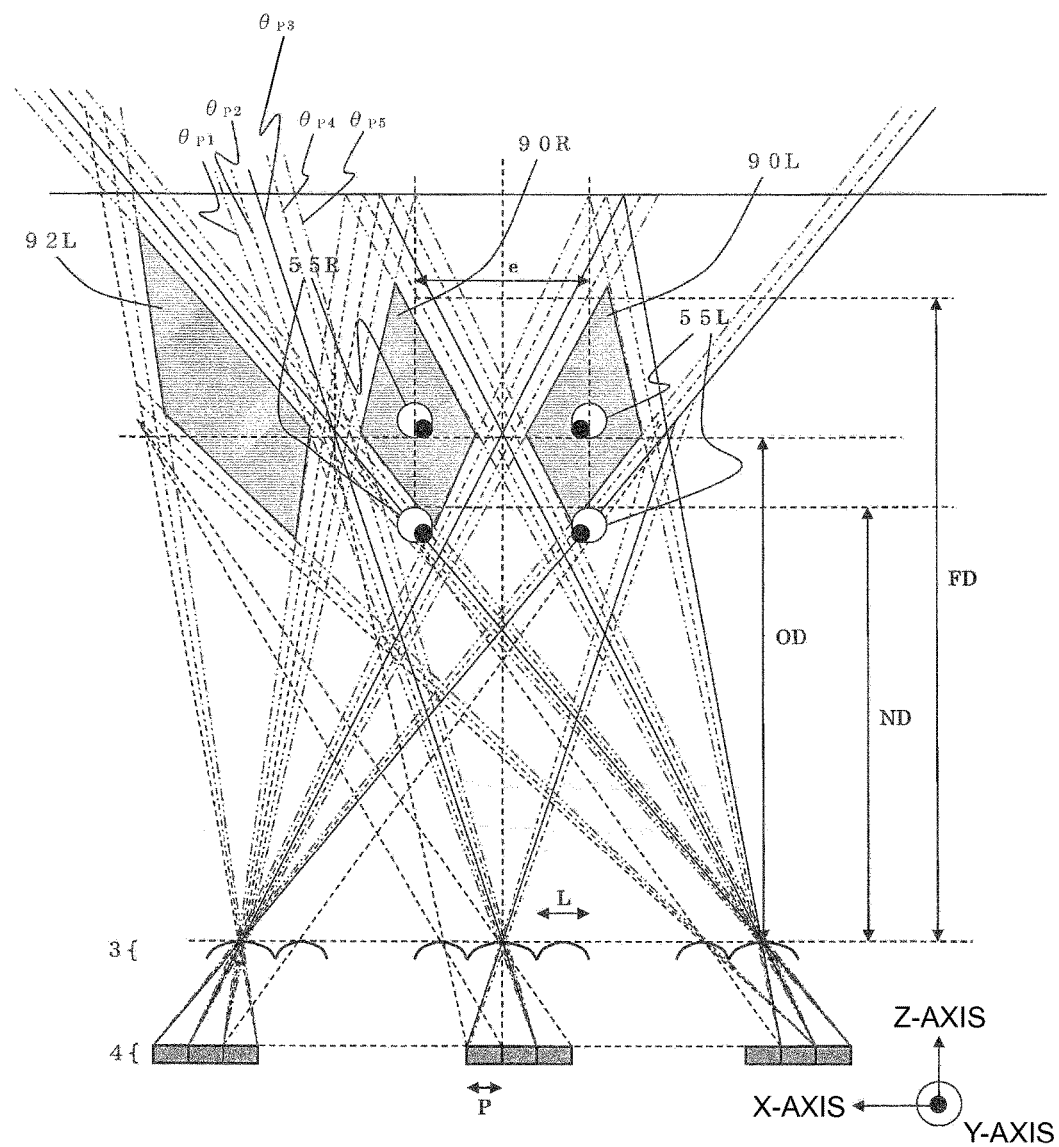

As another example, when it is defined that the threshold value of the 3D crosstalk amount with which the observer can properly recognize stereoscopic images is $\beta_1$ or less (see long-dashed short-double-dashed line in FIG. 20), the region of viewing angles $\theta_{P1}$ to $\theta_{P5}$ is the 3D-crosstalk viewing space, and the regions of other viewing angles $\theta_P$ are the right-eye region or the left-eye region. FIG. 22 shows the optical model of the stereoscopic image display device 11 of such case.

In FIG. 22, the part with the viewing angles of $\theta_{P1}$ to $\theta_{P5}$ is the 3D-crosstalk viewing space. Thus, as the right-eye region and the left-eye region, a right-eye region 90R and left-eye regions 90L, 92L still narrower than the case of FIG. 21 are formed. For the right-eye 55R, the right-eye region 90R is the stereoscopic viewing space, the left-eye regions 90L, 92L are the pseudoscopic viewing spaces, and the other regions are the 3D-crosstalk viewing spaces as in the case of FIG. 6.

As described above, the stereoscopic viewing space, the pseudoscopic viewing space, and the 3D-crosstalk viewing space are determined depending on the 3D crosstalk characteristic data.

The threshold value of the 3D crosstalk amount can be determined based on the optical measurement of the stereoscopic image display device 11 and a subjective evaluation.

Further, as the devices capable of optically measuring the 3D crosstalk, there are measuring devices which employ various kinds of types such as a conoscope type, a goniometer type, and a Fourier type, for example. With such measuring devices, it is possible to measure the luminance distribution with respect to the viewing angles and to calculate the 3D crosstalk amount by using following Expression (3).

(Expression 3)

$$3D - CT(\theta_P) = \frac{Y(LBRW) - Y(LBRB)}{Y(LWRB) - Y(LBRB)} \quad (3)$$

Note here that 3D-CT ($\theta_P$) shows the 3D crosstalk amount with respect to the viewing angles $\theta_P$. Further, Y (LBRW), Y (LBRB), and Y (LWRB) show luminance values with respect to the viewing angles $\theta_P$. Y (LBRW) is the luminance value when the left-eye image is black and the right-eye image is white, Y (LBRB) is the luminance value when the left-eye image is black and the right-eye image is black, and Y (LWRB) is the luminance value when the left-eye image is white and the right-eye image is black.

There is no large difference observed in the qualitative results when the measuring devices of any of the above-described types are used for measurements. However, the quantitative values vary depending on the measuring methods and device specifications. Collating the general measurement results with the subjective stereopsis region evaluation results, it can be found that stereoscopic images can be visually recognized when the 3D crosstalk is about 10% or less. Thus, this value can be used as the threshold value of the 3D crosstalk amount.

With the optical model shown in FIG. 21, when the observing distance $Z_{OD}$ is equivalent to the optimal visible distance OD, the observer can visually recognize proper stereoscopic images. However, when the observing distance $Z_{OD}$ becomes shorter than the minimum visible distance ND due to inclination of the seat back face part, the observer visually recognizes a CT-image, so that proper stereoscopic images cannot be visually recognized.

Incidentally, regarding the stereoscopic display panel modules 120, individual differences are generated in the device characteristic data showing the optical characteristics due to manufacture variations. Variations generated at the time of manufacture is mainly resulted from the position shift when laminating the liquid crystal display panel to be the electro-optic module of the stereoscopic display panel module 120 with the lenticular lens to be the optical separating module.

However, when the position shift amount is equal to or less than a prescribed allowable value ($\pm\Delta\theta_{LIM}$), it is possible to use equivalent, i.e., typical, device characteristic data instead even though it is not identical with the device characteristic data peculiar to the stereoscopic display panel module 120. Note here that the device characteristic data corresponding to the stereoscopic display panel module 120 and the devices equivalent to that, which can be employed to the first exemplary embodiment and each of the following exemplary embodiments, will be referred to as "the device characteristic data regarding the stereoscopic display panel module 120".

As an example, FIGS. 23A-23D show optical models in which the light-ray direction projected from the center position of the stereoscopic display panel module 120 is inclined due to variations generated at the time of manufacture.

Figures 23A, 23B, 23C:
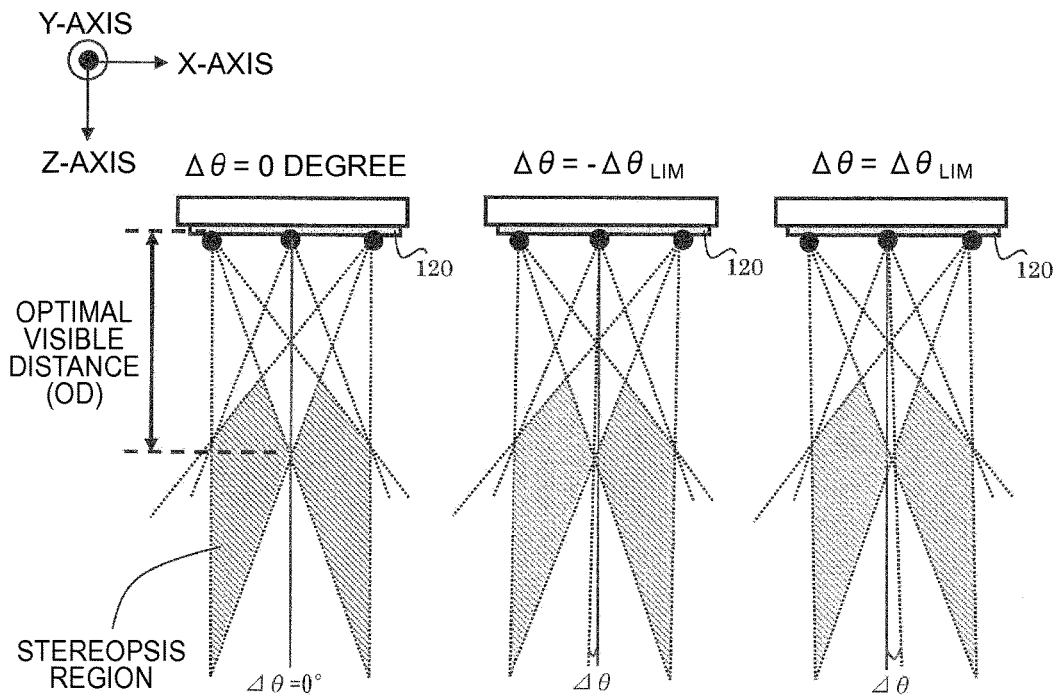

FIG. 23A shows an optical model of a case where there is no position shift and the light ray is projected to the front direction ($\Delta\theta$=0 degree). FIG. 23B shows an optical model of a case where the light-ray direction is inclined to a prescribed allowable value $-\Delta\theta_{LIM}$ ($\Delta\theta$=$-\Delta\theta_{LIM}$) due to the position shift, and FIG. 23C shows an optical model of a case where the light-ray direction AO is inclined to a prescribed allowable value $\Delta\theta_{LIM}$ ($\Delta\theta$=$\Delta\theta_{LIM}$) which is the opposite direction.

Figure 23D:
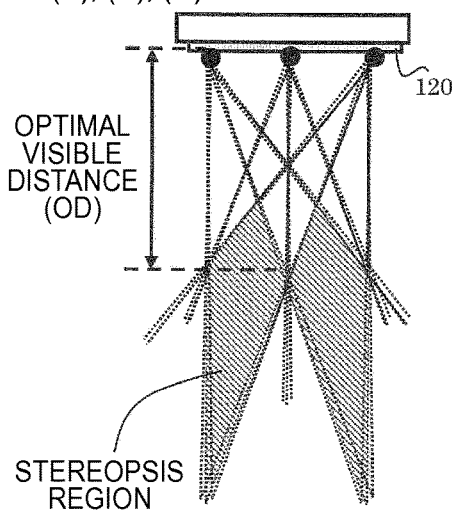

Further, FIG. 23D shows an optical model in which the results of FIGS. 23A, 23B, and 23C are superimposed. From FIG. 23D, it can be seen that the optimal visible distance OD and the stereopsis region of the stereoscopic display panel module 120 become almost equivalent when the manufacture variation is equal to or less than the prescribed allowable value ($\pm\Delta\theta_{LIM}$). The value of $\pm\Delta\theta_{LIM}$ to be the allowable value can be set arbitrarily by subjective evaluations according to the size of the stereoscopic display, the size of the stereopsis region, and the types of application to be applied.

Therefore, through saving the typical device characteristic data of the stereoscopic display panel 120 such as the result of FIG. 23A, for example, in the device characteristic data saving module 160, the device characteristic data can be used for the other stereoscopic display panel modules 120 that are the same types.

Figure 24:
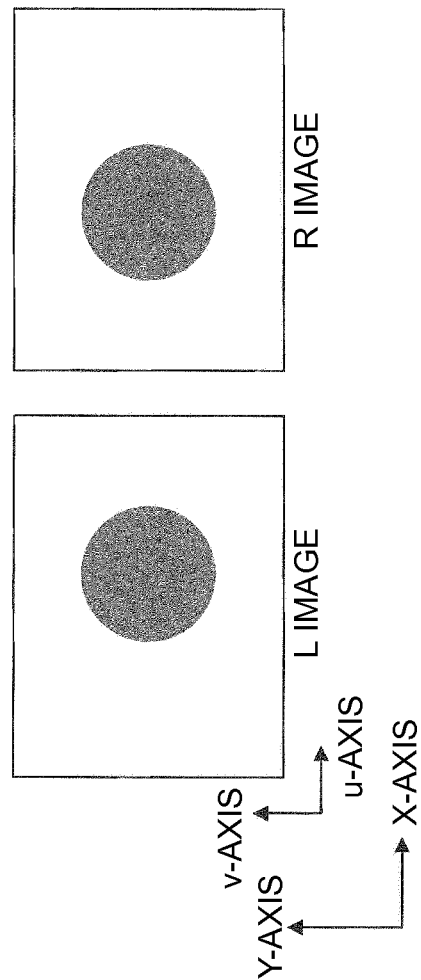

The image data saving module 150 has a function which saves or receives image data. Here, an example of image data saved in the image data saving module 150 is shown in FIG. 24.

In this example, an L image and an R image are saved in the image data saving module 150 as the image data of stereoscopic image contents. The L image is a left-eye image which is projected to the left-eye region, and the R image is a right-eye image which is projected to the right-eye region. Luminance values (RGB values) are kept as the values of each pixels regarding LR images (both the L image and the R image), and the LR images are displayed on the stereoscopic display panel module 120.

Note here that the u-axis direction of the image data coincides with the X-axis direction of the display coordinate system of the stereoscopic image display device 11, and the v-axis direction coincides with the Y-axis direction of the display coordinate system.

Figure 25:
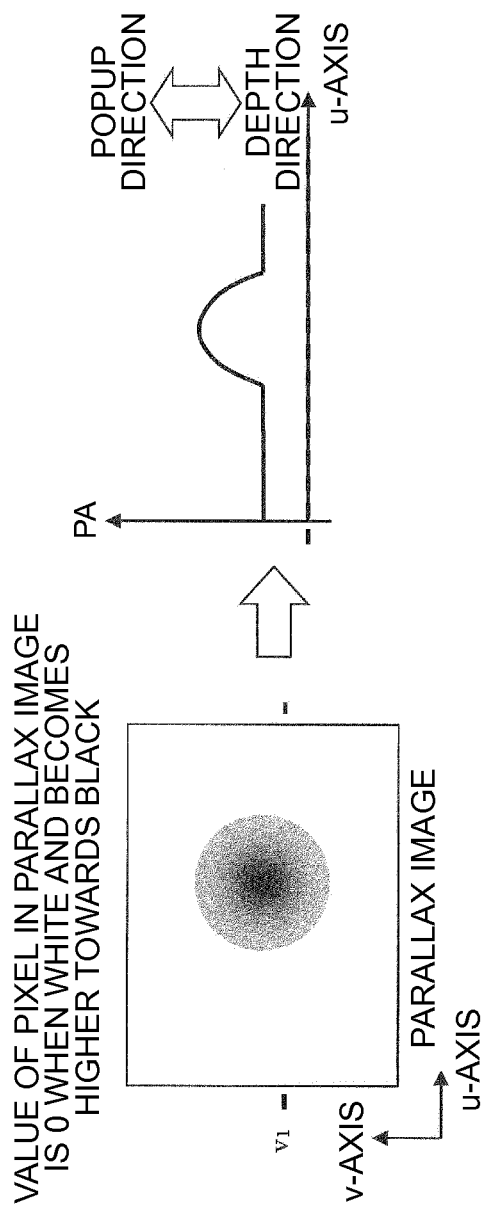
FIG. 25 is an explanatory chart regarding parallax images.

In the above, described is the case of saving the L image and the R image in the image data saving module 150. However, it is also possible to employ a structure in which a parallax image showing a parallax value between the L image and the R image is saved in addition to those images. FIG. 25 shows the relation between the parallax image and the parallax value.

The right chart of FIG. 25 shows a parallax value PA of a pixel sequence which is a sequence of pixels of arbitrary value v1 on the v-axis taken out from the parallax image (the left chart of FIG. 25). Note here that the parallax value PA shows the shift amount of the positions of the pixels of the R image with respect to the positions of the pixels of the L image by taking the L image as the reference.

Figure 26:
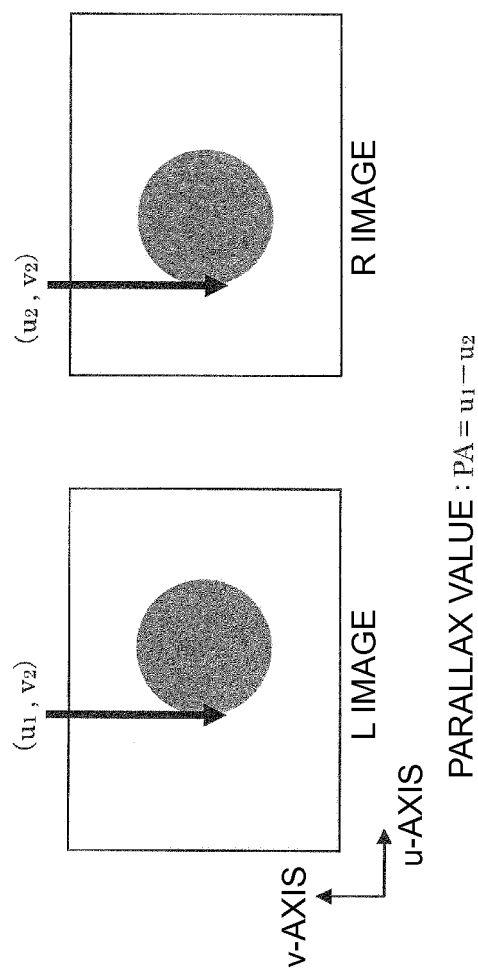
FIG. 26 shows a relational chart between image data and parallax values.

As a specific example, FIG. 26 shows a relational chart regarding the parallax value and the LR images.

As shown in following Expression 4, the parallax value PA at the position $(u_1, v_1)$ of the parallax image is a difference value between the position $(u_1, v_2)$ of the pixel of the L image and the position $(u_2, v_2)$ of the pixel of the R image corresponding thereto.
(Expression 4)

$$PA = u_1 - u_2 \quad (4)$$

Note here that the parallax image may be generated based on the parallax value acquired by detecting feature points of the L image and the R image, matching the feature points of the R image corresponding to the feature points of the L image, and calculating the parallax value from the position shift amount of those feature points.

Further, a depth image may be used instead of using the parallax image. The depth image is an image in which values of each of the pixels show the depth distance of the stereoscopic image contents.

In addition, a plurality of LR images having various parallax values may be saved in advance in the image data saving module 150. An example of the LR image group having parallax values saved in the image data saving module 150 is shown in FIG. 27.

Figure 27:
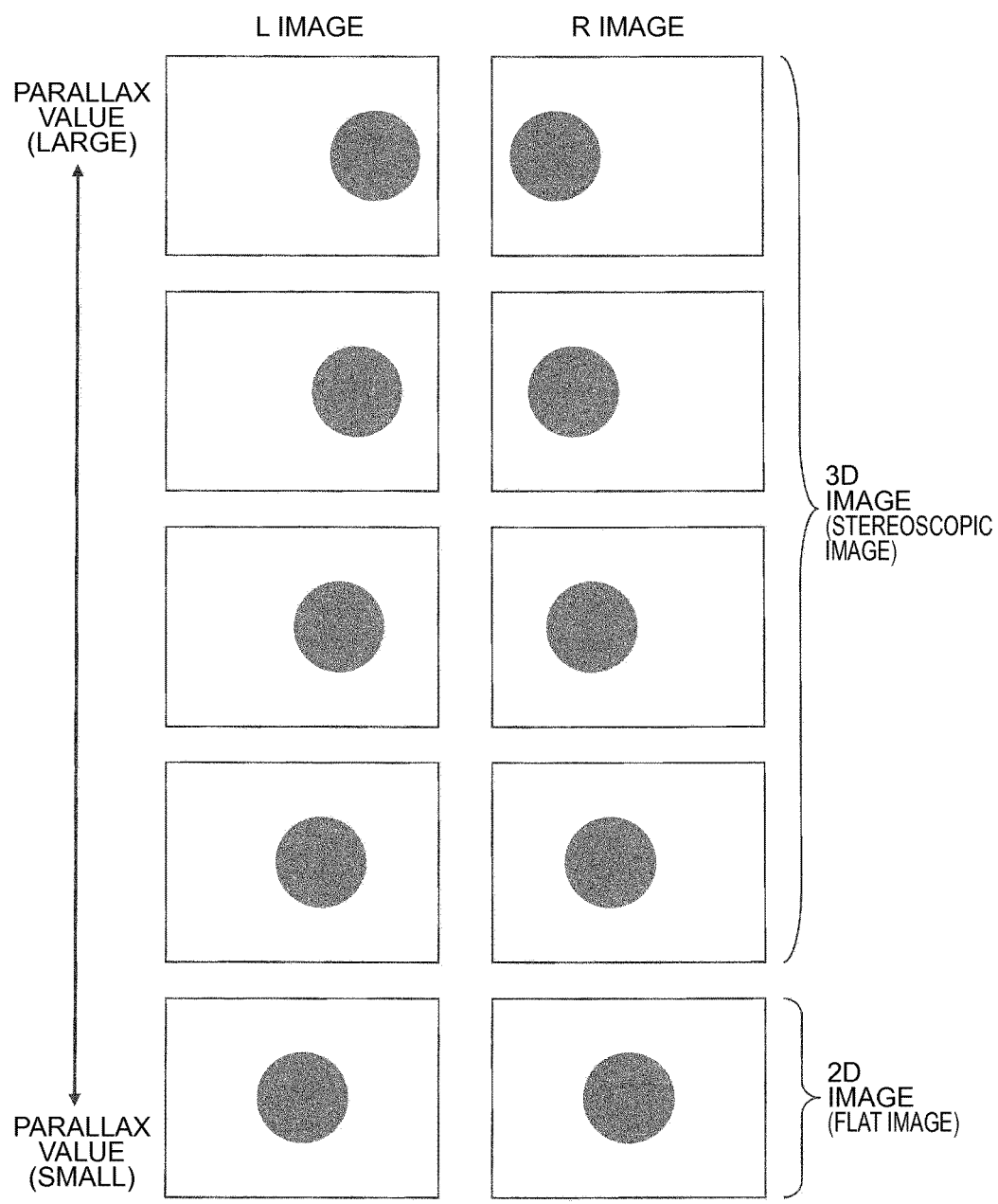
FIG. 27 shows a sample of image data group of various parallax values.

The LR images on the uppermost section of FIG. 27 show the LR images having a parallax value originally held by the stereoscopic image contents. The LR images on the lowermost section of FIG. 27 show the LR images having "0" parallax value (L and R images are same images, thereby showing a flat image). Further. The LR image group in the middle section of FIG. 27 is an LR image group adjusted to have arbitrary parallax values.

Through saving the LR image group having various parallax values in advance in the image data saving module 150, it is possible to display LR images having an arbitrary parallax value instantly.

The display setting adjusting module 170 is a structural member for adjusting the display setting of the stereoscopic image display device 11 by referring to the observing distance $Z_{OD}$ calculated by the observing distance calculation module 140 and the device characteristic data saved in the device characteristic data saving module 160 in order to lighten the influences of 3D crosstalk and pseudoscopic views generated in accordance with inclination of the seat back face part so as to be able to display fine stereoscopic images on the display surface of the stereoscopic display panel module 120.

In the first exemplary embodiment, different display setting adjusting processing is performed for a case where the optical separation characteristic of the optical separating module provided to the stereoscopic display panel module 120 can be changed dynamically and for a case where the optical separation characteristic is static and cannot be changed.

Here, FIG. 28 shows a classified table (Classified Table I) of the adjusting methods that can be employed for the cases where the optical separation characteristic is changeable/unchangeable. An element which makes it possible to dynamically change the optical separation characteristic of the optical separating module of the stereoscopic display panel 120 is called an active element, and an element whose optical separation characteristic is static and unchangeable is called a static element.

In the case where the optical separation characteristic of the optical separating module of the stereoscopic display panel 120 can be dynamically changed, the display setting adjusting processing in accordance with the observing distance $Z_{OD}$ can be performed by changing the optimal visible distance OD through changing the optical separation characteristic by the display setting adjusting module 170.

An example of the optical separating module using the active element is a liquid crystal lens. The liquid crystal lens is capable of controlling the distribution of the refractive index within the liquid crystal lens by controlling the voltage, and the lens power can be changed thereby. That is, the display setting adjusting module 170 can change the optical model formed by the stereoscopic display panel module 120 by controlling the voltage and can change the optimal visible distance OD arbitrarily.

Note here that the lens power shows the degree of condensing or dispersing the light rays by the optical element, which means the refraction power for bending the travelling direction of the light rays by the lens. When the lens power is strong, the light rays are refracted greatly so that the focal distance of the lens becomes short.

As described, the display setting adjusting module 170 is structured to change the optimal visible distance OD by changing the lens power to perform display setting adjusting processing in accordance with the observing distance $Z_{OD}$.

This state will be described by referring to FIG. 29 and FIG. 30 which show the stereoscopic display panel module 120 that is provided with a liquid crystal lens 120A and a display panel 120B.

In the examples shown in each of the charts, control electrodes $E_1$ to $E_4$ are placed on the top surface of the liquid crystal lens 120A, and a common electrode $E_0$ is placed on the bottom surface.

Note here that the control electrodes $E_1$ to $E_4$ on the top surface and the common electrode $E_0$ on the bottom surface may be placed in an exchanged manner. That is, it is possible to employ a structure in which the common electrode $E_0$ is placed on the top surface of the liquid crystal lens 120A and the control electrodes $E_1$ to $E_4$ are placed on the bottom surface.

Figure 29:
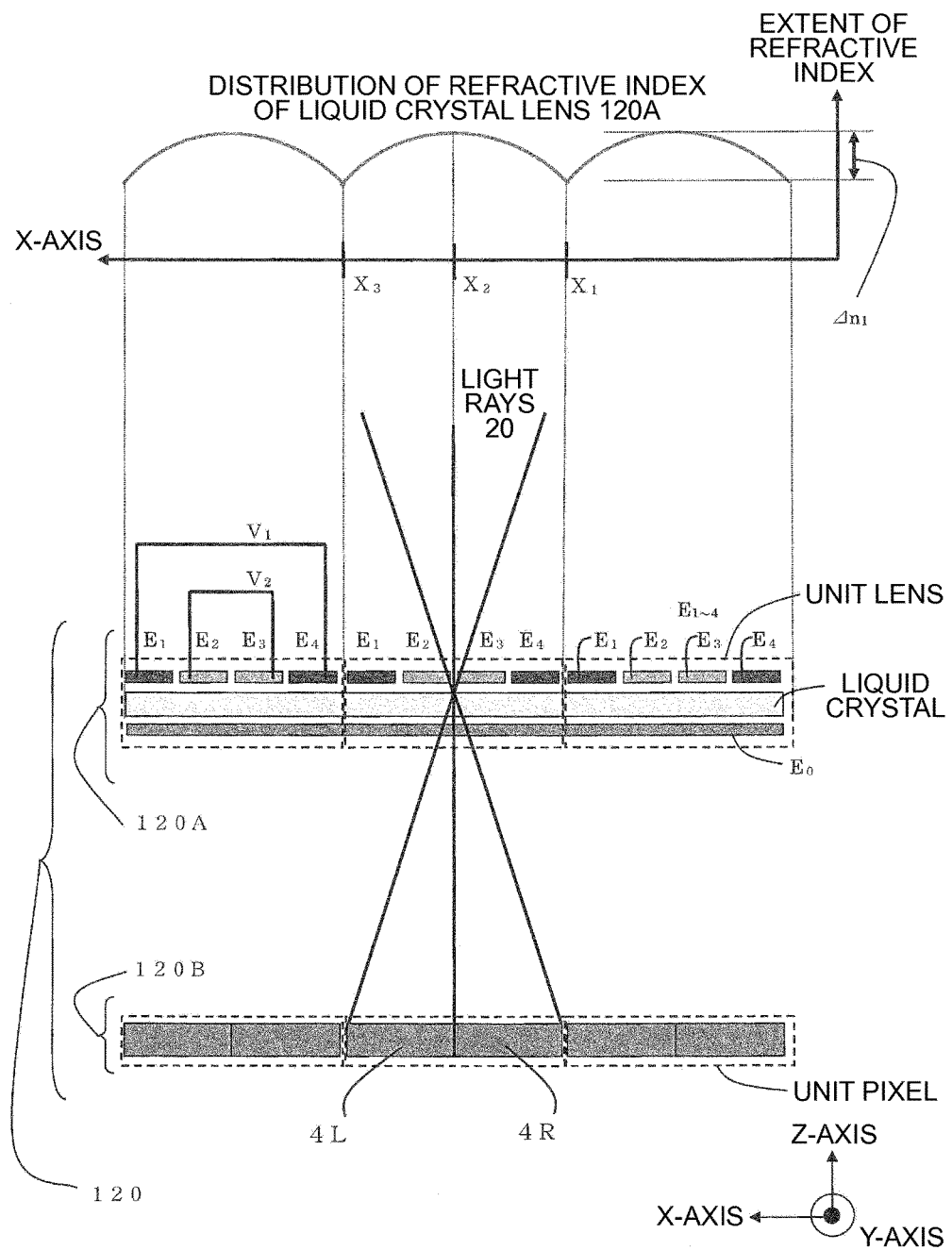
FIG. 29 is a chart showing the sectional view of the stereoscopic display panel when an applied voltage to a control electrode is low and showing a refractive index distribution of a liquid crystal lens in the X-axis direction out of a chart showing the effect of voltage control of the liquid crystal lens.
Figure 30:
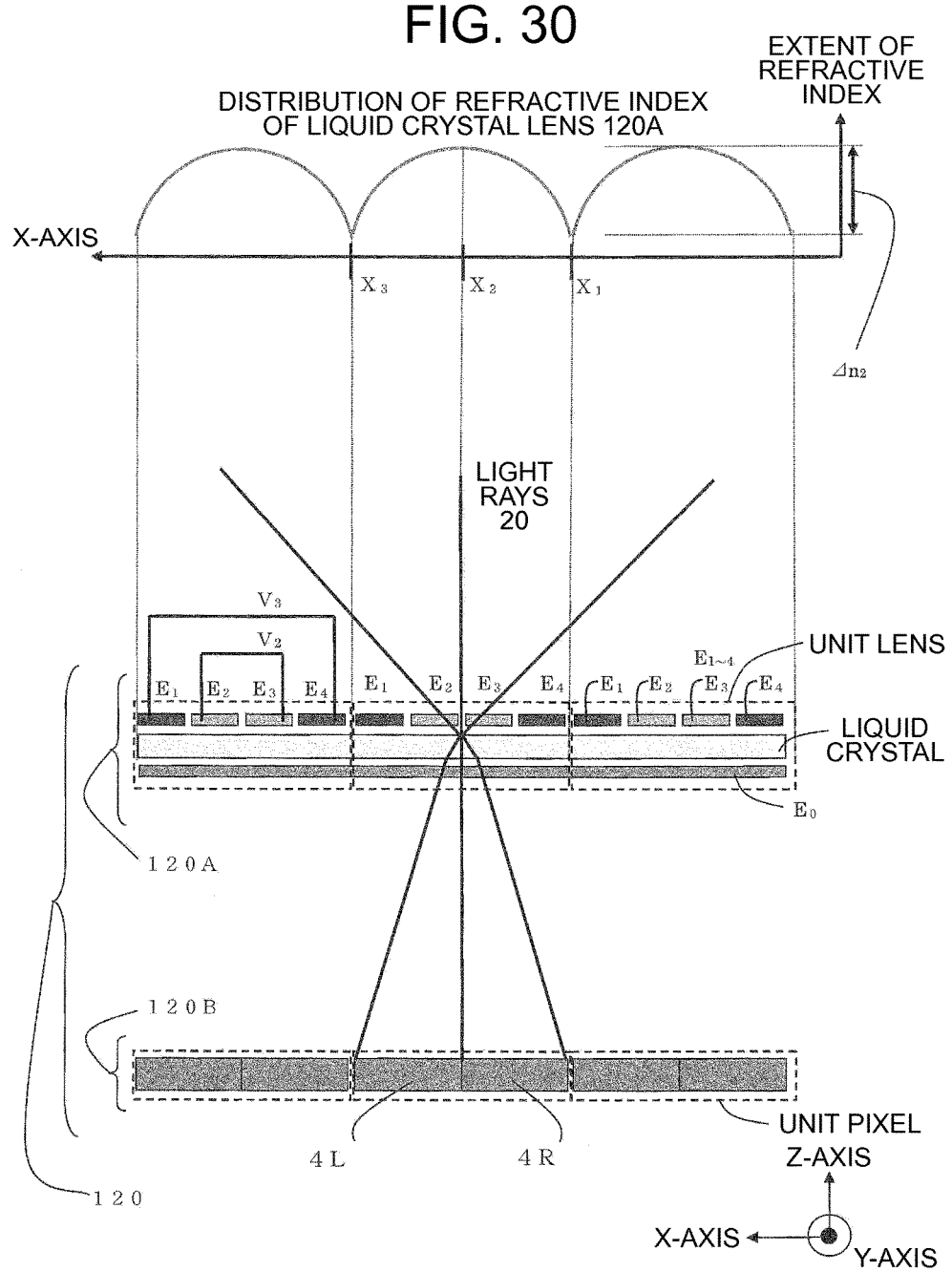
FIG. 30 a chart showing the sectional view of the stereoscopic display panel when an applied voltage to a control electrode is high and showing a refractive index distribution of a liquid crystal lens in the X-axis direction out of a chart showing the effect of voltage control of the liquid crystal lens.

The control electrodes are constituted with four kinds of electrodes ($E_1$, $E_2$, $E_3$, $E_4$) as shown in FIG. 29 and FIG. 30, and different voltages can be applied to each of the electrodes ($E_1$ to $E_4$). The refractive index of the liquid crystal lens changes according to the applied voltage value. Therefore, the display setting adjusting module 170 controls the voltage value applied to the control electrodes $E_1$ to $E_4$ so as to control the distribution of the refractive index of the liquid crystal lens to achieve the lens power changing processing.

Conditions for applying voltages to the control electrodes are different between FIG. 29 and FIG. 30, and the voltage value to be applied to the control electrodes in FIG. 30 is higher than that of FIG. 29. Further, the lower sections of each of those drawings show the sectional structures of the stereoscopic display panel module 120, and the upper sections of each of those drawings show the distribution of the refractive index of the liquid crystal lens 120A in the X-axis direction.

First, FIG. 29 shows a state of the light rays of the stereoscopic display panel module 120 under a condition where the voltage $V_1$ is higher than the voltage $V_2$ (voltage $V_1$>voltage $V_2$), i.e., the voltage $V_1$ is applied to the control electrodes $E_1$, $E_4$ and the voltage $V_2$ is applied to the control electrodes $E_2$, $E_3$, respectively (the lower section), and the refractive index in the X-axis direction (the upper section).

The difference between the maximum refractive index corresponding to the lens vertex part (position $X_2$ in the upper section) and the minimum refractive index corresponding to the lens valley part (positions $X_1$, $X_3$ in the upper section) corresponds to the lens power, and it is the value of $\Delta n1$ in FIG. 29.

Further, a unit lens shows the lens part from the position corresponding to the lens valley part to the position corresponding to the next lens valley part (e.g., from the position $X_1$ to the position $X_3$).

Next, FIG. 30 shows a state of the light rays of the stereoscopic display panel module 120 under a condition where the voltage $V_3$ that is higher than the voltage $V_1$ (FIG. 29) is applied to the control electrodes $E_1$, $E_4$ and the voltage $V_2$ is applied to the control electrodes $E_2$, $E_3$, respectively (the lower section) and the refractive index in the X-axis direction (the upper section).

The lens power that is the difference between the maximum refractive index and the minimum refractive index under such condition has a value of $\Delta n2$ that is larger than $\Delta n1$ shown in FIG. 29.

Through increasing the lens power by the control of the voltage to largely refract the light rays 20 as shown in the sectional view in the lower section, it is possible to shorten the optimal visible distance OD.

Examples of the optical model corresponding to the voltage control of the liquid crystal lens are shown in FIGS. 31A and 31B.

FIG. 31A shows an optical model of a case where the optimal visible distance OD of the stereoscopic display panel module 120 becomes $OD_1$. Further, FIG. 31B shows an optical model of a case where the optimal visible distance is shortened from $OD_1$ to $OD_2$ through increasing the lens power by performing voltage control of the liquid crystal lens as described in FIG. 30. Note, however, that the adjusting range of the lens power of the liquid crystal lens by performing voltage control is limited so that the adjusting range of the optimal visible distance OD also takes a limited value.

Figure 32:
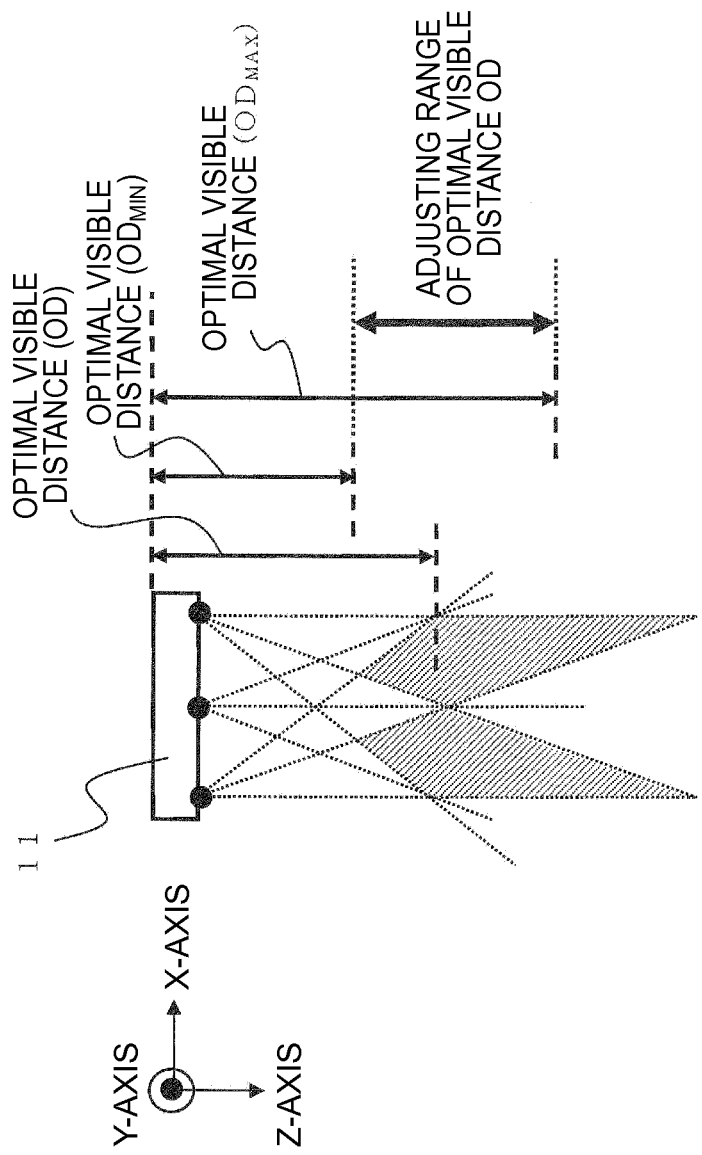
FIG. 32 is a chart showing an adjusting range of the optimal visible distance by the changes in the refractive index of the liquid crystal lens.

Next, an example of the adjusting range of the optimal visible distance OD is shown in FIG. 32.

In FIG. 32, the optimal visible distance ($OD_{MIN}$) shows the distance when the optimal visible distance is set to be the shortest by increasing the lens power of the liquid crystal lens to the maximum by performing voltage control. Further, the optimal visible distance ($OD_{MAX}$) shows the distance when the optimal visible distance is set to be the longest by decreasing the lens power by performing voltage control.

Thus, the adjusting range of the optimal visible distance OD is the range between the shortest optimal visible distance ($OD_{MIN}$) and the longest optimal visible distance ($OD_{MAX}$) as shown in FIG. 32.

In the display setting adjusting processing done by the display setting adjusting module 170, the lens power of the liquid crystal lens is changed by performing voltage control so that the observing distance $Z_{OD}$ calculated by the observing distance calculation module 140 and the optimal visible distance OD become equivalent.

As the liquid crystal lens used for the stereoscopic display panel module 120, it is desirable to select the liquid crystal lens having the lens power that is capable of adjusting the optimal visible distance OD of the stereoscopic display panel module 120 by calculating the fluctuation range of the observing distance $Z_{OD}$ in accordance with inclination of the seat back face part in advance even when the observing distance $Z_{OD}$ changes within the fluctuation range.

As described, through controlling the refraction index distribution of the liquid crystal lens, it is possible to adjust refraction of light rays and the optimal visible distance. Further, through adjusting the refraction of light rays and the optimal visible distance, the range of stereopsis regions can be adjusted.

In the above, the case of changing the optimal visible distance OD by using the liquid crystal lens as the optical separating module of the stereoscopic display panel module 120 is described. However, it is also possible to employ a structure in which the optical separation characteristic is dynamically changed by using a parallax barrier whose barrier pitch is changeable instead of using the liquid crystal lens.

For example, a barrier (light-shielding plate) of a barrier pitch sufficiently smaller than the pixel pitch is provided for the parallax barrier, the position of the barrier by which the light ray is blocked, and the positions of the slits 6a shown in FIG. 5 are changed to change the optimal visible distance OD.

As described above, in the display setting adjusting processing using the liquid crystal lens, the parallax barrier, or the like with which the optical separation characteristic can be dynamically changed, the display setting of the stereoscopic image is adjusted in accordance with the observing distance $Z_{OD}$ through changing the optical separation characteristic of the stereoscopic display panel module 120 and the optimal visible distance OD.

Next, in a case where the optical separation characteristic of the optical separation module of the stereoscopic display panel module 120 is static and unchangeable, the display setting is adjusted by the display setting adjusting module 170 in accordance with the observing distance $Z_{OD}$ through changing the parallax value PA of the image data (L image and R image) to be displayed on the stereoscopic display panel module 120.

Examples of the optical separation module using the static element whose optical separation characteristic is static and unchangeable are a lenticular lens whose lens power cannot be changed, a parallax barrier whose barrier pitch cannot be changed, and the like.

The content of specific parallax value PA changing processing done by the display setting adjusting module 170 is to calculate the parallax limit value (parallax allowable value $PA_{th}$) with which stereoscopic images can be displayed by referring to the observing distance $Z_{OD}$ calculated by the observing distance calculation module 140 and the 3D crosstalk characteristic data saved in the device characteristic data saving module 160 and to change the parallax value PA of the image data to be equal to or less than $PA_{th}$.

Figure 33:
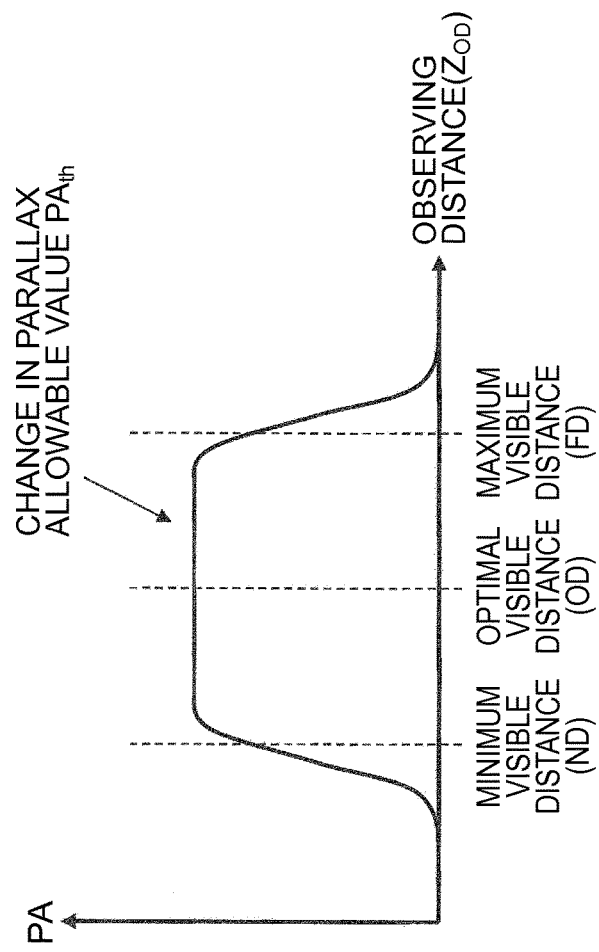
FIG. 33 is a relational graph showing parallax allowable values for the observing distance.

Here, an example of changes in the parallax allowable value $PA_{th}$ corresponding to the observing distance $Z_{OD}$ is shown in FIG. 33.

The value of the parallax value $PA_{th}$ increases when the observing distance $Z_{OD}$ is in the vicinity of the optimal visible distance OD. Inversely, the value of the parallax allowable value $PA_{th}$ decreases when the observing distance $Z_{OD}$ becomes far from the optimal visible distance OD. Therefore, the parallax value PA of the image data to be transmitted to the stereoscopic display panel module 120 is changed in accordance with the change in the parallax allowable value $PA_{th}$.

Specifically, first, the parallax allowable value $PA_{th}$ and the parallax maximum value $PA_{max}$ of the image data are compared. When the parallax maximum value $PA_{max}$ of the image data is larger than the parallax allowable value $PA_{th}$, the parallax adjustment value $PA_C$ is calculated by following Expression (5).

(Expression 5)

$$PA_C = \frac{PA_{th}}{PA_{max}} \quad (5)$$

Next, through multiplying the calculated parallax adjustment value $PA_C$ to the parallax value PA of the image data, the parallax value PA of the image data is changed so that the parallax maximum value $PA_{max}$ of the image data becomes equal to or less than the parallax value $PA_{th}$.

Thereby, the parallax value PA of the stereoscopic image data to be displayed can be adjusted by using the parallax adjustment value $PA_C$ calculated in accordance with the change in the observing distance $Z_{OD}$, e.g., as the observing distance $Z_{OD}$ becomes far from the optimal observing distance OD, the image data of more decreased parallax value PA is displayed on the stereoscopic display panel module 120.

Note that the details of the display setting adjusting processing for changing the parallax value PA of the image data by referring to the 3D crosstalk characteristic data and the observing position are disclosed in the technique of Patent Document 7 mentioned above.

As shown in the classified table of FIG. 28, the display setting adjusting processing for changing the parallax value PA of the image data can also be applied to the case of using the optical separation module (liquid crystal lens and the like) capable of dynamically changing the optical separation characteristic.

As described, through changing the parallax value of the stereoscopic image data in accordance with the observing position, it is possible to lighten the influences of the 3D crosstalk and pseudoscopic views so as to decrease a sense of discomfort felt by the observer.

Subsequently, the condition under which 3D moiré is generated will be described by referring to FIG. 34 and FIGS. 35A and 35B.

First, an example of luminance-viewing angle characteristic data of the stereoscopic display panel module 120 will be described by referring to FIG. 34 and FIGS. 35A and 35B. In the luminance-viewing angle characteristic data, the lateral axis shows the viewing angles $\theta_P$, and the longitudinal axis shows the luminance values Y on the display surface of the stereoscopic display panel module 120.

Figure 34:
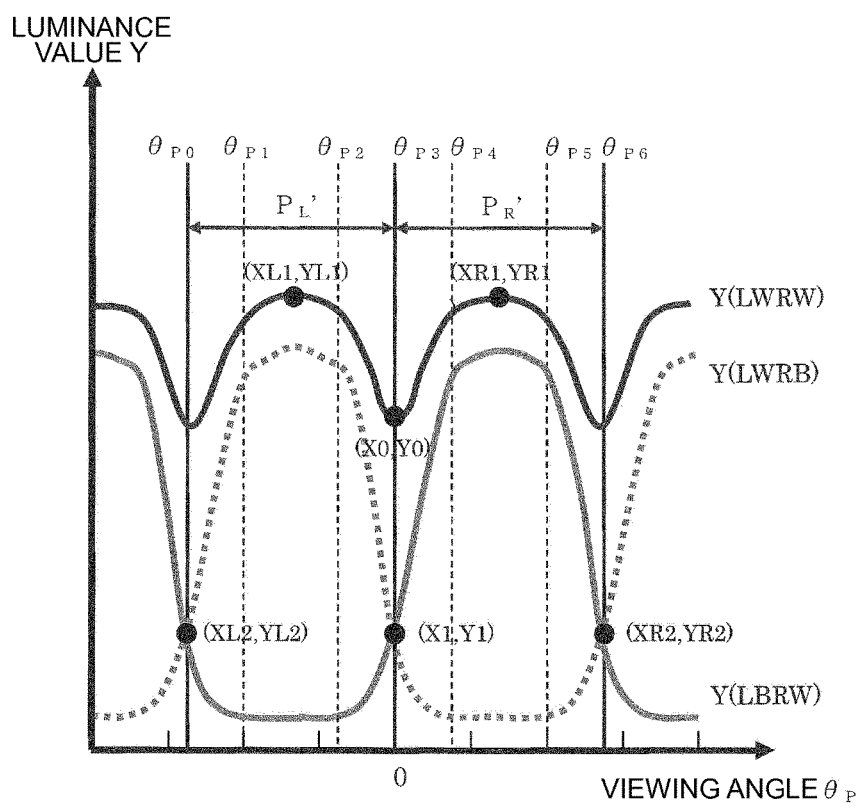
FIG. 34 is a chart showing luminance-viewing angle characteristic data of the stereoscopic display panel.

The luminance distributions of Y (LWRB) and Y (LBRW) in FIG. 34 intersect at the point (X1, Y1) in the vicinity of the viewing angle $\theta_{P3}$ that is the front position of the stereoscopic display panel module 120. Further, those distributions intersect at the point (XR2, YR2) in the vicinity of the viewing angle $\theta_{P6}$, and intersect at the point (XL2, YL2) in the vicinity of the viewing angle $\theta_{P0}$. The space between the point (X1, Y1) and the point (XR2, YR2) in the θ-direction corresponds to the width $P_R{}'$ that is the projection width of the right-eye image, and the space between the point (X1, Y1) and the point (XL2, YL2) in the θ-direction corresponds to the width $P_L{}'$ that is the projection width of the left-eye image.

Here, a decrease in the luminance is observed in the vicinity of the point (X0, Y0), and this luminance decrease is called 3D moiré. In a case where the left eye is located within a range of $\theta_{P1}$ to $\theta_{P2}$ and the right eye is located within a range of $\theta_{P4}$ to $\theta_{P5}$, it is difficult to visually recognize 3D moiré. However, in a case where one of or both of the left and right eyes is located in other ranges (range of $\theta_{P2}$ to $\theta_{P3}$ to $\theta_{P4}$), 3D moiré is visually recognized.

The 3D moiré is likely to be visually recognized when the observer moves into the 3D-crosstalk viewing space. The influence of the 3D moiré exists in the observing distance that shows the distance between the observer and the stereoscopic image display device 11 in the depth direction. The appearing position of luminance unevenness caused by the 3D moiré can be calculated from the luminance-viewing angle characteristic data shown in FIG. 34.

Here, FIGS. 35A and 35B show luminance fluctuation values on the display surface of the stereoscopic display panel module 120 calculated from the luminance-viewing angle characteristic data. Further, FIG. 35A (A: A-1, A-2, A-3) show the condition where stereoscopic images can be recognized properly, and FIG. 35B (B: B-1, B-2, B-3) show the condition where stereoscopic images cannot be recognized properly due to appearance of luminance unevenness caused by 3D moiré.

FIG. 35A(A-1) shows the positional relation between the observing position of the observer (O) and the stereoscopic viewing space of the stereoscopic display panel module 120 in a case where the observing distance $Z_{OD}$ coincides with the optimal visible distance OD. FIG. 35B(B-1) shows the positional relation between the observing position of the observer (O) and the stereoscopic viewing space of the stereoscopic display panel module 120 in a case where the observing distance $Z_{OD}$ changes to $Z_{OD}'$ which is shorter than the minimum visible distance ND due to inclination of the seat back face part so that luminance unevenness caused by 3D moiré appears.

FIG. 35A(A-2) and FIG. 35B(B-2) show luminance fluctuation values corresponding to the position in the horizontal direction (X-axis direction) at a specific Y position on the display surface of the stereoscopic display panel module 120. In each of the charts, the longitudinal axis shows the luminance values on the display surface, and the lateral axis shows the positions on the display surface of the stereoscopic display panel module 120 in the X-axis direction. In FIG. 35A(A-2), the luminance value does not fluctuate in the X-axis direction. In the meantime, in FIG. 35B(B-2), the luminance value fluctuates in the X-axis direction.

FIG. 35A(A-3) and FIG. 35B(B-3) show image display states on the display surface of the stereoscopic display panel module 120 in a case where a white image is displayed. On the display surface of the stereoscopic display panel module 120 shown in FIG. 35A(A-3), a stereoscopic image with no luminance unevenness is displayed. In the meantime, in FIG. 35B(B-3), a stereoscopic image having straight-line luminance unevenness appeared at the X-axis positions at which the luminance value decreases is displayed on the display surface of the stereoscopic display panel module 120.

As a countermeasure taken for the 3D moiré appeared when the observing distance $Z_{OD}$ becomes far from the optimal visible distance OD, it is considered to adjust the display setting of the stereoscopic image display device 11 as in the case of the countermeasure taken for the 3D crosstalk.

For the display setting adjusting processing, different processing for adjusting the display setting is performed for a case where the optical separation characteristic of the optical separation module of the stereoscopic display panel module 120 can be changed dynamically and for a case where the optical separation characteristic is static and unchangeable.

Here, FIG. 36 shows a classified table (Classified Table II) of the adjusting methods that can be employed for the cases where the optical separation characteristic is changeable/unchangeable.

In a case where the optical separation characteristic can be dynamically changed, the display setting adjusting processing is performed in accordance with the observing distance $Z_{OD}$ through changing the optical separation characteristic and changing the optimal visible distance OD as in the case of taking the countermeasure for the 3D crosstalk described above.

In a case where the liquid crystal lens is used for the optical separation module, the countermeasure for 3D moiré may be taken by displaying a flat image through completely setting off the lens power.

Further, in a case where the optical separation characteristic is static and unchangeable, the display setting adjusting processing is performed in accordance with the observing distance $Z_{OD}$ through changing the luminance value of the image data to be displayed on the stereoscopic display panel module 120. In the luminance value changing processing, the luminance fluctuation value of the 3D moiré appearing on the display surface of the stereoscopic display panel module 120 is calculated by referring to the luminance-viewing angle characteristic data. For calculating the fluctuation value of the luminance of the 3D moiré, it is more preferable to consider the observing position including not only the observing distance $Z_{OD}$ (Z-axis direction) but also the position in the X-axis direction.

In the first exemplary embodiment, however, the observing distance $Z_{OD}$ is measured. Thus, it is assumed that the position in the X-axis direction is always fixed, and the luminance fluctuation values by the 3D moiré are calculated only from the luminance—viewing angle characteristic data and the observing distance $Z_{OD}$. Further, through adjusting luminance value of the image data so that the luminance fluctuation values caused by the 3D moiré become flat, the influence of 3D more can be lightened.

Note that the details of the display setting adjusting processing for changing the luminance value of the image data by referring to the luminance-viewing angle characteristic data and the observing position are disclosed in the technique of Patent Document 7 mentioned above.

As described, through changing the luminance value of the stereoscopic image data in accordance with the observing position, it is possible to lighten the influences of the 3D moiré so as to decrease a sense of discomfort felt by the observer.

As shown in the classified table of FIG. 36 (Classified Table II), the display setting adjusting processing for changing the luminance value of the image data can also be applied to the case of using the optical separation module (liquid crystal lens and the like) capable of dynamically changing the optical separation characteristic.

(Explanations of Actions)

Next, contents of image processing actions (a stereoscopic image processing method) of the stereoscopic image display device 11 will be described by referring to the flowchart shown in FIG. 37.

By an operation and the like of the observer, the stereoscopic image display device 11 to which command signals regarding stereoscopic image display are inputted detects the seat state of the observer and the seat state of the front seat thereof first by the movable object state detecting module 110. Each of the seat state herein is the inclined angle of the seat back face part (FIG. 37: step S101).

Then, the observing distance calculation module 140 calculates the observing distance (relative distance between the stereoscopic image display device 11 and the observer) showing the distance between the stereoscopic image display device 11 and the observer in the depth direction. More specifically, referring to the inclined angle (seat state) of the seat back face part of the observer detected by the movable object state detecting module 110 and the inclined state (seat state) of the back face part of the front seat thereof, the observing distance calculation module 140 calculates the observing distance by using the seat reference information (seat setting space distance information, setting position information) registered to itself (FIG. 37: step S102).

Then, the display setting adjusting module 170 acquires the 3D crosstalk characteristic data or the luminance-viewing angle characteristic data as the device characteristic data from the device characteristic data saving module 160.

As described above, an example of the 3D crosstalk characteristic data is shown in FIG. 20, and an example of the luminance-viewing angle characteristic data is shown in FIG. 34, respectively (FIG. 37: step S103).

At the same time, the display setting adjusting module 170 acquires the image data that is the stereoscopic image contents from the image data saving module 150 (FIG. 37: step S104).

Then, the stereoscopic image display device 11 uses the display setting adjusting module 170 to perform display setting adjusting processing in accordance with the observing distance (FIG. 37: step S105) by referring to the observing distance calculated by the observing distance calculation module 140 (step S102 described above) and the device characteristic data acquired from the device characteristic data saving module 160 (step S103 described above).

As the display setting adjusting processing, it is possible to employ: a method which controls the optical separation module of the stereoscopic display panel module 120 so that the observing distance coincides with the optimal visible distance; a method which changes the parallax value and the luminance value of the image data acquired from the image data saving module 150 (step S104 described above) in accordance with the observing distance and the device characteristic data; and the like.

Subsequently, the display setting adjusting module 170 displays the image data acquired from the image data saving module 150 (step S104 described above) on the image display panel of the stereoscopic display panel module 120 according to the display setting adjusted by step S105 described above. That is, the stereoscopic images on which the display setting adjusting processing is completed are displayed to be presented to the observer (FIG. 37: step S106).

Next, it is set whether to stop or to continuously execute the stereoscopic image display processing (FIG. 37: step S107).

For example, the stereoscopic image display processing is stopped when the power of the stereoscopic image display device 11 is turned off or when the observer gives a command to interrupt display of the stereoscopic image (FIG. 37: step S107/Yes).

In the meantime, when there is no event for stopping the stereoscopic image display processing, it is returned to the processing of step S101 described above for continuously executing the stereoscopic image display processing, and the above-described series of processing contents are repeatedly executed (steps S101 to S107).

Through the above-described flowchart processing, it is possible to detect the inclined angle of the seat back face part and calculate the relative distance (observing distance) between the stereoscopic image display device 11 placed at the seat back face part and the observer even when the backrest part of the seat is inclined and the display position of the stereoscopic image display device 11 is moved. Therefore, it is possible to provide the stereoscopic image display device which does not give a sense of discomfort to the observer through lightening the influences of CT-images and pseudoscopic views generated by 3D crosstalk and the influences of 3D moiré only by the use of an inexpensive measuring device.

Further, while the optical models (FIG. 21, FIG. 22) of the stereoscopic display panel module 120 according to the first exemplary embodiment show the case where the two different viewpoint images (L image and R image) are projected from the stereoscopic display panel module 120, the stereoscopic image display device 11 according to the first exemplary embodiment is not limited to the structure having two viewpoints. The stereoscopic image display device 11 can also be applied to the stereoscopic display panel module 120 which projects multiple-viewpoint images.

Note here that it is possible to put the execution contents of each of the above-described steps S101 to S107 (FIG. 37) into programs and to execute each of the series of control programs by a computer that is provided in advance within the stereoscopic image display device 11.

(Effects of First Exemplary Embodiment)

The first exemplary embodiment employs the structure in which the state information regarding the position state of the seat as the movable object (the inclined state of the backrest part and the position of the seats in the front and rear sides) is detected and the display setting of the stereoscopic images is adjusted by using the observing distance calculated based on the state information. This makes it possible to effectively lighten the influences of the CT-images and pseudoscopic views caused by 3D crosstalk and the influences of 3D moiré by an inexpensive structure, so that it is possible to display significant stereoscopic images which do not give a sense of discomfort to the observer.

(Second Exemplary Embodiment)

A second exemplary embodiment of the stereoscopic image display device according to the present invention will be described by referring to FIG. 38 to FIG. 57. Note here that same reference numerals are used for the structural members equivalent to those of the first exemplary embodiment described above, and a common reference numeral (12) is also used for the stereoscopic image display device of the second exemplary embodiment as a general term.

(Entire Structure)

It is the feature of the second exemplary embodiment to employ a structure in which not only the observing distance $Z_{OD}$ from the display surface of the stereoscopic display panel module 120 of the stereoscopic image display device placed at the seat back face part to the observer but also an observing position $P_{OD}$ showing the relative position of the observing position of the observer with respect to the center position of the display surface of the stereoscopic display panel module 120 (including the relative positions in the X-axis direction and the Y-axis direction) is calculated, and display setting of the stereoscopic image display device is adjusted in accordance with the observing position $P_{OD}$ by using an inexpensive image input device (imaging device).

Figure 38:
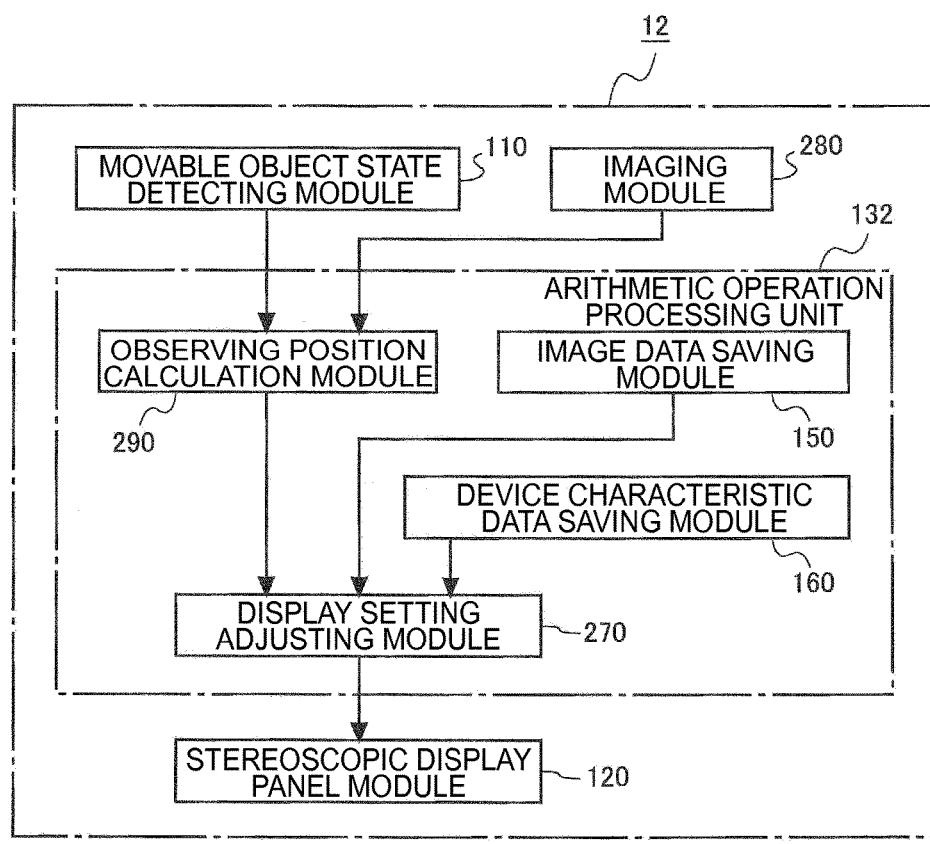
FIG. 38 is a block diagram showing a stereoscopic image display device according to a second exemplary embodiment of the present invention.

As shown in FIG. 38, other than the movable object state detecting module 110 and the stereoscopic display panel module 120, the stereoscopic image display device 12 according to the second exemplary embodiment includes an arithmetic operation processing unit 132 which performs various kinds of arithmetic operation processing and an imaging module 280 which captures the observer and records the image data thereof.

Further, the arithmetic operation processing unit 132 includes: an image data saving module 150; a device characteristic data saving module 160; an observing position calculation module (relative position calculation module) 290 which calculates the observing position $P_{OD}$ showing the relative position of the observing position of the observer with respect to the center position of the display surface of the stereoscopic display panel module 120; and a display setting adjusting module 270 which adjusts the display setting of stereoscopic images based on the observing position calculated by the observing position calculation module 290 and the device characteristic data saved in the device characteristic data saving module 160.

Hereinafter, functions of each of the modules included in the stereoscopic image display device 12 will be described. Note here that the movable object state detecting module 110, the stereoscopic display panel module 120, the image data saving module 150, and the device characteristic data saving module 160 are the same structures as each of the modules to which the same reference numerals are applied in the first exemplary embodiment.

The imaging module 280 has a function which captures the observer and records the image as the captured image data on a two-dimensional plane. An example of a hardware apparatus of the imaging module 280 may be an inexpensive imaging device such as a USB camera, a small-sized camera module inside a mobile apparatus, and the like.

While the first exemplary embodiment employs the structure in which the observing distance $Z_{OD}$ is calculated by assuming that the height of both eyes of the observer coincides with the height of the attaching position of the joint member, the second exemplary embodiment employ a structure in which the imaging module 280 is employed, and the observing position calculation module 290 detects the height of the both eyes of the observer by using the captured image data and calculates the observing distance $Z_{OD}$ by using the height information. Further, the observing position calculation module 290 is structured to calculate the observing position $P_{OD}$ including the relative position in the X-axis direction and the Y-axis direction from the captured image data picked up by the imaging module 280 and the observing distance $Z_{OD}$.

As in FIG. 39 which shows the external view of the stereoscopic image display device 12, the imaging module 280 is placed on the upper part of the front face of the stereoscopic image display device 12 and captures the observer in front of the stereoscopic image display device 12.

Figures 40A, 40B:
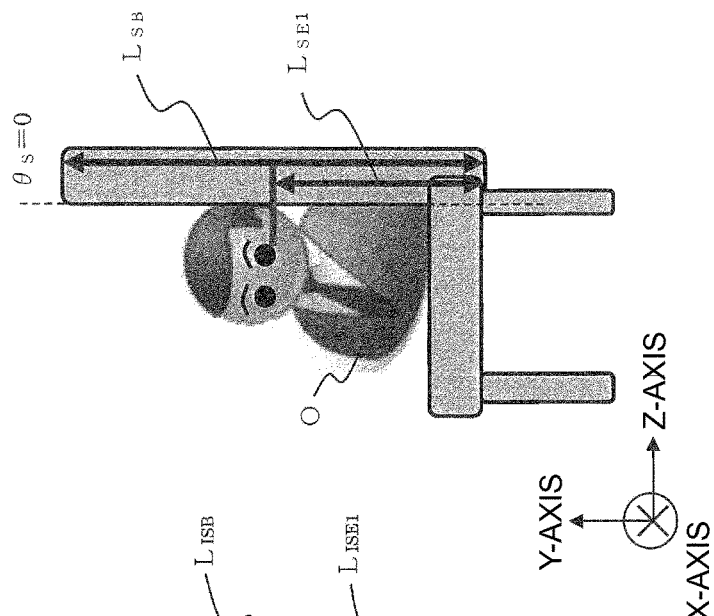
FIGS. 40A and 40B are relational views showing captured image data picked up by an imaging module of the stereoscopic image display device disclosed in FIG. 38 and the seat state.

Next, examples of the captured image data of the observer (O) picked up by the imaging module 280 are shown in FIG. 40A and FIG. 41A.

Further, FIG. 40B shows a state of the observer (O) and the backrest part of the seat at the time of picking up the captured image data of FIG. 40A, and FIG. 41B shows a state of the observer (O) and the backrest part of the seat at the time of picking up the captured image data of FIG. 41A.

That is, FIGS. 40A and 40B are an example in which the length $L_{SE1}$ of the backrest part of the seat corresponding to the height of the both eyes of the observer (O) corresponds to the center position of the entire length $L_{SB}$ of the backrest part of the seat, and FIGS. 41A and 41B are an example in which the length $L_{SE2}$ of the backrest part of the seat corresponding to the height of the both eyes of the observer (O) corresponds to the position at 70% of the entire length $L_{SB}$ of the backrest part of the seat.

In FIG. 40B and FIG. 41B, the inclined angle $\theta_S$ of the seat is 0 degree, and the front face of the backrest part of the seat and the imaging surface of the imaging module 280 are in a parallel state. Note that the u-axis showing the lateral-axis direction of the captured image data coincides with the X-axis direction of the display coordinate system of the stereoscopic image display device 12, and the v-axis showing the longitudinal-axis direction of the captured image data coincides with the Y-axis direction of the display coordinate system.

In the captured image data of FIG. 40A and FIG. 41A, the observer (O) and the backrest part of the seat are captured. The face image region of the observer (O) and the image region of the backrest part of the seat are detected from the captured image data, and the length $L_{SE}$ (length along the backrest from the bottom face of the sitting part to the both eyes of the observer (O) in the second exemplary embodiment) of the backrest part of the seat corresponding to the height of the both eyes of the observer (O) is detected from the entire length $L_{SB}$ of the backrest part of the seat. The length $L_{SE}$ is the length $L_{SE1}$ in FIG. 40B, and it is the length $L_{SE2}$ in FIG. 41B.

The processing for detecting the face image region of the observer from the captured image data is executed by the observing position calculation module 290 by generating template data from feature amounts (eyes, nose, mouth, chin, and the like) of the face image in advance and matching the captured image data with the template data.

In the detecting processing, the observing position calculation module 290 detects the image positions (u-axis position and v-axis position) of the both eyes of the observer (O) as well. Further, the template data is generated by utilizing a mechanical learning method such as a support vector machine (SVM), vector quantization, or the like from the face image of the observer (O).

For the processing for detecting the image region of the entire backrest part of the seat from the captured image data, similarly, the observing position calculation module 290 generates template data from feature amounts (contour, color, pattern information and the like of the backrest part) of the backrest part of the seat in advance and performs matching of the captured image data with the template data.

Further, the observing position calculation module 290 is structured to detect the length $L_{ISB}$ of the entire image region of the backrest part of the seat from the entire image region of the backrest part of the seat and to detect the image position (v-axis position) of the eye of the observer from the face image region for detecting the length $L_{ISE}$ (length $L_{ISE1}$ in FIG. 40B, length $L_{ISE2}$ in FIG. 41B) of the image region corresponding to the height of the both eyes of the observer.

Then, the observing position calculation module 290 calculates the proportion $R_S$ of the length $L_{ISB}$ of the image region of the entire backrest part of the seat and the length $L_{ISE}$ of the image region corresponding to the height of the both eyes of the observer.

(Expression 6)

$$R_S = \frac{L_{ISE}}{L_{ISB}} \qquad (6)$$

Note here that the length $L_{ISB}$ of the entire image region of the backrest part of the seat is fixed. Thus, through registering it in advance as the seat reference information, the observing position calculation module 290 can calculate the length $L_{SE}$ of the backrest part of the seat corresponding to the height of the both eyes of the observer by using following Expression (7) from the proportion $R_S$ and the entire length $L_{SB}$ of the backrest part of the seat.

(Expression 7)

$$L_{SE} = R_S \cdot L_{SB} \qquad (7)$$

Further, the observing position calculation module 290 is structured to calculate the change amount $Z_{ODC}$ of the observing distance $Z_{OD}$ generated due to inclination of the seat back face part by using the length $L_{SE}$ of the backrest part of the seat corresponding to the height of the both eyes of the observer calculated in the manner described above.

Figure 42A:
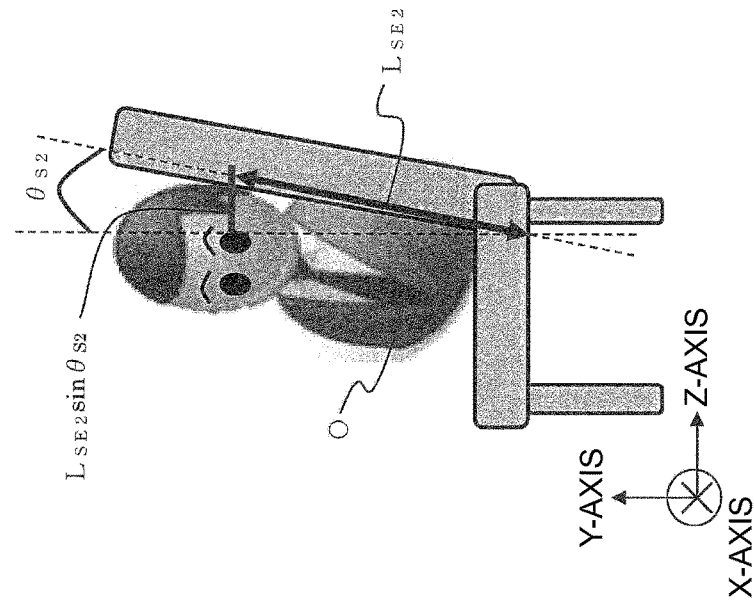
FIGS. 42A and 42B are views showing an example where the change amount of the observing distance depends on the height of the both eyes of the observer.
Figure 42B:
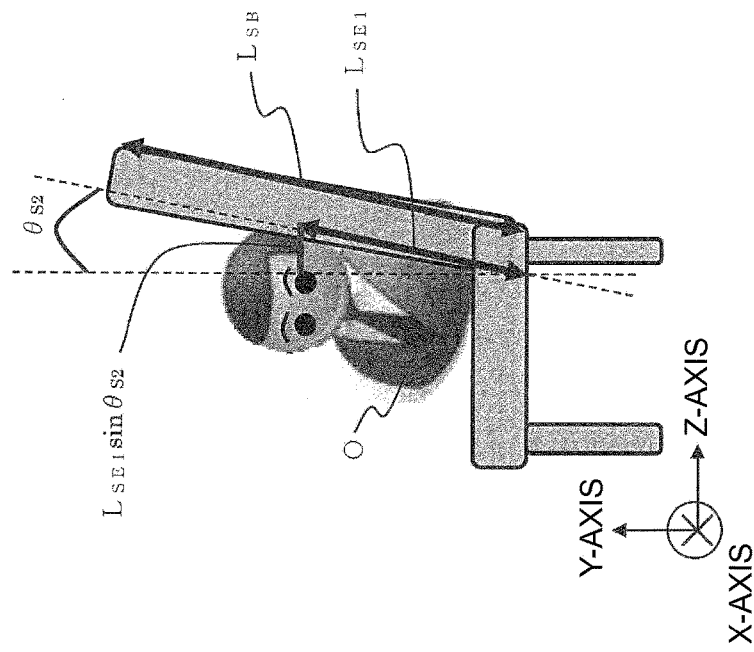

Here, FIGS. 42A and 42B show an example where the change amount $Z_{ODC}$ of the observing distance depends on the height of the both eyes of the observer.

In FIG. 42A, the length of the backrest part of the seat corresponding to the height of the both eyes of the observer (O) (length along the backrest from the bottom surface of the sitting part to the both eyes of the observer (O)) is the length $L_{SE1}$ as in FIGS. 40A and 40B. In FIG. 42B, the length of the backrest part of the seat corresponding to the height of the both eyes of the observer (O) is the length $L_{SE2}$ as in FIGS. 41A and 41B.

The change amount $Z_{DOC}$ of the observing distance in a case where the inclined angle $\theta_S$ is changed from 0 degree to $\theta_{S2}$ due to inclination of the seat back face part takes values shown in following Expression (8) ($L_{SE1}$ sin $\theta_{S2}$ in case of FIG. 42A, $L_{SE2}$ sin $\theta_{S2}$ in case of FIG. 42B).
(Expression 8)

$$Z_{ODC} = L_{SE} \cdot \sin \theta_{S2} \qquad (8)$$

Note here that the length $L_{SE}$ of the backrest part of the seat corresponding to the height of the both eyes of the observer takes different values in FIG. 42A and FIG. 42B.

More specifically, the length $L_{SE1}$ of the backrest part of the seat corresponding to the height of the both eyes of the observer in FIG. 42A is the center position of the length $L_{SB}$ of the entire backrest part of the seat, so that following Expression (9) can be acquired by substituting the value of the proportion $R_S$ (0.5) to Expression (7) described above. Further, the length $L_{SE2}$ of the backrest part of the seat corresponding to the height of the both eyes of the observer in FIG. 42B corresponds to the position at 70% of the length $L_{SB}$ of the entire backrest part of the seat, so that following Expression (10) can be acquired as well.
(Expression 9)

$$L_{SE1} = 0.5 \cdot L_{SB} \qquad (9)$$

(Expression 10)

$$L_{SE2} = 0.7 \cdot L_{SB} \qquad (10)$$

As described above, the observing position calculation module 290 can calculate the change amount $Z_{DOC}$ of the observing distance that depends on the length $L_{SE}$ through detecting the length $L_{SE}$ of the backrest part of the seat corresponding to the height of the both eyes of the observer by using the captured image data acquired by the imaging module 280.

Figure 43:
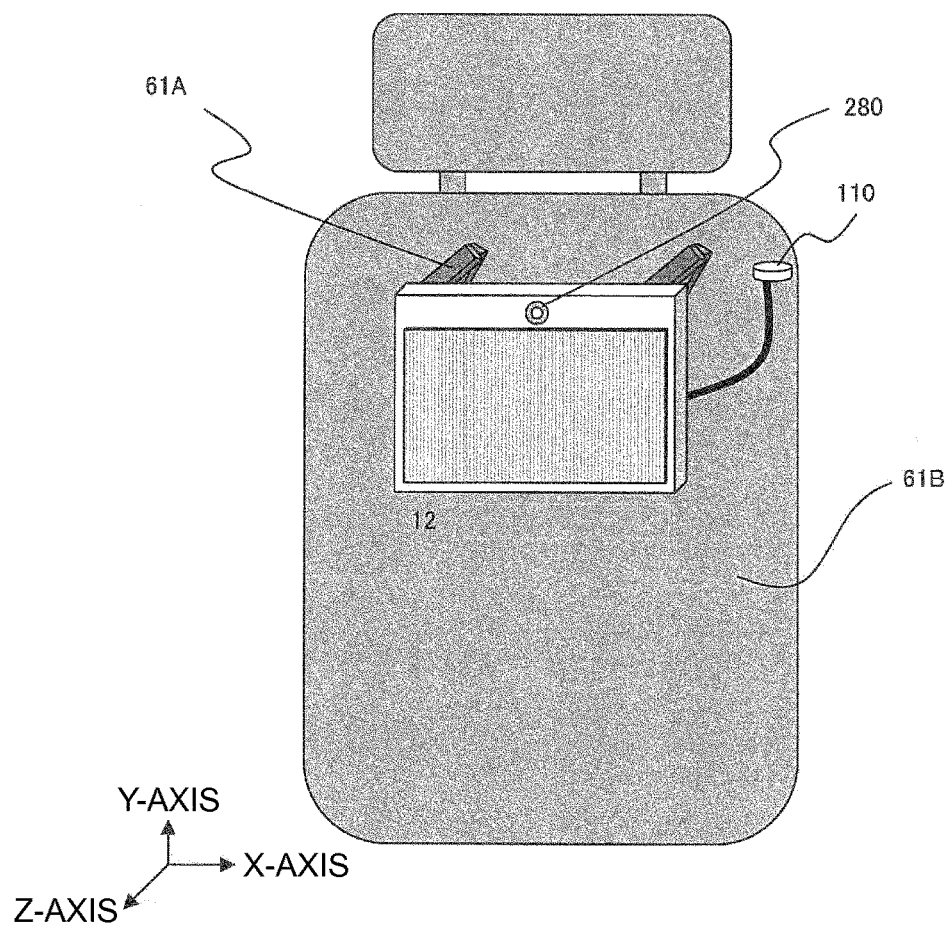
FIG. 43 is an external view showing a state where the stereoscopic image display device having an imaging module loaded on the front upper part thereof is placed at the back face part of a seat.

As shown in the external view of FIG. 43, the stereoscopic image display device 12 placed at the seat back face part 61B is structured to rotationally move on a Y-axis-Z-axis plane of the display coordinate system by the rotational mechanism of the joint member 61A at the seat back face part 61B.

Even when the display surface of the stereoscopic image display device 12 is inclined downwardly in accordance with inclination of the seat back face part 61B, the facing direction of the display surface can be adjusted through changing the placement inclined angle $\theta_{SP}$ of the stereoscopic image display device 12 to be described later (see FIG. 45 to FIG. 47) by using the rotational mechanism.

Note here that adjustment of the placement inclined angle $\theta_{SP}$ may be done manually by the observer. Alternatively, the placement inclined angle $\theta_{SP}$ of the stereoscopic image display device 12 may be changed automatically in accordance with the inclined angle of the seat back face part.

Figure 44:
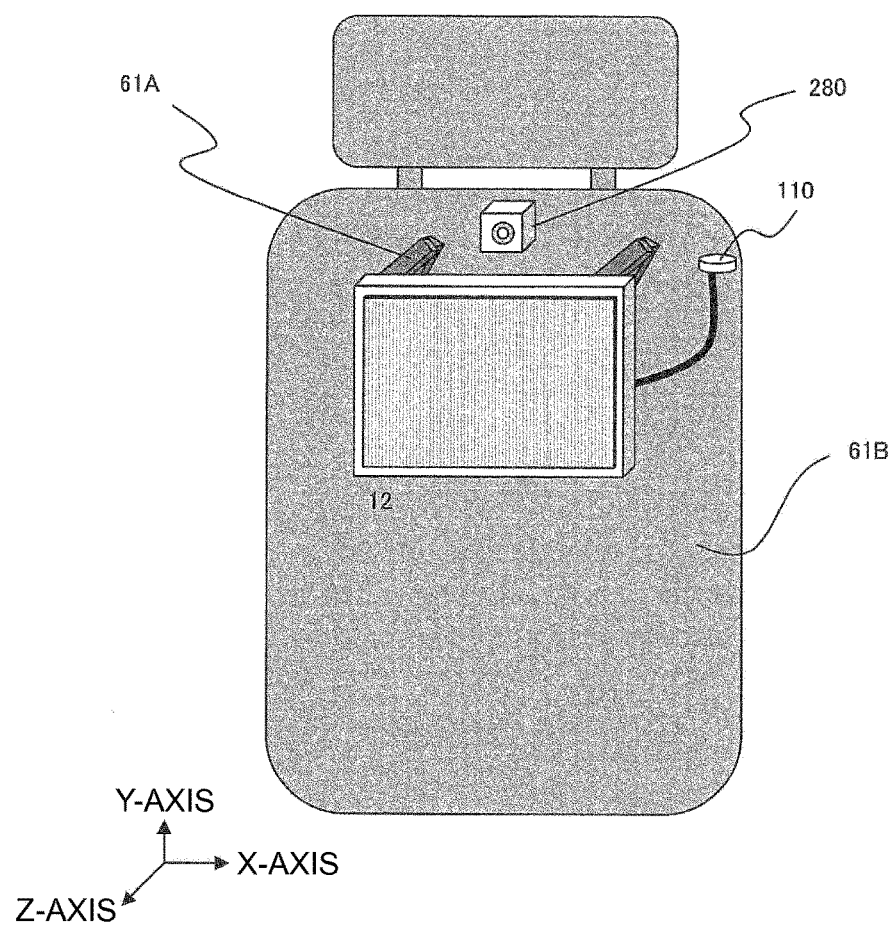
FIG. 44 is an external view showing a case where the imaging module is placed at the seat under a state where the stereoscopic image display device is placed at the back face part of the seat.

Further, while FIG. 43 shows the case where the imaging module 280 is placed at the upper part of the front face of the stereoscopic image display device 12, the imaging module 280 may be separated from the stereoscopic image display device 12 and directly placed to the seat as shown in FIG. 44. However, it is assumed, when such structure is employed, that the imaging module 280 is placed at the position capable of capturing images of the observer located in front of the stereoscopic image display device 12 and the relative position of the stereoscopic image display device 12 with respect to the imaging module 280 is already known.

As shown in FIG. 43, in a case where the imaging module 280 and the stereoscopic image display device 12 are integrated, the relative position of the stereoscopic image display device 12 with respect to the imaging module 280 is kept fixed at all times even when the placement inclined angle $\theta_{SP}$ of the stereoscopic image display device 12 is changed by the rotational mechanism of the joint member.

However, as shown in FIG. 44, in a case where the imaging module 280 is separated from the stereoscopic image display device 12 and directly placed to the seat, the relative position of the stereoscopic image display device 12 with respect to the imaging module 280 changes when the placement inclined angle $\theta_{SP}$ of the stereoscopic image display device 12 is changed by the rotational mechanism of the joint member. Thus, it is necessary to detect the placement inclined angle $\theta_{SP}$ of the stereoscopic image display device 12 changed by the rotational mechanism of the joint member, and to calculate the relative position $P_{SD}$ of the stereoscopic image display device 12 with respect to the imaging module 280.

Thus, a case of detecting the placement inclined angle $\theta_{SP}$ of the stereoscopic image display device 12 will be described by referring to FIG. 45 and FIG. 46 which show the cases where tilt sensors (110A, 110C) are placed to the seat back face part and the stereoscopic image display device 12, respectively.

Figure 45:
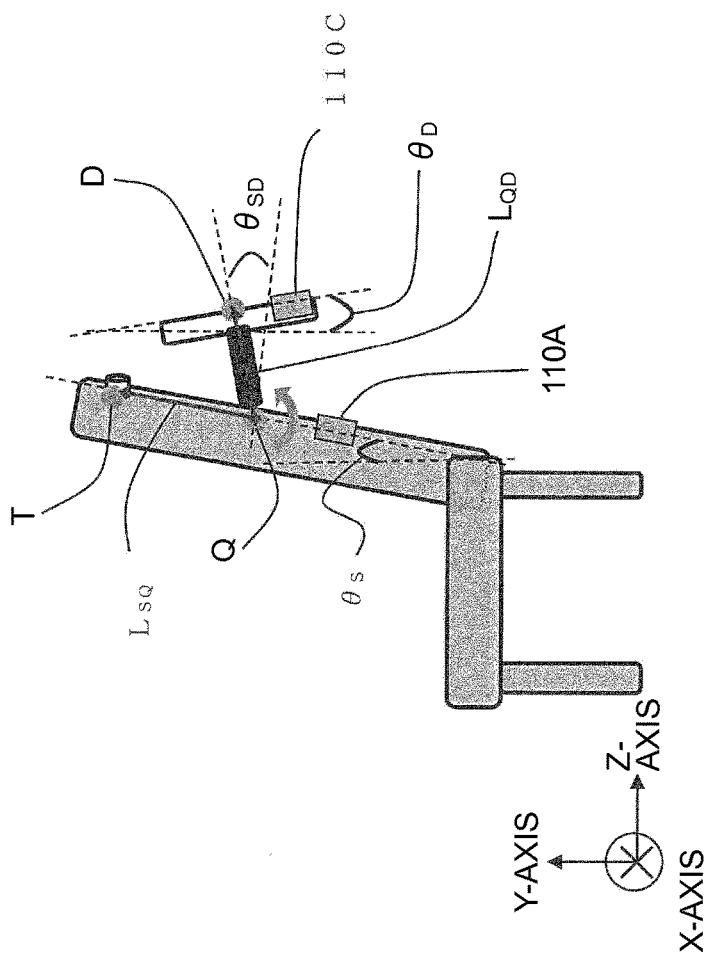
FIG. 45 is a basic external view showing the seat at which the tilt sensor is placed and showing the stereoscopic image display device.

Assuming that the angle of the placement inclined angle $\theta_{SD}$ when the display surface direction of the stereoscopic image display device 12 is in parallel to the surface direction of the seat back face part is 0 degree, the placement inclined angle $\theta_{SD}$ of the stereoscopic image display device 12 is an added value of the inclined angle $\theta_S$ of the seat back face part detected by the tilt sensor 110A placed at the seat back face part and the inclined angle $\theta_D$ of the stereoscopic image display device 12 detected by the tilt sensor 110C placed at the stereoscopic image display device 12 as shown in FIG. 45.

That is, the observing position calculation module 290 calculates the relative position $P_{SD}$ of the stereoscopic image display device 12 with respect to the imaging module 280 from the inclined angle $\theta_S$ of the seat back face part and the inclined angle $\theta_D$ of the stereoscopic image display device 12 detected by each of the tilt sensors.

The relative position $P_{SD}$ is the added value of the relative position $P_{SQ}$ from the imaging position T of the imaging module 280 to the rotation center position Q of the joint member and the relative position $P_{QD}$ from the rotation center position Q of the joint member to the center position D of the display surface of the stereoscopic display panel module 120.

Figure 46:
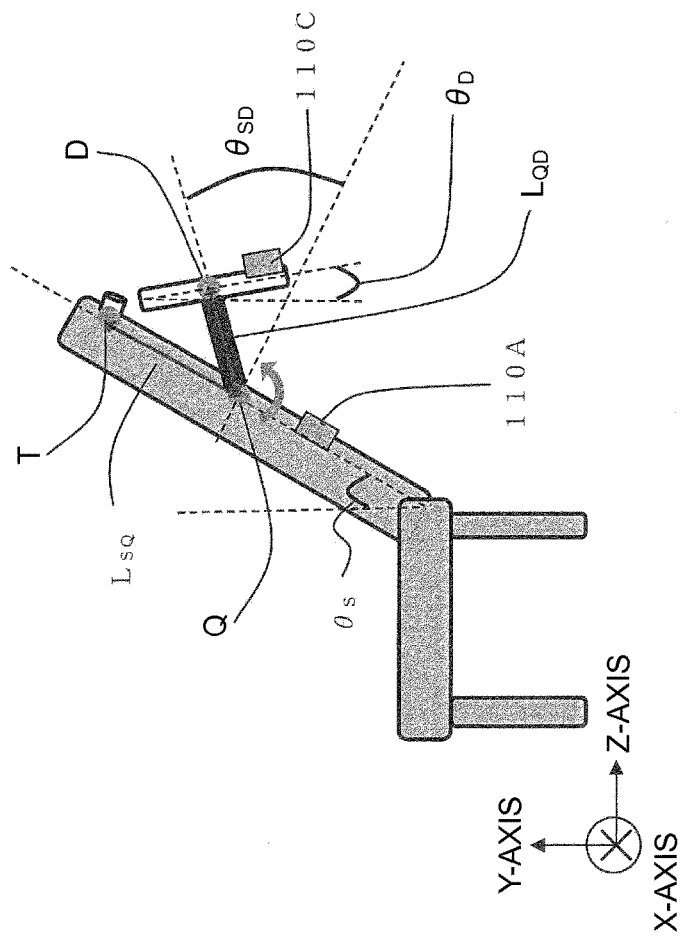
FIG. 46 is an external view showing a state where the back face part of the seat is inclined from the state of FIG. 45 in a case where the tilt sensors are placed at the seat and the stereoscopic image display device.

Here, as shown in FIG. 45 and FIG. 46, the distance from the imaging position T of the imaging module 280 to the rotation center position Q of the joint member is fixed at all times, and the distance is defined as $L_{SQ}$. Further, the distance from the rotation center position Q of the joint member to the center position D of the display surface of the stereoscopic display panel module 120 is fixed at all times, and the distance is defined as $L_{QD}$.

The distance $L_{SQ}$ and the distance $L_{QD}$ are already known values. Thus, the observing position calculation module 290 is structured to calculate the relative position $P_{SD}$ of the stereoscopic image display device 12 with respect to the imaging module 280 from the inclined angle $\theta_S$ of the seat back face part and the inclined angle $\theta_D$ of the stereoscopic image display device 12 from following Expression (11).
(Expression 11)

$$P_{SD}(x) = 0$$

$$P_{SD}(y) = -L_{SQ} \cos \theta_S + L_{QD} \sin \theta_D$$

$$P_{SD}(z) = -L_{SQ} \sin \theta_S + L_{QD} \cos \theta_D \qquad (11)$$

Note here that $P_{SD}(x)$ shows the position of the relative position $P_{SD}$ in the X-axis direction, $P_{SD}(y)$ shows the position of the relative position $P_{SD}$ in the Y-axis direction, and $P_{SD}(z)$ shows the position of the relative position $P_{SD}$ in the Z-axis direction, respectively. $P_{SD}(x)$ does not depend on the placement inclined angle $\theta_{SD}$ of the stereoscopic image display device 12, and it is fixed at all times. In Expression (11) described above, the value of $P_{SD}(x)$ is defined as 0 by assuming that the imaging position T of the imaging module 280 coincides with the center position D of the display surface of the stereoscopic display panel module 120 in the X-axis direction.

Other than that, with such structure, the relation between the world coordinate system of the camera of the imaging module 280 and the display coordinate system of the stereoscopic image display device 12 changes in accordance with the change in the placement inclined angle $\theta_{SD}$ of the stereoscopic image display device 12.

Figure 47:
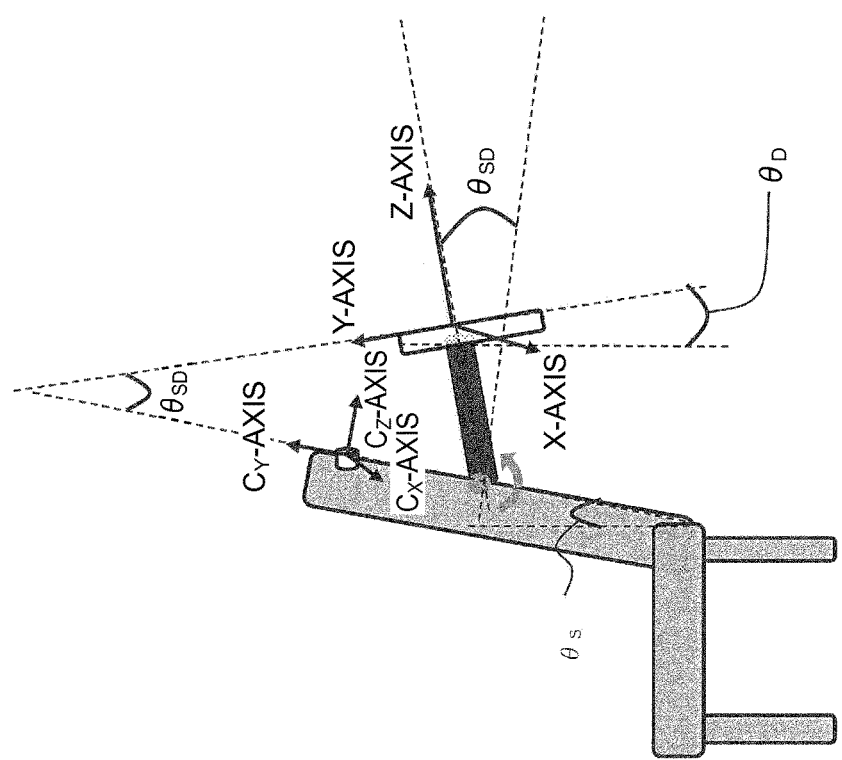
FIG. 47 is a relational chart of a display coordinate system of the stereoscopic image display device and a camera coordinate system of the imaging module.

Thus, the world coordinate system of the camera of the imaging module 280 and the display coordinate system of the stereoscopic image display device 12 are shown in FIG. 47, and the structure regarding transform processing of the coordinate system will be described. The world coordinate system of the camera is shown with Cartesian coordinates of $C_X$-axis, $C_Y$-axis, and $C_Z$-axis, and the display coordinate system is shown with X-axis, Y-axis, and Z-axis. Further, the world coordinate system of the imaging module 280 rotates on the Y-axis-Z-axis plane of the display coordinate system of the stereoscopic image display device 12.

A rotation matrix on the Y-axis-Z-axis plane can be acquired from the placement inclined angle $\theta_{SD}$ of the stereoscopic image display device 12. Thus, for transforming an arbitrary position $(c_X, c_Y, c_Z)$ on the world coordinate system of the camera to the display coordinate system, following Expression (12) can be used for calculation.

(Expression 12)

$$\begin{bmatrix} x \\ y \\ z \end{bmatrix} = \begin{bmatrix} 1 & 0 & 0 \\ 0 & \cos\theta_{SD} & \sin\theta_{SD} \\ 0 & -\sin\theta_{SD} & \cos\theta_{SD} \end{bmatrix} \begin{bmatrix} c_X \\ c_Y \\ c_Z \end{bmatrix} \quad (12)$$

Note here that (x, y, z) shows the position after the position $(c_X, c_Y, c_Z)$ on the world coordinate system of the camera is transformed to the display coordinate system.

Through performing the above-described processing, the position on the world coordinate system of the camera captured by the imaging module 280 can be transformed to the position on the display coordinate system of the stereoscopic image display device 12 by calculating the changed relative position $P_{SD}$ even when the placement inclined angle $\theta_{SD}$ of the stereoscopic image display device 12 is changed by the rotational mechanism of the joint member so that the relative position $P_{SD}$ of the stereoscopic image display device 12 with respect to the imaging module 280 is changed.

Further, the observing position calculation module 290 is structured to calculate the observing position $P_{OD}$ by referring to the inclined angle $\theta_S$ of the seat back face part detected by the movable object state detecting module 110 and the face image region of the observer shown in the captured image data picked up by the imaging module 280.

Incidentally, the observing distance $Z_{OD}$ is calculated by the observing position calculation module 290 by using the inclined angle $\theta_{SO}$ of the seat back face part of the observer detected by the movable object state detecting module 110 and he inclined angle $\theta_{SP}$ of the front seat thereof as in the case of the first exemplary embodiment. However, since the length $LS_E$ of the backrest part of the seat corresponding to the height of the both eyes of the observer is used in the second exemplary embodiment, a formula used for calculating the observing distance $Z_{OD}$ is not Expression (2) but following Expression (13).

(Expression 13)

$$Z_{OD}=Z_{SS}-Z_{SP}+L_{SE}\sin\theta_{SP}-L_{SP}\sin\theta_{SP} \quad (13)$$

Figure 48:
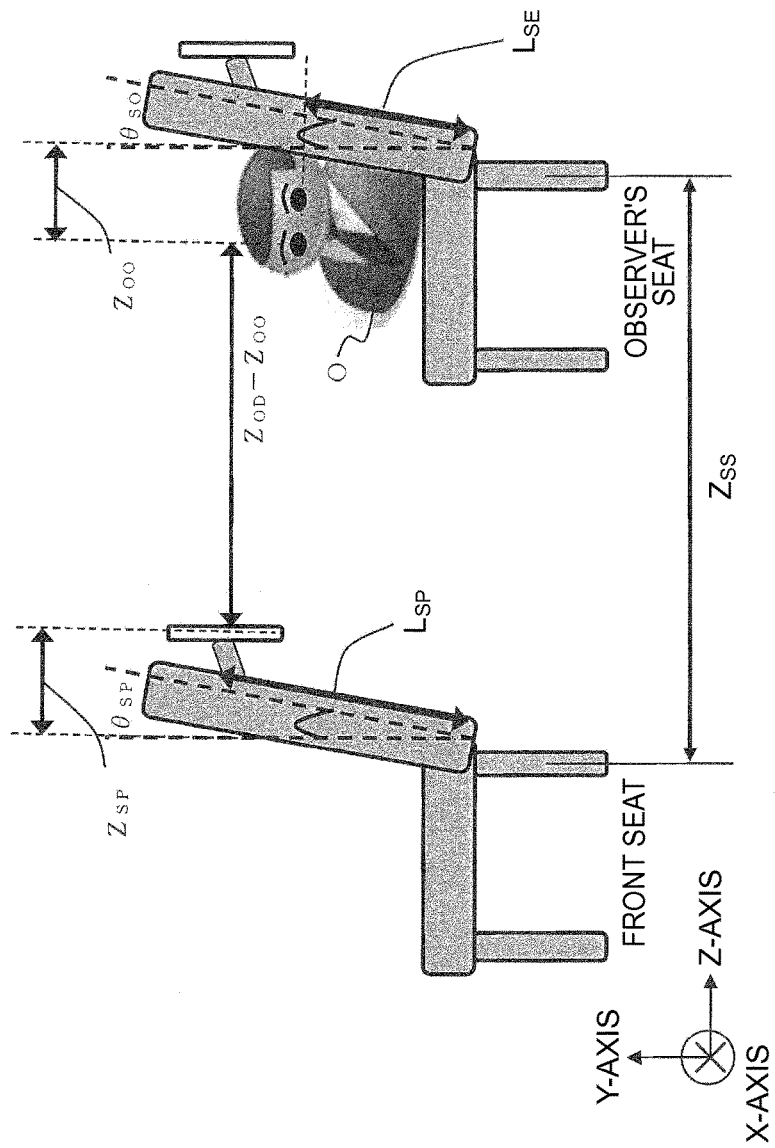
FIG. 48 is a chart showing the positional relation between the stereoscopic image display device placed at the back face part of the seat and the observer.

The positional relation between the seat of the observer and the front seat thereof related to calculation of the observing position $Z_{OD}$ is shown in FIG. 48. As described above, the average value of the length (head length) from the back of the head of a typical observer to the position of the both eyes (the middle of the forehead) is about 19 cm (report of human body measurement database). Thus, as in the first exemplary embodiment, by assuming that the distance $Z_{OO}$ from the front face position of the backrest part of the seat to the position of the both eyes of the observer to be about 19 cm, the value $(Z_{OD}-Z_{OO})$ acquired by subtracting the distance $Z_{OO}$ from the observing distance $Z_{OD}$ calculated by Expression (13) described above may be employed as the observing distance as shown in FIG. 48.

Then, for calculating the observing position $P_{OD}$, the observing position calculation module 290 is structured to calculate the observing position $P_{OD}(X)$ in the X-axis direction and the observing position $P_{OD}(Y)$ in the Y-axis direction from the captured image data picked up by the imaging module 280.

Figure 49:
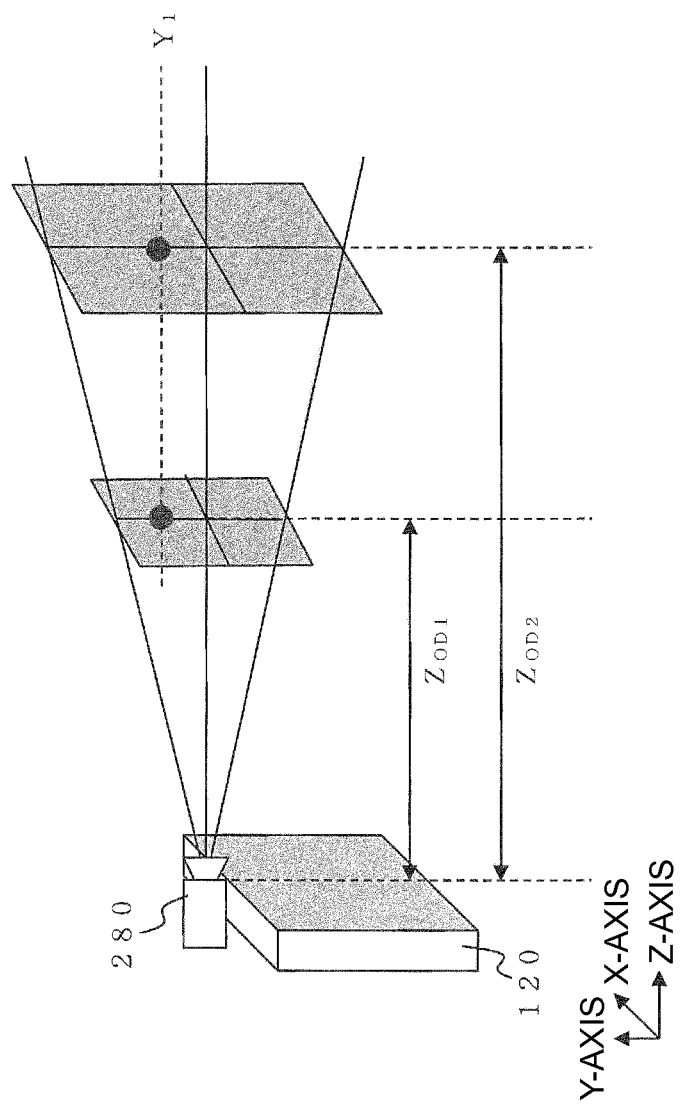
FIG. 49 is a chart showing the environment under which objects at different observing distances are captured by the imaging module.

As an example, FIG. 49 shows an imaging environment of a case where the imaging surface of the imaging module 280 is in parallel to the display surface of the stereoscopic display panel module 120. The imaging module 280 has a function which projects an object on a three-dimensional space to the imaging surface on a two-dimensional plane and records it as the captured image data.

Figure 50A:
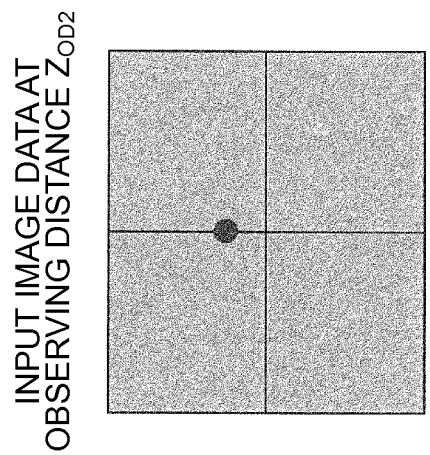
FIGS. 50A and 50B are charts showing samples of captured image data which are the captured object at different observing distances.
Figure 50B:
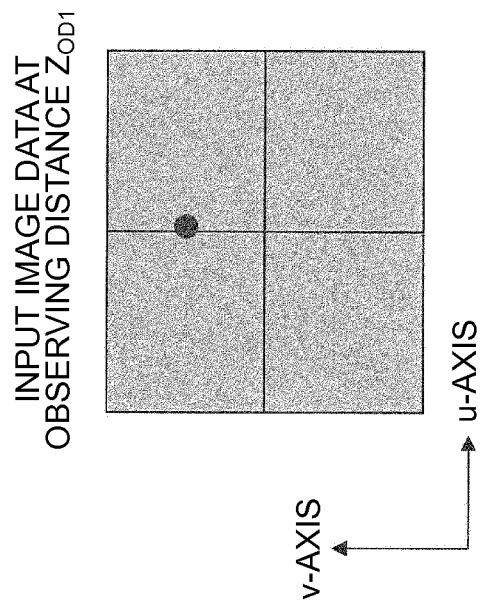

FIGS. 50A and 50B show the captured image data acquired when capturing an object by the imaging module 280 when the object is placed at an arbitrary position $Y_1$ in the Y-axis direction and the distance from the imaging module 280 to the object (Z-axis direction) is moved from the observing distance $Z_{OD1}$ to the observing distance $Z_{OD2}$.

FIG. 50A shows the captured image data when the object at the observing position $Z_{OD1}$ is picked up, and FIG. 50B shows the captured image data when the object at the observing position $Z_{OD2}$ is picked up. As shown in each of the charts, the u-axis direction of the captured image data coincides with the X-axis direction, and the v-axis direction coincides with the Y-axis direction.

The imaging module 280 projects the object on the three-dimensional space to the imaging surface on the two-dimensional plane. Thus, even with the objects at an arbitrary value $Y_1$ in the same Y-axis direction, the position on the v-axis projected within the captured image data changes depending on the difference in the observing distances $Z_{OD}$.

The position $(X_1, Y_1, Z_1)$ of the object on the three-dimensional space is calculated by the observing position calculation module 290 by following Expressions (14), (15), and (16) by using the focal distance f of the imaging module 280 and the observing distance $Z_{OD}$.

(Expression 14)

$$X_1 = \frac{Z_{OD} \cdot u_1}{f} \quad (14)$$

(Expression 15)

$$Y_1 = \frac{Z_{OD} \cdot v_1}{f} \quad (15)$$

(Expression 16)

$$Z_1 = Z_{OD} \quad (16)$$

Note here that $u_1$ shows the position of the image of the object in the u-axis direction of the captured image data, and $v_1$ shows the position of the image of the object in the v-axis direction. Thus, the observing position $P_{OD}(X)$ in the X-axis direction and the observing position $P_{OD}(Y)$ in the Y-axis direction are calculated by following Expressions (17) and (18).

(Expression 17)

$$P_{OD}(x) = \frac{Z_{OD} \cdot u_E}{f} + P_{SD}(x) \quad (17)$$

(Expression 18)

$$P_{OD}(y) = \frac{Z_{OD} \cdot v_E}{f} + P_{SD}(y) \quad (18)$$

In each of those Expressions, $u_E$ shows the position of the image of the both eyes of the observer captured in the captured image data in the u-axis direction, and $v_E$ shows the position of the image of the both eyes of the observer captured in the captured image data in the v-axis direction. Further, each $P_{SD}$ shows the relative position of the stereoscopic image display device 12 with respect to the imaging module 280 calculated by Expression (11) described above.

As described above, the observing position calculation module 290 can calculate the observing position $P_{OD}$ from the inclined angle of the seat back face part detected by the movable object state detecting module 110 and the captured image data picked up by the imaging module 280.

The display setting adjusting module 270 is structured to adjust the display setting of the stereoscopic image display device 12 so as to be able to display fine stereoscopic images on the display surface of the stereoscopic display panel module 120 through lightening the influences of 3D crosstalk and reversed views generated due to inclination of the seat back face part by referring to the observing position calculated by the observing position calculation module 290 and the device characteristic data saved in the device characteristic data saving module 160.

In the first exemplary embodiment described above, the display setting adjusting processing is performed by assuming that the position of the observer in the X-axis direction is fixed at all times. However, in the second exemplary embodiment, the display setting adjusting processing is performed by corresponding to the move of the observer in the X-axis direction by referring to the observing position $P_{OD}$ calculated by the observing position calculation module 290.

In a case where the optical separation characteristic of the optical separation module of the stereoscopic display panel module 120 can be dynamically changed, it is possible to employ a structure in which the display setting adjusting processing in accordance with the observing position $P_{OD}$ is performed by changing the optical separation characteristic.

In a case where a liquid crystal lens is used as the optical separation module capable of changing the optical separation characteristic dynamically, the region (stereoscopic viewing space) where the observer can properly recognize stereoscopic images is moved in accordance with the observing position $P_{OD}$ by locally changing the lens power of the liquid crystal lens.

FIGS. 51A and 51B show an example where the position of the stereoscopic viewing space is changed through locally changing the lens power of the liquid crystal lens by voltage control of the liquid crystal lens.

FIG. 51A shows an optical model in which the stereoscopic viewing space is formed in the of the display surface of the stereoscopic display panel module 120, and FIG. 51B shows an optical model in which the stereoscopic viewing space is formed at a position shifted in the right direction (X-axis direction) from the center front position of the display surface of the stereoscopic display panel module 120.

In the first exemplary embodiment, the optimal visible distance OD of the stereoscopic display panel module 120 is changed by changing the lens power of the liquid crystal lens. However, the second exemplary embodiment employs the structure in which not only the optimal visible distance OD but also the position of the stereoscopic viewing space is moved in the X-axis direction by locally changing the lens power of the liquid crystal lens.

This state will be described by referring to FIG. 52 and FIG. 53 which show an example of the stereoscopic display panel module 120 which is provided with the liquid crystal lens 120A and the display panel 120B.

Figure 52:
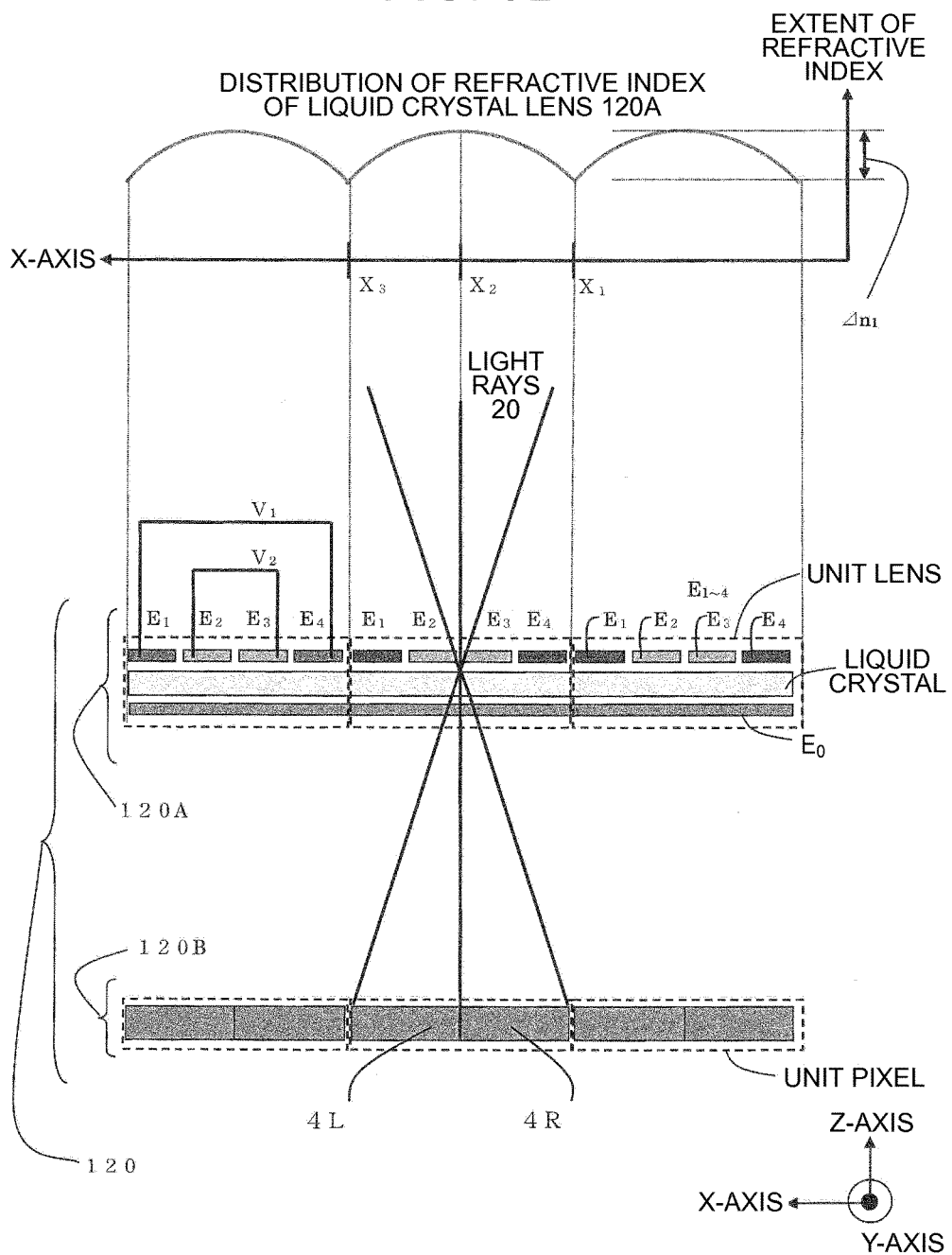
FIG. 52 is a chart showing the effect of voltage control of the liquid crystal lens, which is a sectional view of the stereoscopic display panel in a case where a same voltage is applied to a control electrode $E_1$ and a control electrode $E_4$.
Figure 53:
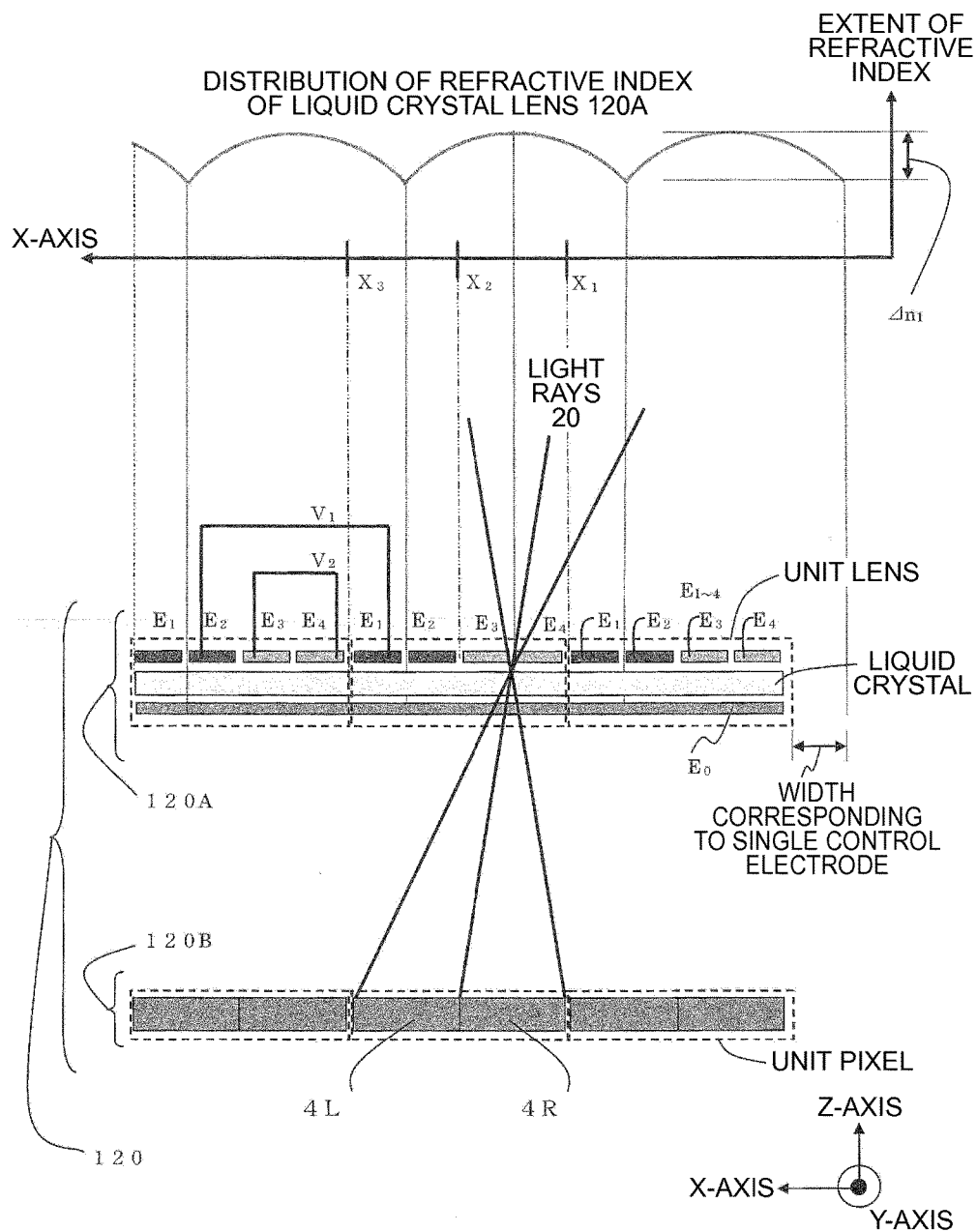
FIG. 53 is a chart showing the effect of voltage control of the liquid crystal lens, which is a sectional view of the stereoscopic display panel in a case where a same voltage is applied to a control electrode $E_2$ and a control electrode $E_1$.

Basic structure in FIG. 52 and FIG. 53 is the same as the structure shown in the lower sections (sectional views) of FIG. 29 and FIG. 30 described above. Further, for the extent of the refraction index distribution in FIG. 52 and FIG. 53, it is assumed that the same value as the case shown in the upper section of FIG. 29 is acquired.

First, in FIG. 52, under a condition where the voltage $V_1$ is higher than the voltage $V_2$ (voltage $V_1$>voltage $V_2$), the voltage $V_1$ is applied to the control electrodes $E_1$, $E_4$ and the voltage $V_2$ is applied to the control electrodes $E_2$, $E_3$, respectively. Thereby, the position in the X-axis direction at which the light rays 20 are condensed within a unit lens becomes the boundary position between the control electrode $E_2$ and the control electrode $E_3$ (boundary position between the right-eye pixel and the left-eye pixel).

Note here that the positions of the unit lens in the X-axis direction with respect to the position of the unit pixel is different by the width corresponding to one control electrode between FIG. 52 and FIG. 53.

That is, in FIG. 53, $V_1$ is applied to the control electrodes $E_2$, $E_1$ and the voltage $V_2$ is applied to the control electrodes $E_3$, $E_4$. At the same time, though moving the position of the unit lens by the width of one control electrode in the plus direction (left direction) of the X-axis, the position in the X-axis direction at which the light rays 20 are condensed becomes the boundary position (center position of the right-eye pixel) between the control electrode $E_3$ and the control electrode $E_4$. Therefore, the light rays 20 are emitted by being shifted to the minus direction (right direction) of the X-axis.

Here, an optical model of the stereoscopic display panel module 120 formed by the liquid crystal lens 120A controlled to be in the state shown in FIG. 52 is shown in FIG.

Figure 55:
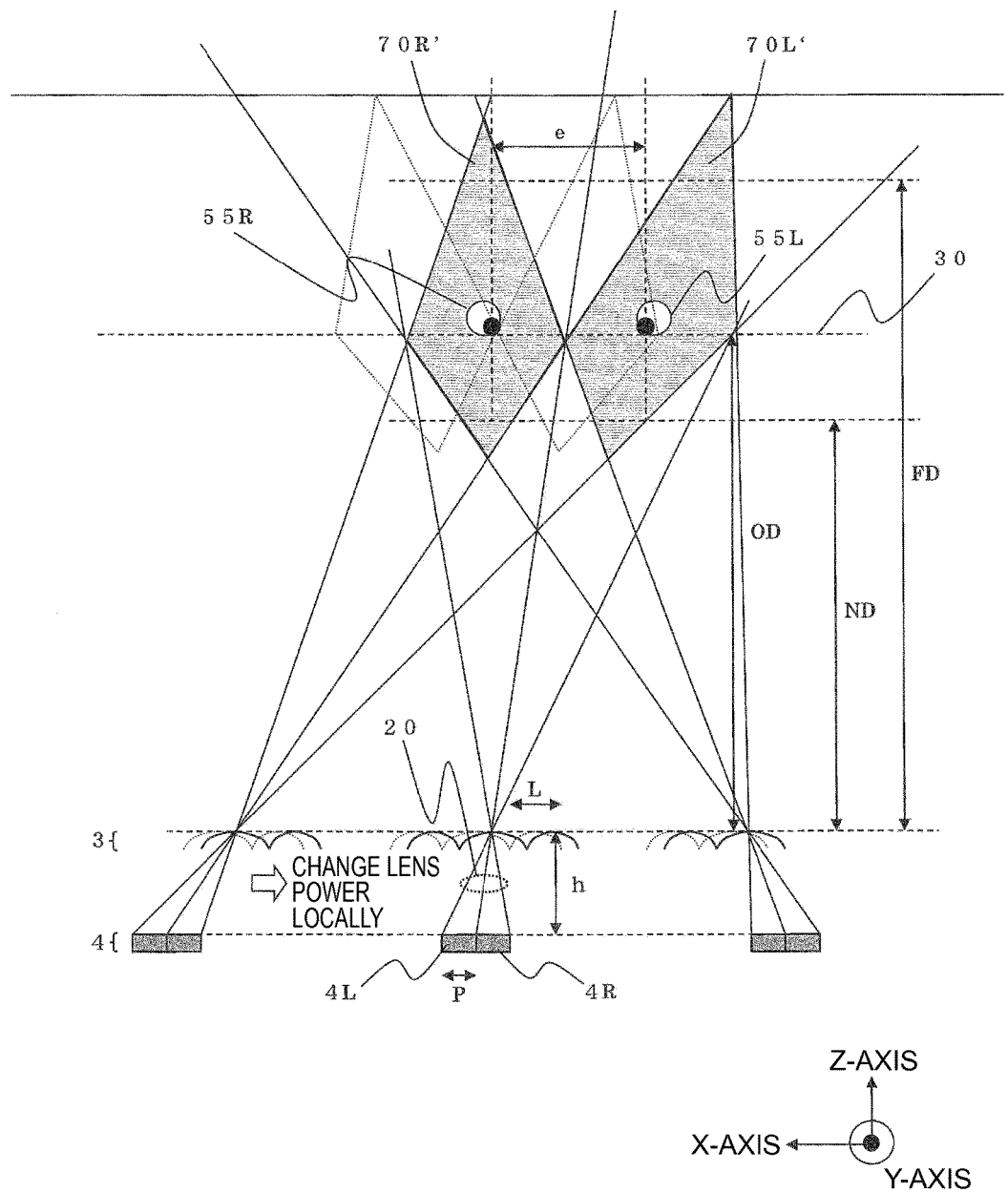
FIG. 55 is an optical model chart formed by the stereoscopic display panel module, which is a chart for describing changes in the forming position of the stereoscopic viewing space by locally changing the lens power.

54, and an optical model acquired by the liquid crystal lens 120A controlled to be in the state shown in FIG. 53 is shown in FIG. 55.

Figure 54:
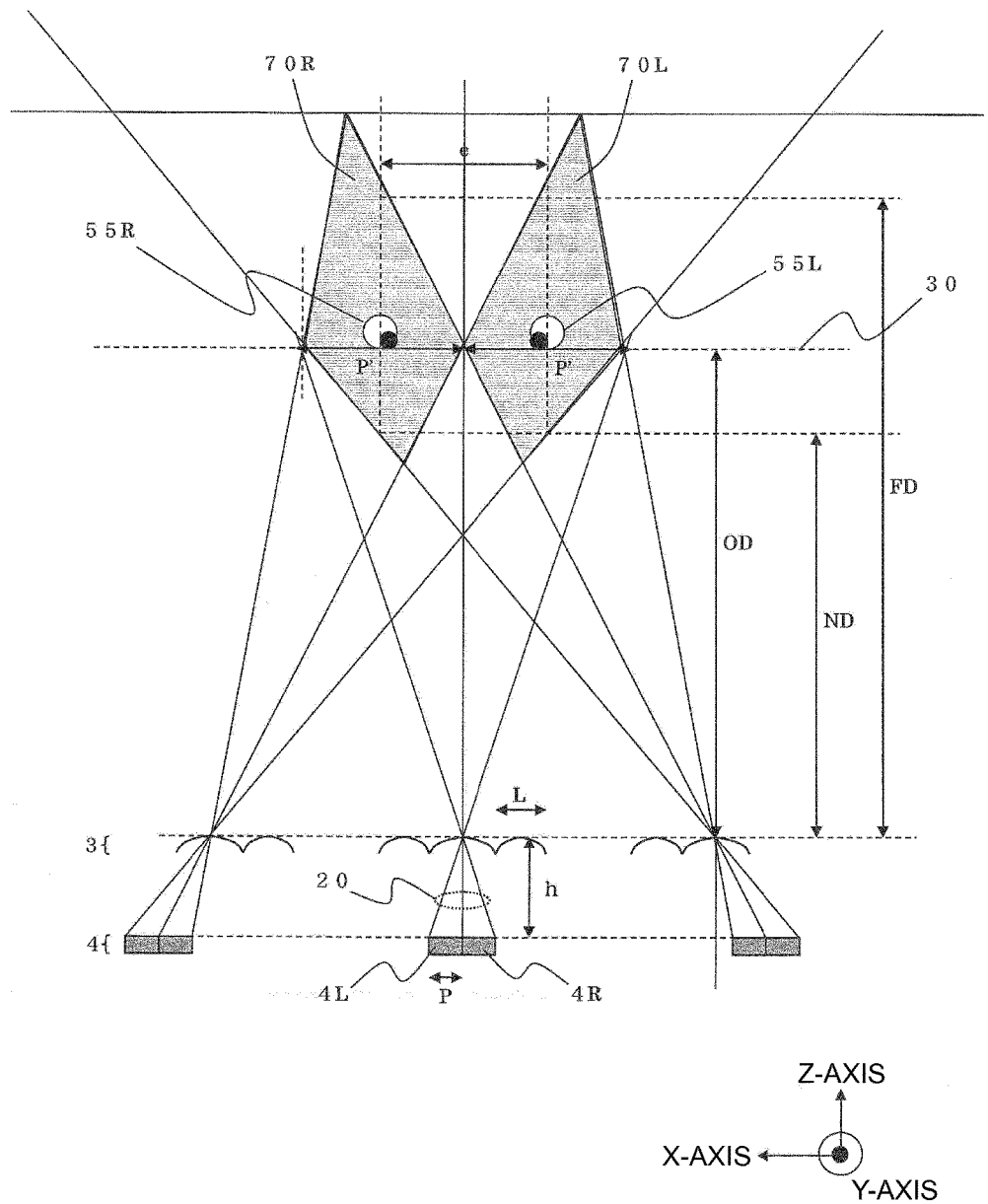
FIG. 54 is an optical model chart formed by the stereoscopic display panel module, which is a chart for describing changes in the forming position of the stereoscopic viewing space by controlling the liquid crystal lens.

In the case of FIG. 54, the position in the X-axis direction at which the light rays 20 are condensed comes to be the boundary position between the right-eye pixel and the left-eye pixel by the liquid crystal lens, so that the stereoscopic viewing space is formed in the center front position of the stereoscopic display panel module 120.

In the meantime, in the case of FIG. 55, the position in the X-axis direction at which the light rays 20 are condensed comes to be the center position of the right-eye pixel by the liquid crystal lens. Thus, the stereoscopic viewing space is formed in the position shifted by the width of one control electrode in the right side (minus direction of the X-axis) from the center front position of the stereoscopic display panel module 120.

As described above, by employing the structure in which the applied voltages to each of the control electrodes $E_1$ to $E_4$ are changed and the lens power of the liquid crystal lens is locally controlled, the position of the stereoscopic viewing space can be shifted not only in the Z-axis direction but also in the X-axis direction.

Further, the shift amount of the stereoscopic viewing space in the X-axis direction can be changed also by increasing/decreasing the number of control electrodes and by adjusting the pitch.

Other than that, under a condition where the voltage $V_1$ is higher than the voltage $V_2$ and the voltage $V_2$ is higher than the voltage $V_3$ (voltage $V_1$>voltage $V_2$>voltage $V_3$), the voltage $V_1$ may be applied to the control electrodes $E_1$, $E_4$, the voltage $V_2$ may be applied to the control electrode $E_2$, and voltage $V_3$ may be applied to the control electrode $E_3$, respectively, to control the liquid crystal lens.

With such structure, the voltages applied to the control electrode $E_2$ and the control electrode $E_3$ become different. Thus, the alignment distributions of the liquid crystal become asymmetric, so that the refraction directions of the light rays 20 passing the liquid crystal lens also become asymmetric. Therefore, the optical axis of the liquid crystal lens is tilted. That is, it is possible to employ a structure in which the forming position of the stereoscopic viewing space is shifted by the tilt of the optical axis.

As described, through employing the structure capable of controlling the distribution of the refractive index of the optical separation element, the position of the stereoscopic viewing space and the stereopsis range can be adjusted.

In the example above, the case of using the liquid crystal lens for the optical separation module of the stereoscopic display panel module 120 is described. However, instead of the liquid crystal lens, a parallax barrier capable of changing the barrier position may be used as well. In that case, though employing a structure in which a plurality of parallax barrier control electrodes are provided in a unit pixel and prescribed voltages are applied to the control electrodes to control the barrier position, the stereoscopic viewing space can be moved in accordance with the observing position $P_{OD}$.

As describe above, as the processing for adjusting the display setting using the liquid crystal lens, the parallax barrier capable of changing the barrier position, or the like, the display setting adjusting processing in accordance with the observing position is achieved by the structure in which the display setting adjusting module 270 controls the optical separation module of the stereoscopic display panel module 120 to change the position of the viewing region.

Next, display setting adjusting processing of a case where the optical separation characteristic of the optical separation module of the stereoscopic display panel module 120 is static and unchangeable will be described.

In that case, the position of the stereoscopic viewing space of the stereoscopic display panel module 120 is fixed, so that the display setting is adjusted in accordance with the observing position $P_{OD}$ by changing the parallax value of the image data (L image and R image) to be displayed on the stereoscopic display panel module 120.

As a countermeasure taken for CT-images generated by 3D crosstalk that appears when the observing position $P_{OD}$ is shifted out from the stereoscopic viewing space, the influence of the CT-images may be lightened by adjusting the parallax value PA of the image data. Specifically, employed is a structure in which the display setting adjusting module 270 calculates the parallax limit value (parallax allowable value $PA_{th}$) with which stereoscopic images can be displayed by referring to the observing distance $P_{OD}$ calculated by the observing distance calculation module 290 and the 3D crosstalk characteristic data saved in the device characteristic data saving module 160, and adjusts the parallax value PA of the image data to be equal to or less than the parallax allowable value $PA_{th}$.

Figure 56:
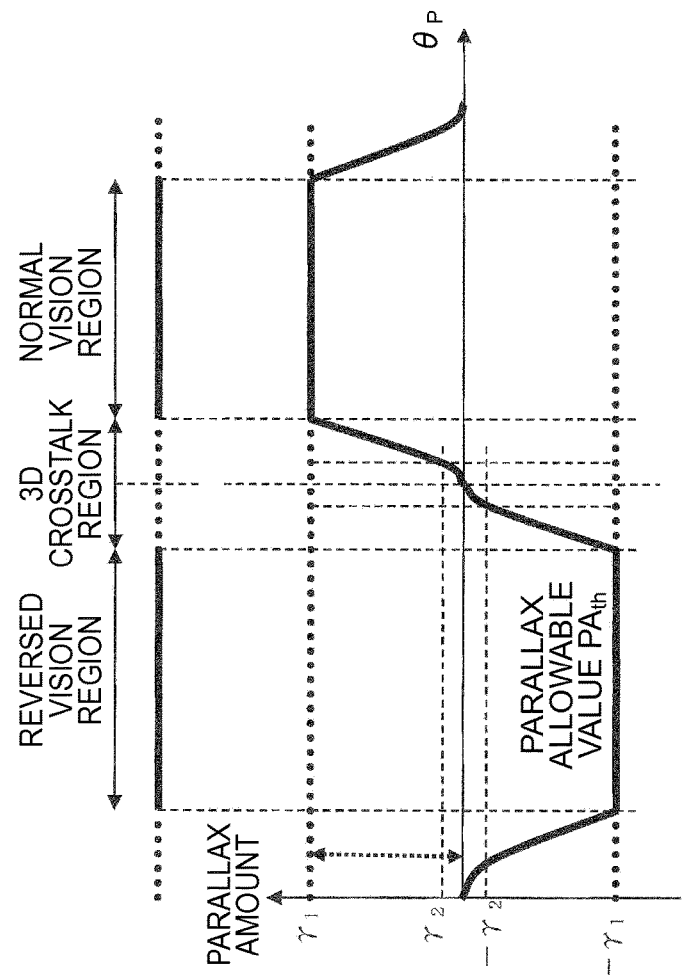
FIG. 56 is a relational chart showing parallax allowable values for the observing distance.

Here, an example of the parallax value $PA_{th}$ corresponding to the viewing angle $\theta_P$ of the stereoscopic display panel module 120 calculated from the observing position $P_{OD}$ is shown in FIG. 56.

As shown in FIG. 56, the value of the parallax allowable value $PA_{th}$ increases when the viewing angle $\theta_P$ is within the stereoscopic viewing space. Inversely, the value of the parallax allowable value $PA_{th}$ decreases when the viewing angle $\theta_P$ is within the 3D-crosstalk viewing space. Therefore, the parallax value PA of the image data to be transmitted to the stereoscopic display panel module 120 is changed in accordance with the change in the parallax allowable value $PA_{th}$.

Thereby, when the observing position $P_{OD}$ is within the 3D-crosstalk viewing space, the image data in which the parallax value PA is decreased is displayed on the stereoscopic display panel module 120.

Note that the details of the display setting adjusting processing for changing the parallax value of the image data by referring to the 3D crosstalk characteristic data and the observing position $P_{OD}$ are disclosed in the technique of Patent Document 7 mentioned above. Further, as in FIG. 28 (Classified Table I) referred in the first exemplary embodiment described above, the display setting adjusting processing for changing the parallax value of the image data can also be applied to the case of using the optical separation module (liquid crystal lens and the like) capable of dynamically changing the optical separation characteristic.

As a countermeasure taken for 3D moiré that appears when the observing position $P_{OD}$ is shifted out from the stereoscopic viewing space, the influence of the 3D moiré may be lightened by performing luminance adjusting processing of the image data. In the first exemplary embodiment, the luminance fluctuation value on the display surface of the stereoscopic display panel module 120 is calculated by assuming that the observing position $P_{OD}(X)$ in the X-axis direction is fixed at all times. However, the second exemplary embodiment employs the structure in which the display setting adjusting module 270 calculates the luminance fluctuation value by referring to the observing position $P_{OD}$ calculated by the observing position calculation module 290.

In the luminance fluctuation value calculation processing, the luminance fluctuation value of the 3D moiré that appears on the display surface of the stereoscopic display panel module 120 is calculated by referring to the observing position $P_{OD}$ and the luminance-viewing angle characteristic data. Based on the calculated value, the display setting adjusting module 270 adjusts the luminance value of the image data so that the luminance fluctuation values by the 3D moiré become flat. This makes it possible to lighten the influence of the 3D moiré.

The details of the display setting adjusting processing for changing the luminance value of the image data by referring to the luminance-viewing angle characteristic data and the observing position $P_{OD}$ are disclosed in the technique of Patent Document 7 mentioned above. Further, as in FIG. 36 (Classified Table II) referred in the first exemplary embodiment described above, the display setting adjusting processing for changing the luminance value of the image data can also be applied to the case of using the optical separation module (liquid crystal lens and the like) capable of dynamically changing the optical separation characteristic.

As described, through employing the structure in which the luminance value of the stereoscopic image data is changed in accordance with the observing position, it becomes possible to decrease a sense of discomfort felt by the observer by lightening the influence of the 3D moiré.

(Explanations of Actions)

Next, contents of image processing actions (a stereoscopic image processing method) of the stereoscopic image display device 12 will be described by referring to the flowchart shown in FIG. 57.

By an operation and the like of the observer, the stereoscopic image display device 12 to which command signals regarding stereoscopic image display are inputted detects the seat state of the observer and the seat state of the front seat thereof first by the movable object state detecting module 110 as in the case of the first exemplary embodiment described above (FIG. 57: step S201).

Figure 57:
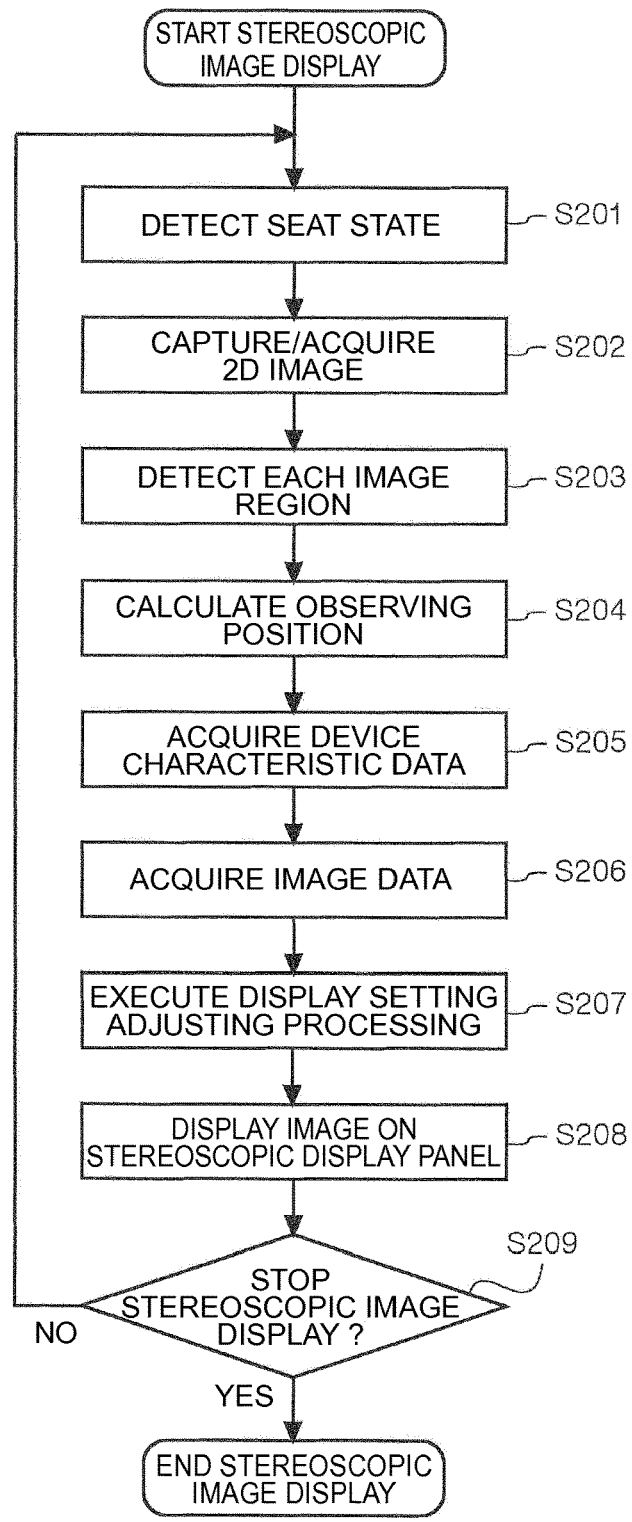

Then, the observing position calculation module 290 acquires the captured image data on a two-dimensional plane by capturing a 2D image including the observer in front of the stereoscopic image display device 12 by using the imaging module 280 (FIG. 57: step S202). The observing position calculation module 290 detects the face image region of the observer and the image region of the backrest part of the seat by using the captured image data (FIG. 57: step S203).

Then, the observing position calculation module 290 calculates the observing position showing the relative position of the observer with respect to the stereoscopic image display device 12. At that time, the observing position calculation module 290 calculates the observing position by using the seat reference information registered to itself in advance while referring to the inclined angles of each seat detected in step S201 and the captured image data stored in step S202 (FIG. 57: step S204).

Thereafter, as in steps S103 and S104 of the first exemplary embodiment, the display setting adjusting module 270 acquires the device characteristic data from the device characteristic data saving module 160 (FIG. 57: step S205) and acquires the image data as the stereoscopic image contents from the image data saving module 150 (FIG. 57: step S206).

Then, the display setting adjusting module 270 performs display setting adjusting processing in accordance with the observing position by referring to the observing position calculated in step S203 and the device characteristic data acquired in step S204. Examples of the display setting adjusting processing may be a method which moves the stereoscopic viewing space in accordance with the observing position by controlling the optical separation module of the stereoscopic display panel module 120 and a method which changes the parallax value and the luminance value of the image data acquired in step S205 in accordance with the observing position and the device characteristic data (FIG. 57: step S207).

Then, as in the first exemplary embodiment (step S106, step S107), the display setting adjusting module 270 displays the image data acquired from the image data saving module 150 on the image display panel of the stereoscopic display panel module 120 according to the display setting adjusted in step S206 described above (FIG. 57: step S208), and then sets whether or not to stop the stereoscopic image display processing (FIG. 57: step S209).

Through the above-described flowchart processing, the inclined angle of the seat back face part and the captured image data are referred to calculate the relative position (observing position) of the observer with respect to the stereoscopic image display device placed at the seat back face part and the display setting adjusting processing is performed by using it even when the display position of the stereoscopic image display device is moved in accordance with inclination of the seat back face part. Therefore, it is possible to provide the stereoscopic image which does not give a sense of discomfort to the observer through lightening the influences of CT-images and pseudoscopic views generated by 3D crosstalk and the influences of 3D moiréonly by the use of an inexpensive measuring device.

Further, in the second exemplary embodiment, the number of viewpoints is not limited to two viewpoints. It is also possible to be applied to the stereoscopic display panel module 120 which projects multiple-viewpoint images.

Note here that it is possible to put the execution contents of each of the above-described steps S201 to S208 (FIG. 57) into programs and to execute each of the series of control programs by a computer.

(Effects of Second Exemplary Embodiment)

The second exemplary embodiment employs the structure in which the relative position (observing position) of the observer with respect to the stereoscopic display panel module 120 is calculated by using the captured image data acquired by the imaging module and the movable object state information and the stereoscopic image display setting is adjusted by using it.

This makes it possible to achieve stereoscopic image display setting adjusting processing considering even the height of the both eyes of the observer, so that effective stereoscopic images can be displayed with still finer precision.

Other structures and actions are the same as those described in the first exemplary embodiment, and other operational effects generated thereby are also the same.

(Third Exemplary Embodiment)

A third exemplary embodiment of the stereoscopic image display device according to the present invention will be described by referring to FIG. 58 to FIG. 64. Note here that same reference numerals are used for the structural members equivalent to those of the first and second exemplary embodiments described above.

(Entire Structure)

The third exemplary embodiment employs a structure in which size information (observer data) showing the size of the body of the observer in front of the stereoscopic image display device is registered, the observing position $P_{OD}$ showing the relative position of the observing position of the observer with respect to the center position of the display surface of the stereoscopic display panel is calculated by using the observer data, and the display setting adjusting processing of the stereoscopic image display device is performed in accordance with the observing position $P_{OD}$.

That is, while the observing distance $Z_{OD}$ and the observing position $P_{OD}$ are calculated by assuming that the observer is sitting while leaning against the backrest part of the seat in the first and second exemplary embodiments described above, it is the feature of the third exemplary embodiment to calculate the observing position $P_{OD}$ by using the observer data not only in the state where the observer is in a state of leaning against the backrest part of the seat but also in a state where the observer is sitting away from the backrest part of the seat.

Figure 58:
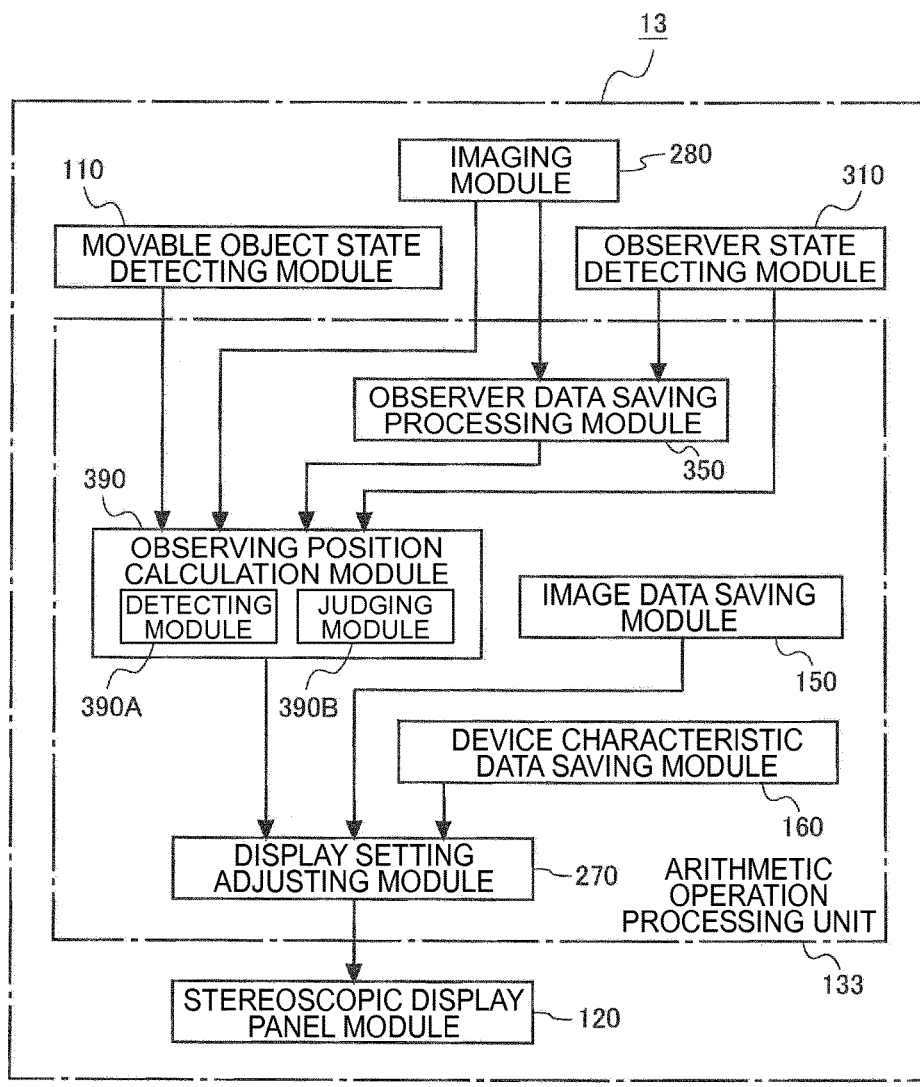
FIG. 58 is a block diagram showing a stereoscopic image display device according to a third exemplary embodiment of the present invention.
Figure 59:
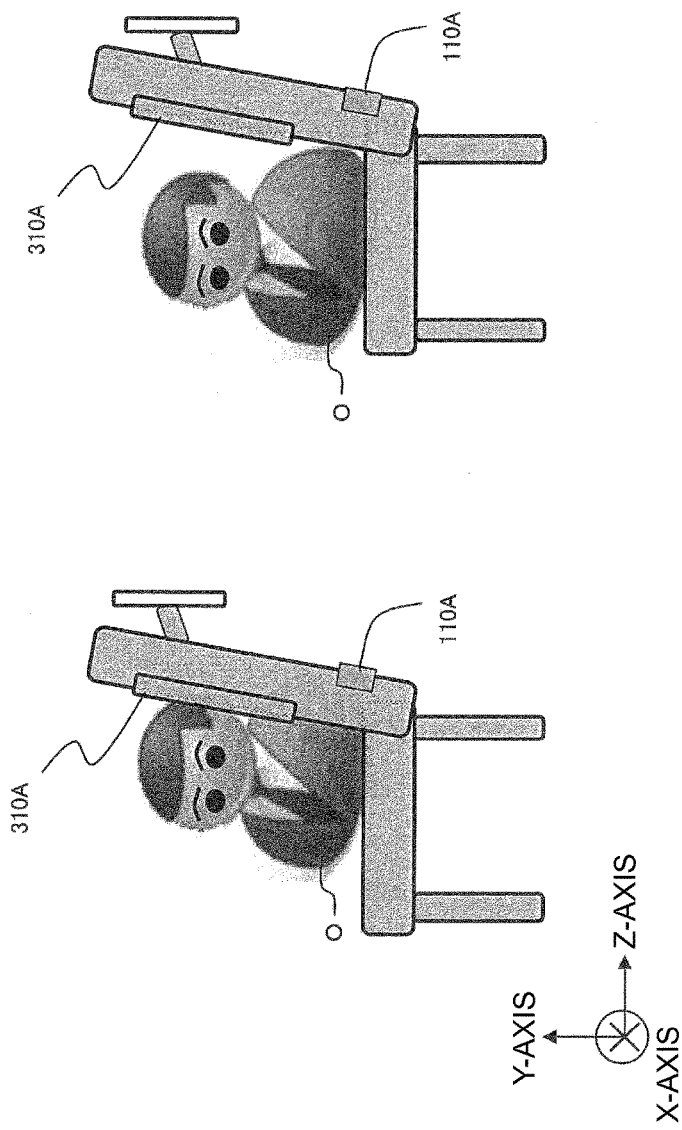
FIGS. 59A and 59B are external views of a seat to which a pressure sensor is placed.

As shown in FIG. 58, other than the movable object state detecting module 110, the stereoscopic display panel module 120, and the imaging module 280, the stereoscopic image display device 13 according to the third exemplary embodiment includes an arithmetic operation processing unit 133 which performs various kinds of arithmetic operation processing and an observer state detecting module 310 which detects observer state information that shows whether or not the observer is in a closely fitted state with the backrest part of the seat.

Further, the arithmetic operation processing unit 133 includes: an image data saving module 150; a device characteristic data saving module 160; a display setting adjusting module 270; an observer data saving processing module 350 which detects and saves the observer data by referring to the observer state information detected by the observer state detecting module 310 and the captured image data acquired by the imaging module 280; and an observing position calculation module (relative position calculation module) 390 which calculates the observing position $P_{OD}$ showing the relative position of the observing position of the observer with respect to the center position of the display surface of the stereoscopic display panel module 120.

Further, the observing position calculation module 390 includes: a detection module 390A which detects the face image region of the observer from the captured image data; and a judging module 390B which judges whether or not the observer is in a closely fitted state with the backrest part of the seat based on the observer state information. At the same time, the observing position calculation module 390 is structured to calculate the observing position $P_{OD}$ by using the state information detected by the movable object state detecting module 110 and the face image region when it is judged to be in a closely fitted state by the judging module 390B, and to calculate the observing position $P_{OD}$ by using the observer data and the face image region when it is judged to be in a state where the observer is sitting away from the backrest part of the seat.

Hereinafter, functions of each of the modules included in the stereoscopic image display device 13 will be described. Note here that the movable object state detecting module 110, the stereoscopic display panel module 120, the image data saving module 150, the device characteristic data saving module 160, the display setting adjusting module 270, and the imaging module 280 are the same structures as each of the modules to which the same reference numerals are applied in the first or the second exemplary embodiment.

The observer state detecting module 310 is structured to detect the observer state information that shows whether the observer is in a closely fitted state with the backrest part of the seat or in an isolated state. The observer state information can be detected by the observer state detecting module 310 with the use of a pressure sensor by placing the pressure sensor at the backrest part of the seat, for example.

In FIGS. 59A and 59B showing an example of the seat to which the pressure sensor is placed, FIG. 59A shows a state where the observer (O) is in a state of being closely fitted with the backrest part of the seat, and FIG. 59B shows a state where the observer (O) is isolated from the backrest part of the seat.

In FIG. 59A, a pressure is applied to the pressure sensor 310A placed at the backrest part of the seat by the weight of the observer (O), so that the output voltage value of the pressure sensor 310A increases. In the meantime, in FIG. 59B, no pressure is applied to the pressure sensor 310A, so that the output voltage value of the pressure sensor 310A does not increase. As described, by measuring the output voltage value of the pressure sensor 310A which changes depending on the positional relation between the observer and the seat, the observer state information can be detected.

The observer data saving processing module 350 is structured to detect/save the observer data showing the size of the face image region of the observer by referring to the observer state information detected by the observer state detecting module 310 and the captured image data acquired by the imaging module 280.

In the detection processing of the observer data, the observer data saving processing module 350 first refers to the observer state information detected by the observer state detecting module 310. When the observer is in a state of being closely fitted with the backrest part of the seat, the observer data saving processing module captures an image of the observer by the imaging module 280 to acquire the captured image data. Then, the observer data saving processing module 350 detects the face image region of the observer from the captured image data as in the case of the first exemplary embodiment, and detects the size of the face image region as the observer data.

Figure 60:
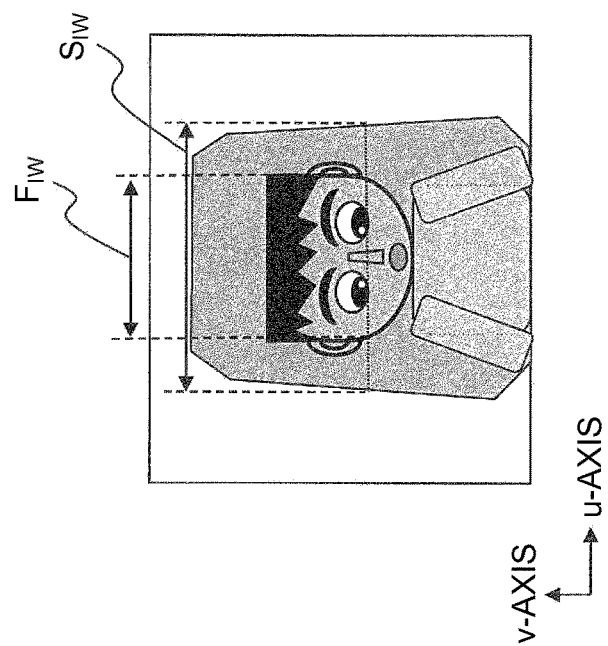
FIG. 60 is a view showing an example of captured image data that is picked up by an imaging module.

Here, an example of the captured image data picked up by the imaging module 280 is shown in FIG. 60.

FIG. 60 shows the width $F_{IW}$ of the face image region in the u-axis direction that is detected by the observer data saving processing module 350 from the contour position of the face image region of the observer.

When the observer is in a state of being closely fitted with the backrest part of the seat, it is possible to calculate the observing distance $Z_{OD}$ in the same manner as that of the second exemplary embodiment described above. Further, the actual face width $F_W$ of the observer is calculated by following Expression (19) by using the calculated observing distance $Z_{OD}$ and the width $F_{IW}$ of the face image region detected from the captured image data.

(Expression 19)

$$F_W = \frac{Z_{OD} \cdot F_{IW}}{f} \qquad (19)$$

Note here that f in the above shows the focal distance of the imaging module 280. The observer data saving processing module 350 saves the calculated actual face width $F_W$ of the observer as observer data.

Further, the actual face width $F_W$ of the observer may be calculated from the proportion of the face image region occupying the image region of the backrest part of the seat.

In that case, other than the width $F_{IW}$ of the face image region, the image region width $S_{IW}$ of the seat is detected from the contour information of the backrest part of the seat. The width $S_W$ of the backrest part of the actual seat is fixed.

Thus, by registering it as the seat reference information in advance, the actual face width $F_W$ of the observer can be calculated from following Expression (20).

(Expression 20)

$$F_W = \frac{S_W \cdot F_{IW}}{S_{IW}} \quad (20)$$

While the face width $F_W$ of the observer is saved as the observer data in the example described above, the observer data is not specifically limited to the face width $F_W$ of the observer as long as it is the size information showing the size of the body of the observer.

For example, the space between the pupils of the both eyes of the observer may be saved as the observer data.

Further, in the above, described is the case of referring to the observer state information detected by the observer state detecting module 310 and acquiring the captured image data used for calculating the observer data at the time of performing the processing for detecting the observer data. However, instead of referring to the observer state information, it is possible to notify the observer to detect the observer data from the stereoscopic image display device 13, and to acquire the captured image data after the notification.

Figure 61:
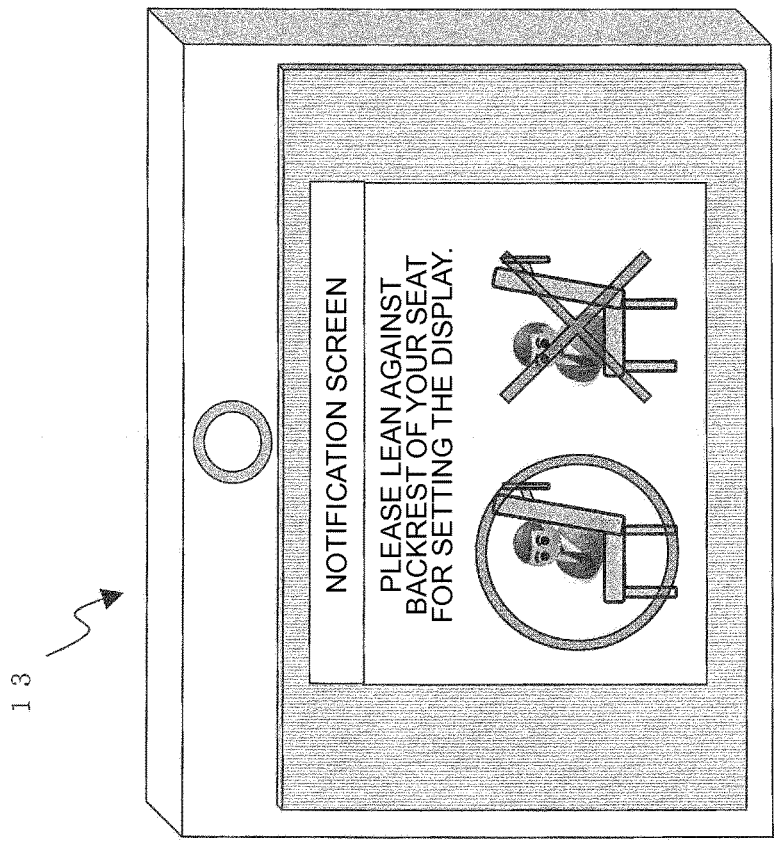
FIG. 61 is a view showing an informing screen that is displayed on the stereoscopic image display device when registering observer data.
Figure 62:
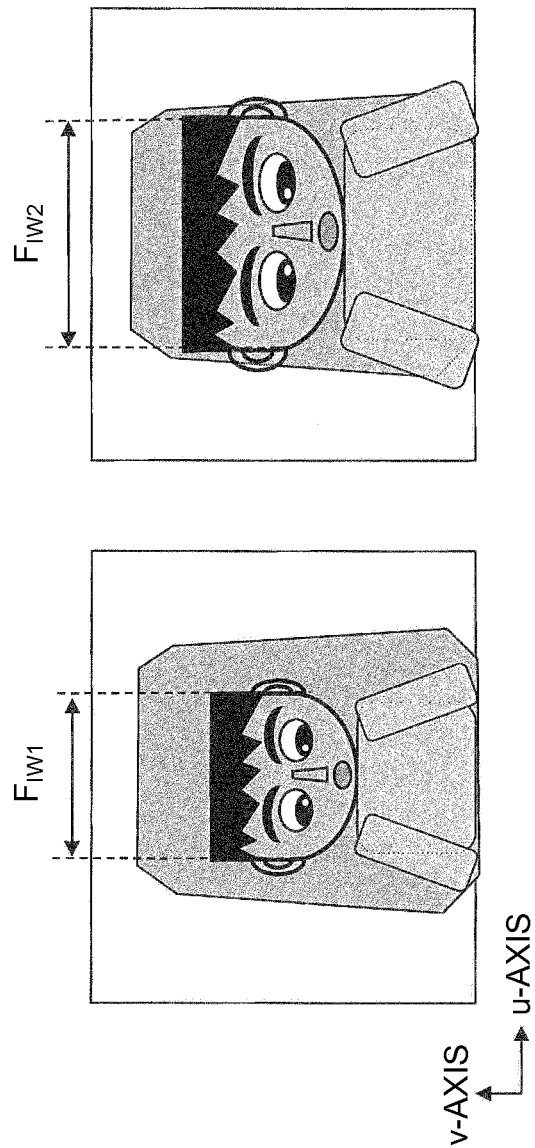
FIGS. 62A and 62B are views showing a change in the captured image data that is picked up by the imaging module.

An example of a method for notifying the observer may be to display a notification screen as shown in FIG. 61 on the stereoscopic image display device 13. For example, it is possible to employ a structure in which a check button or the like for notifying "prepared" is provided on the screen (an operation button or the like provided in advance to the stereoscopic image display device 13 or the like may be used instead), and captured image data is acquired upon receiving a signal generated by a pressing action done by the observer.

Further, passengers of an airplane are instructed to lean against the backrest part of the seat at the time of takeoff for security. Therefore, the captured image data may be acquired at that time to save the observer data.

The observing position calculation module 390 detects the face image region of the observer by the detection module 390A from the captured image data picked up by the imaging module 280, and judges whether or not the observer is in a closely fitted state with the backrest part by the judging module 390B based on the observer state information detected by the observer state detecting module 310.

Further, the observing position calculation module 390 is structured to calculate the observing position $P_{OD}$ by referring to the seat state information detected by the movable object state detecting module 110 and the captured image data picked up by the imaging module 280 when the observer is in a state of being closely fitted with the backrest part of the seat, as in the case of the second exemplary embodiment described above.

In the meantime, the observing position calculation module 390 is structured to calculate the observing position $P_{OD}$ by referring to the observer data saved in the observer data saving processing module 350 and the captured image data picked up by the imaging module 280 when the observer is isolated from the backrest part of the seat.

Here, a change in the width of the face image region caused due to position fluctuation of the observer will be described by referring to FIGS. 62A and 62B which show examples of the captured image data picked up at different distances $Z_{OD}$. FIG. 62A shows the captured image data in a case where the observer is closely fitted with the backrest part of the seat, and FIG. 62B shows the captured image data in a case where the observer is isolated form the backrest part of the seat (a case where the observer is closer to the front seat).

As the observer sits away from the backrest part of the seat to be closer to the imaging module 280, the width of the face region $F_{IW}$ of the observer is increased. For example, it takes the value of the width $F_{IW1}$ in FIG. 62A, while it is increased to the width $F_{IW2}$ in FIG. 62B where the observer sits closer to the imaging module 280.

The actual face width $F_W$ of the observer is saved as the observer data, so that the observer position calculation module 390 can calculate the observing distance $Z_{OD}$ by following Expression (21).

(Expression 21)

$$Z_{OD} = \frac{f \cdot F_W}{F_{IW}} \quad (21)$$

Further, as in the case of the second exemplary embodiment, the observing position calculation module 390 calculates the observing position $P_{OD}(X)$ in the X-axis direction and the observing position $P_{OD}(Y)$ in the Y-axis direction.

The third exemplary embodiment employs the structure described above, so that it is possible to calculate the observing position $P_{OD}$ of the observer even when the observer is in a state being away from the backrest part of the seat.

Further, through performing the display setting adjusting processing of the stereoscopic image display device 13 by the display setting adjusting module 270 in accordance with the calculated observing position $P_{OD}$ of the observer, it is possible to lighten the influences of the CT-images and pseudoscopic views caused by 3D crosstalk and the influences of 3D moiré only by an inexpensive measuring device even when the observer is sitting away from the backrest of the seat. This makes it possible to provide the stereoscopic image display device which does not give a sense of discomfort to the observer.

(Explanation of Actions)

Next, contents of image processing actions (a stereoscopic image processing method) of the stereoscopic image display device 13 will be described by referring to the flowcharts shown in FIG. 63 and FIG. 64.

(Observer Data Registering Processing)

Figure 63:
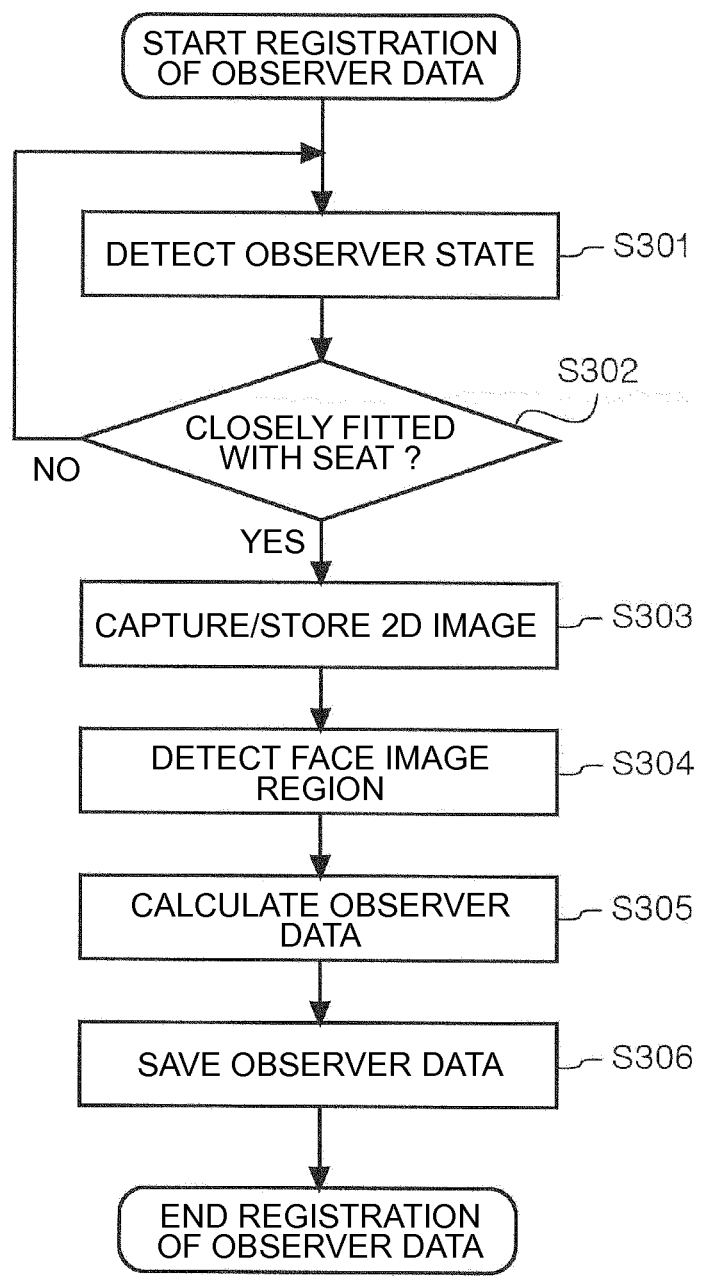
FIG. 63 is a flowchart regarding observer data registering processing done by the stereoscopic image display device disclosed in FIG. 58.

First, the observer state detecting module 310 detects the observer state showing whether or not the observer is closely fitted with the backrest part of the seat (FIG. 63: step S301).

Then, the observer data saving processing module 350 judges whether or not the observer is closely fitted with the backrest part by referring to the observer state detected in step S301 (FIG. 63: step S302).

At that time, when judged that the observer is not closely fitted with the backrest part (FIG. 63: step S302/No), the procedure is returned to step S301 to again detect the observer state. Prior to the detection, it is also possible to notify the observer to detect the observer data to urge the observer to sit while being closely fitted with the backrest part.

In the meantime, when the observer is closely fitted with the backrest part (FIG. 63: step S302/Yes), the imaging module 280 is used to capture the observer in front of the stereoscopic image display device 13 as a 2D image, and the captured image data is stored (FIG. 63: step S303).

Then, the observer data saving processing module 350 acquires the captured image data stored in step S303, and detects the face image region of the observer captured within the captured image data (FIG. 63: step S304).

By referring to the face image region detected in step S304, the observer data saving processing module 350 calculates the observer data that shows the actual face size of the observer (FIG. 63: step S305) and saves it (FIG. 63: step S306).

An example of the observer data may be the face width $F_W$ of the observer. Through the flowchart processing described above, the observer data can be registered.

(Stereoscopic Image Display Processing)

Figure 64:
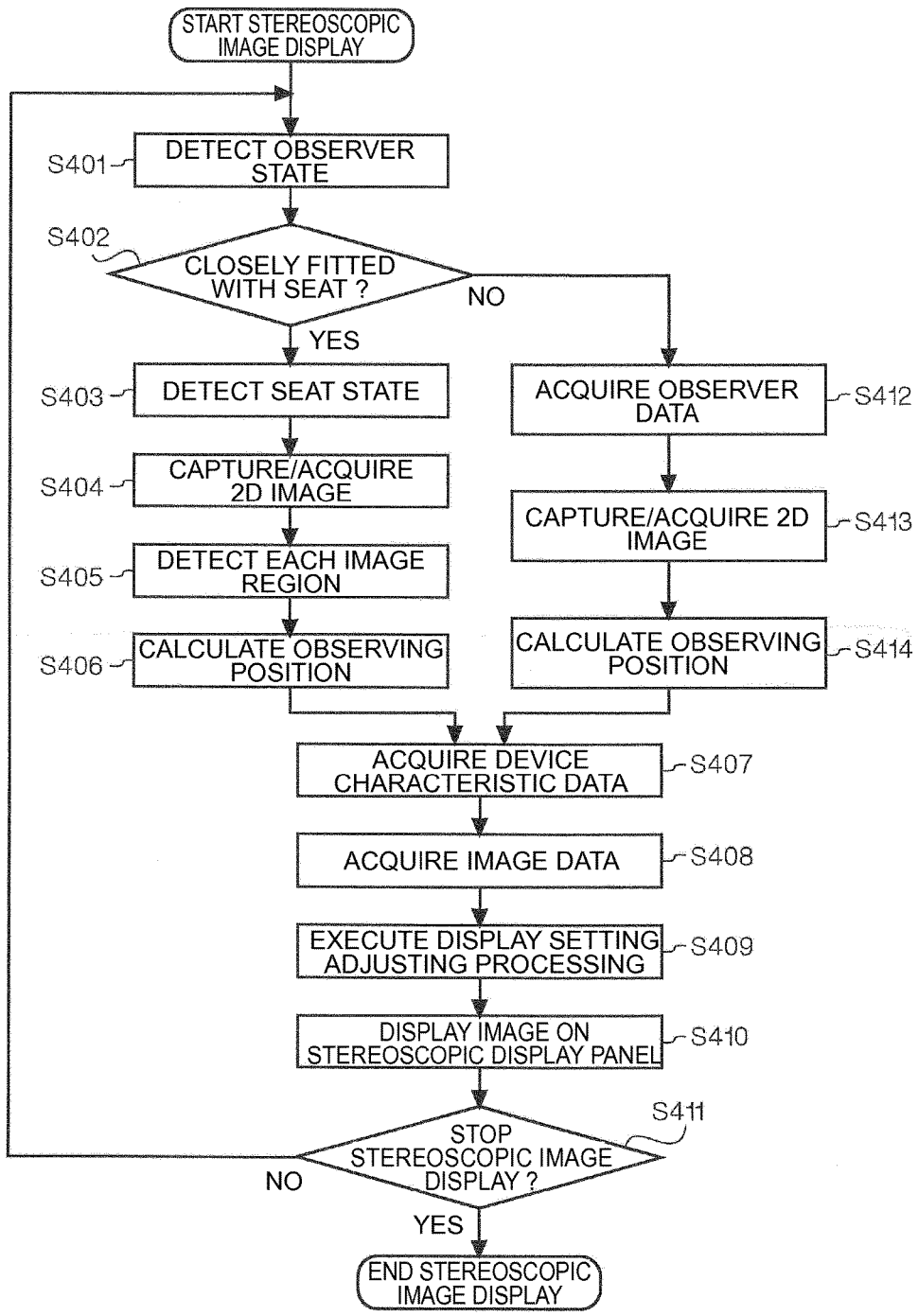
FIG. 64 is a flowchart regarding stereoscopic image display processing done by the stereoscopic image display device disclosed in FIG. 58.

According to the flowchart of the stereoscopic image display processing method shown in FIG. 64, first, the observer state detecting module 310 detects the observer state showing whether or not the observer is closely fitted with the backrest part of the seat (FIG. 64: step S401).

The observer state detected in step S401 is referred (FIG. 64: step S402) and when the observer is closely fitted with the backrest part (FIG. 64: step S402/Yes), the observer state detecting module 310 detects the state of each seat (proceeds to step S403). When the observer is not closely fitted with the backrest part (FIG. 64: step S402/No), the observer data saved in the observer data saving processing module 350 is acquired (proceeds to step S412).

The processing contents from step S403 to step S411 in FIG. 64 are the same as the processing contents form step S201 to step S209 (FIG. 57) of the second exemplary embodiment described above, so that explanations thereof are omitted herein.

The observing position calculation module 390 that has acquired the observer data saved in the observer data saving module 310 (FIG. 64: step S412) uses the imaging module 280 to capture the observer in front of the stereoscopic image display device 13 to acquire the captured image data as in step S404 (FIG. 64: step S413).

Then, the observing position calculation module 390 calculates the observing position by referring to the observer data acquired in step S412 and the captured image data acquired in step S413 (FIG. 64: step S414).

Further, as shown in FIG. 64, the processing contents from step S407 to step S411 same as the processing contents from step S205 to step S209 (FIG. 57) of the second exemplary embodiment described above are executed.

Through the above-described processing, it is possible to calculate the observing position $P_{OD}$ of the observer by using only an inexpensive measuring device even when the observer is sitting away from the backrest part of the seat through calculating and registering in advance the observer data of a state where the observer is being closely fitted with the backrest part of the seat. Further, through performing the display setting adjusting processing in accordance with the calculated observing position $P_{OD}$ of the observer, the influences of CT-images and pseudoscopic view generated by 3D crosstalk and the influences of 3D moiré can be lightened only by the use of an inexpensive measuring device. This makes it possible to provide the stereoscopic image display device which does not give a sense of discomfort to the observer.

Further, in the third exemplary embodiment, the number of viewpoints is not limited to two viewpoints. It is also possible to be applied to the stereoscopic display panel module 120 which projects multiple-viewpoint images.

(Effects of Third Exemplary Embodiment)

The third exemplary embodiment employs the structure in which the observer data that is acquired in a state where the observer is being closely fitted with the backrest part of the seat is referred as the reference and the positional relation between the observer and the backrest part is taken into consideration when executing the stereoscopic image display setting adjusting processing. This makes it possible to calculate more flexible observing positions according to the state of the observer, so that stereoscopic image display based on highly precise adjusting processing executed by using it can be achieved.

Other structures and actions are the same as those described in the first and second exemplary embodiments, and other operational effects generated thereby are also the same.

(Fourth Exemplary Embodiment)

A fourth exemplary embodiment of the stereoscopic image display device according to the present invention will be described by referring to FIG. 65 to FIG. 69. Note here that same reference numerals are used for the structural members equivalent to those of the first to third exemplary embodiments described above.

(Entire Structure)

It is the feature of the fourth exemplary embodiment to employ a structure in which the observing position $P_{OD}$ is calculated by detecting the seat state showing the inclined angle $\theta_S$ of the seat back face part from the captured image picked up by the imaging module 280 without using the movable object state detecting module such as a posture sensor, and the display setting adjusting processing of the stereoscopic image display device is performed in accordance with the observing position $P_{OD}$.

Figure 65:
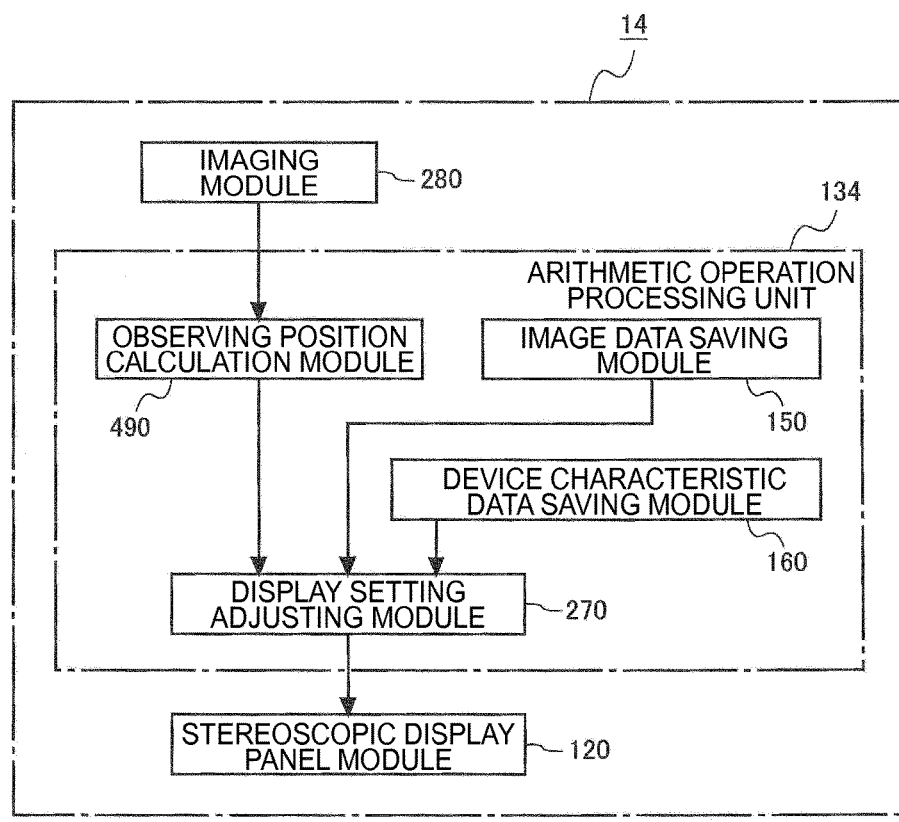
FIG. 65 is a block diagram of a stereoscopic image display device according to a fourth exemplary embodiment of the present invention.

As shown in FIG. 65, a stereoscopic image display device 14 includes a stereoscopic display panel module 120, the imaging module 280, and an arithmetic operation processing unit 134 which performs various kinds of arithmetic operation processing.

Further, the arithmetic operation processing unit 134 includes: an image data saving module 150; a device characteristic data saving module 160; a display setting adjusting module 270; and an observing position calculation module (relative position calculation module) 490 which calculates the observing position showing the relative position of the observer with respect to the stereoscopic display panel module 120.

Hereinafter, functions of each of the modules included in the stereoscopic image display device 14 will be described. Note here that the stereoscopic display panel module 120, the image data saving module 150, the device characteristic data saving module 160, the display setting adjusting module 270, and the imaging module 280 are the same structures as each of the modules to which the same reference numerals are applied in the first to third exemplary embodiments.

The observing position calculation module 490 calculates the observing position $P_{OD}$ by referring to the captured image data picked up by the imaging module 280. Further, the observing position calculation module 490 of the fourth exemplary embodiment detects the seat state that shows the inclined angle $\theta_S$ of the seat back face part by referring to the captured image data.

Figure 66:
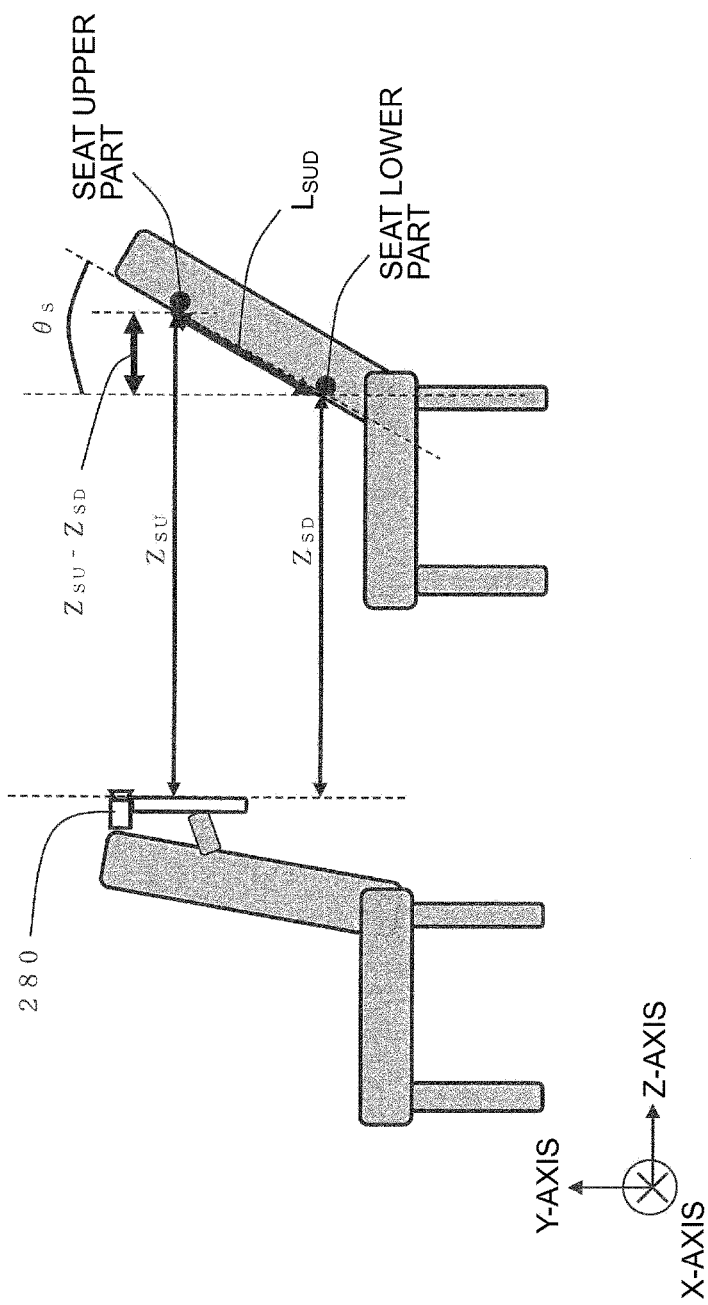
FIG. 66 is a relational chart regarding inclination of the backrest part of a seat and the distance from the imaging module to the backrest part of the seat.

Here, FIG. 66 shows the distance (Z-axis direction) from the imaging module 280 to the backrest part of the seat, which changes in accordance with the inclined angle $\theta_S$ of the seat back face part.

The length $L_{SUD}$ of the backrest part from the seat upper part to the seat lower part is fixed. Thus by registering it as the seat reference information in advance, the inclined angle $\theta_S$ of the seat back face part can be calculated by following Expression (22) by using the distance $Z_{SD}$ in the Z-axis direction from the imaging module 280 to the seat upper part and the distance $Z_{SD}$ in the Z-axis direction from the imaging module 280 to the seat lower part.

(Expression 22)

$$\theta_S = \sin^{-1}\left(\frac{Z_{SU} - Z_{SD}}{L_{SUD}}\right) \quad (22)$$

The distance $Z_{SD}$ from the imaging module 280 to the seat upper part and the distance $Z_{SD}$ from the imaging module 280 to the seat lower part are calculated by the observing position calculation module 490 by using the captured image data acquired by capturing the seat of the observer in front of the stereoscopic image display device 14 by using the imaging module 280.

Figure 68A:
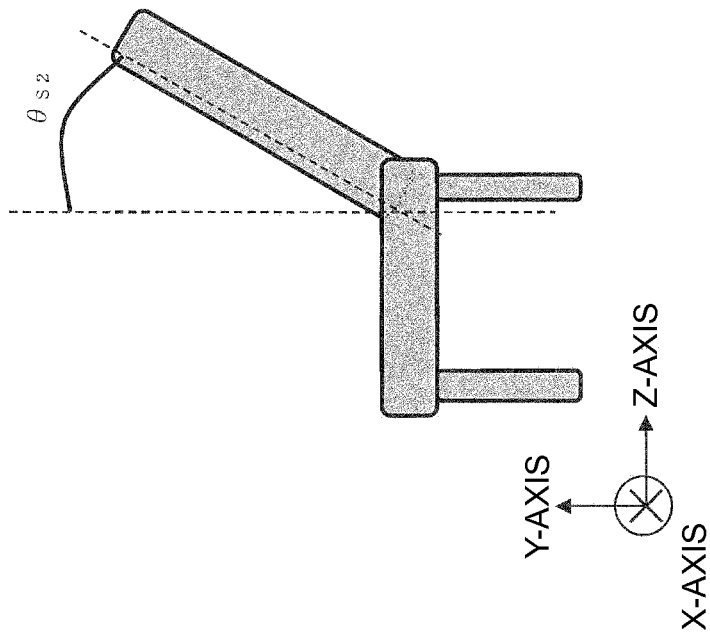
FIGS. 68A and 68B are relational charts regarding the captured image data picked up by the imaging module and inclination of the backrest part of the seat, which shows a state where the backrest part of the seat is more inclined compared to the state of FIGS. 67A and 67B.

FIG. 67A shows an example of captured image data acquired by picking up the seat of the observer. FIG. 68A shows captured image data acquired by picking up the seat of the observer when the inclined angle $\theta_S$ of the seat back face part is inclined more than the case of FIGS. 67A and 67B. FIG. 67B shows a seat state at the time of picking up the captured image data of FIG. 67A, and FIG. 68B shows a seat state at the time of picking up the captured image data of FIG. 68A.

Figure 68B:
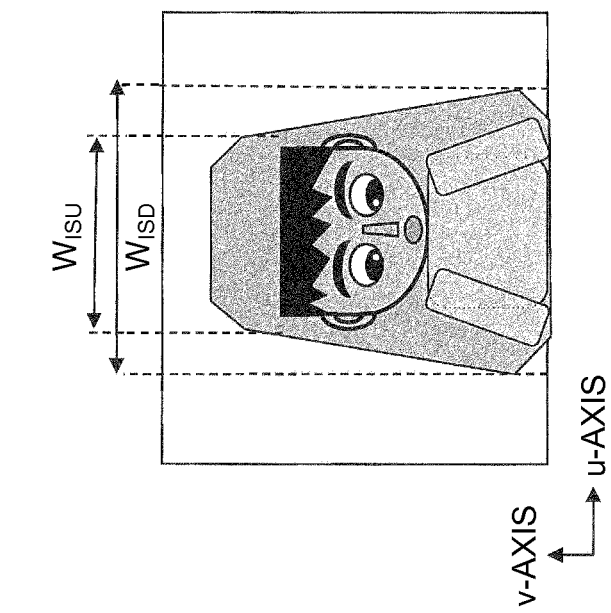

Herein, the inclined angle of the seat back face part shown in FIGS. 67A and 67B is defined as $\theta_{S1}$ and the inclined angle of the seat back face part shown in FIGS. 68A and 68B is defined as $\theta_{S2}$ ($\theta_{S1} < \theta_{S2}$). Further, the image region width of the seat lower part is defined as $W_{ISD}$, and the image region width of the seat upper part is defined as $W_{ISU}$.

Comparing FIGS. 67A and 67B with FIGS. 68A and 68B, the distance from the imaging module 280 to the backrest part of the seat is changed when the inclined angle $\theta_S$ of the seat back face part is increased. Accordingly, the image region width $W_{ISD}$ of the seat lower part and the image region width $W_{ISU}$ of the seat upper part are changed (as shown in each of the charts, there is a large change in $W_{ISU}$ in particular).

Note here that the actual width $W_{SU}$ of the seat upper part and the actual width $W_{SD}$ of the seat lower part are fixed and already known values, so that those are registered in advance as the seat reference information. Thereby, the distance (Z-axis direction) $Z_{SU}$ from the imaging module 280 to the seat upper part can be calculated based on following Expression (23) by detecting and using the image region width $W_{ISU}$ of the seat upper part from the captured image data.

Similarly, the distance $Z_{SD}$ from the imaging module 280 to the seat lower part can also be calculated based on following Expression (24) by detecting and using the image region width $W_{ISU}$ of the seat lower part from the captured image data.

(Expression 23)

$$\frac{W_{ISU}}{f} = \frac{W_{SU}}{Z_{SU}} \quad (23)$$

(Expression 24)

$$\frac{W_{ISD}}{f} = \frac{W_{SD}}{Z_{SD}} \quad (24)$$

Note that f in each of those Expressions show the focal distance of the imaging module 280.

As described above, in a state where the image region widths $W_{ISU}$, $W_{ISD}$ of the seat upper part and the seat lower part can be detected by the imaging module 280, it is possible to detect the seat state showing the inclined angle $\theta_S$ of the seat back face part from the captured image data acquired by the imaging module 280 without using the movable object state detecting module such as a tilt sensor.

While the above-described case employs the structure in which the inclined angle $\theta_S$ of the seat back face part is calculated by detecting the contour information of the backrest part of the seat and detecting the image region widths $W_{ISU}$, $W_{ISD}$ of the upper part and the lower part of the seat from the captured image data, the image information to be detected from the captured image data may also be other image information.

As an example, it is possible to employ a structure in which a mark registered in advance is printed on the backrest part of the seat as a pattern of the seat, and the inclined angle $\theta_S$ of the seat back face part is calculated by detecting the mark from the captured image data.

Note that the observing position $P_{OD}$ is designed to be calculated by the observing position calculation module 390 by referring to the inclined angle $\theta_S$ of the seat back face part that is calculated from the captured image data by using the same calculation method as that of the second exemplary embodiment described above.

(Explanation of Actions)

Next, contents of image processing actions (a stereoscopic image processing method) of the stereoscopic image display device 14 will be described by referring to the flowchart shown in FIG. 69.

First, a 2D image including the observer in front of the stereoscopic image display device 14 is captured by using the imaging module 280, and the observing position calculation module 490 that has acquired the captured image data (FIG. 69: step S501) detects the face image region of the observer and the image region of the backrest part of the seat from the captured image data (FIG. 69: step S502).

Then, the observing position calculation module 490 calculates the inclined angle of the seat back face part from the image region information of the backrest part of the seat detected in step S502 (FIG. 69: step S503).

The processing contents from step S504 to step S509 are the same as the processing contents from step S204 to step S209 of the second exemplary embodiment described above.

Through calculating the inclined angle $\theta_S$ of the seat back face parnd calculating the observing position $P_{OD}$ showing the relative position of the observer with respect to the stereoscopic image display device from the captured image data by the processing of the flowchart described above, the influences of CT-images and pseudoscopic views generated by 3D crosstalk and the influences of 3D moiré can be lightened only by the use of an inexpensive measuring device without providing the movable object state detecting module such as a tilt sensor. This makes it possible to provide the stereoscopic image display device which does not give a sense of discomfort to the observer.

Further, in the fourth exemplary embodiment, the number of viewpoints is not limited to two viewpoints. It is also possible to be applied to the stereoscopic display panel module 120 which projects multiple-viewpoint images.

(Effects of Fourth Exemplary Embodiment)

The fourth exemplary embodiment employs the structure in which the inclined angle $\theta_S$ of the seat back face part (seat state) is calculated from the captured image data picked up by the imaging module. Thus, it is possible to perform the stereoscopic image display setting adjusting processing in accordance with the observing position $P_{OD}$ calculated without using the movable object state detecting module such as a posture sensor. This makes it possible to effectively lighten the influences of the CT-images and pseudoscopic views caused by 3D crosstalk and the influences of 3D moiré by an inexpensive structure, so that it is possible to display stereoscopic images which do not give a sense of discomfort to the observer. Other structures and actions are the same as those described in the first to the third exemplary embodiments, and other operational effects generated thereby are also the same.

Each of the above-described embodiments are preferable specific examples of the stereoscopic image display device, the stereoscopic image display method, and the program thereof, and various kinds of technically preferable limits may be set thereto. However, the technical scope of the present invention is not limited to those modes unless there is a specific statement made to limit the present invention.

While a part of or a whole part of the above-described embodiments can be summarized as following Supplementary Notes, the present invention is not limited only to the following structures.

(Supplementary Note 1: First Exemplary Embodiment)

A stereoscopic image display device (11) placed at a movable object, which includes:

a movable object state detecting module (110) which detects a state of the movable object;

a stereoscopic image display panel module (120) which divides a spatial region for projecting a stereoscopic image and projects images of different parallaxes to each of the divided spatial regions to project the images of different parallaxes to the left and right eyes of an observer;

an observing distance calculation module (140) which calculates an observing distance between the stereoscopic display panel module (120) and the observer from the state information of the movable object detected by the movable object state detecting module (110);

a device characteristic data saving module (160) which saves device characteristic data containing the display characteristic of the stereoscopic display panel module (120) corresponding to the observing distance; and a display setting adjusting module (170) which adjusts display setting of the stereoscopic image by referring to the observing distance and the device characteristic data.

(Supplementary Note 2: Second Exemplary Embodiment)

A stereoscopic image display device (12) placed at a movable object, which includes:

a movable object state detecting module (110) which detects a state of the movable object;

a stereoscopic image display panel module (120) which divides a spatial region for projecting a stereoscopic image and projects images of different parallaxes to each of the divided spatial regions to project the images of different parallaxes to the left and right eyes of an observer;

an imaging module (280) which captures an image of the observer and images the captured image;

an observing position calculation module (290) which calculates an observing position showing a relative position of the observer with respect to the stereoscopic display panel module (120) from the state information of the movable object detected by the movable object state detecting module (110) and the captured image picked up by the imaging module (280);

a device characteristic data saving module (160) which saves device characteristic data containing the display characteristic of the stereoscopic display panel module (120) corresponding to the observing position; and a display setting adjusting module (270) which adjusts display setting of the stereoscopic image by referring to the observing position and the device characteristic data.

(Supplementary Note 3: Third Exemplary Embodiment)

A stereoscopic image display device (13) placed at a reclining-type backrest part of a seat as a movable object, which includes:

a movable object state detecting module (110) which detects a state of the movable object;

a stereoscopic image display panel module (120) which divides a spatial region for projecting a stereoscopic image and projects images of different parallaxes to each of the divided spatial regions to project the images of different parallaxes to the left and right eyes of an observer;

an imaging module (280) which captures an image of the observer and images the captured image;

the movable object is the seat, the backrest part of the seat is reclinable, and an observer state detecting module (310) which detects a sitting state of the observer with respect to the seat on which the observer is sitting;

an observer data saving module (350) which saves observer data that shows size information of the observer;

an observing position calculation module (390) which calculates an observing position showing a relative position of the observer with respect to the stereoscopic display panel module (120);

a device characteristic data saving module (160) which saves device characteristic data containing the display characteristic of the stereoscopic display panel module (120) corresponding to the observing position; and a display setting adjusting module (270) which adjusts display setting of the stereoscopic image by referring to the observing position and the device characteristic data, wherein:

the observing position calculation module (390) detects a proportion of a face image region of the observer with respect to an image region of the backrest part of the seat where the observer is sitting from the captured image picked up by the imaging module (280);

in a state where the observer is in a closely fitted state with the backrest part of the seat where the observer is sitting, the observing position calculation module (390) calculates the observing position from the state information of the seat detected by the movable object state detecting module (110) and the proportion of the face image region; and in a state where the observer is in a state of being isolated from the backrest part of the seat, the observing position calculation module (390) calculates the observing position from the observer data and the proportion of the face image region.

(Supplementary Note 4: Fourth Exemplary Embodiment)

A stereoscopic image display device (14) placed at a movable object, which includes:

a stereoscopic image display panel module (120) which divides a spatial region for projecting a stereoscopic image and projects images of different parallaxes to each of the divided spatial regions to project the images of different parallaxes to the left and right eyes of an observer;

an imaging module (280) which captures an image of the observer and images the captured image;

an observing position calculation module (490) which detects a state of the movable object from the captured image picked up by the imaging module, and calculates an observing position showing a relative position of the observer with respect to the stereoscopic display panel module by using the state information of the movable object and the captured image;

a device characteristic data saving module (160) which saves device characteristic data containing the display characteristic of the stereoscopic display panel module (120) corresponding to the observing position; and a display setting adjusting module (270) which adjusts display setting of the stereoscopic image by referring to the observing position and the device characteristic data.

(Supplementary Note 5)

A stereoscopic image display device which displays a stereoscopic image by being placed on a movable object, which includes:

a stereoscopic display panel module (120) which projects images of different parallaxes for each of neighboring spatial regions;

a movable object state detecting module (110) which detects state information regarding a position state of the movable object;

a relative distance calculation module (140) which calculates a relative distance between the stereoscopic display panel module and a specific observer located on a display surface side thereof based on the state information;

a device characteristic data saving module (160) which saves device characteristic data regarding the stereoscopic display panel module (120); and a display setting adjusting module (170) which adjusts display setting of the stereoscopic image by referring to the relative distance and the device characteristic data.

(Supplementary Note 6)

The stereoscopic image display device as depicted in Supplementary Note 5, wherein:

the movable object is a seat for the observer, and a backrest part of the seat is reclinable; and the movable object state detecting module (110) is placed at the backrest part of the seat, and detects information regarding an inclined state of the backrest part as the state information.

(Supplementary Note 7)

The stereoscopic image display device as depicted in Supplementary Note 5, wherein:

the movable object is a seat for the observer, and a backrest part of the seat is reclinable; and the movable object state detecting module (110) detects the state information based on inclining information of the backrest part of the seat where the observer sits on and the backrest part of a front seat thereof.

(Supplementary Note 8)

The stereoscopic image display device as depicted in Supplementary Note 5, wherein:

the movable object is a seat for the observer, and a backrest part of the seat is reclinable; and the movable object state detecting module (110) detects the state information based on an output value of a first tilt sensor placed at the backrest part of the seat and an output value of a second tilt sensor placed at a sitting part of the seat.

(Supplementary Note 9)

The stereoscopic image display device as depicted in any one of Supplementary Notes 5 to 8, wherein the relative distance calculation module (140) carries placement positional information between two seats placed in front and in rear, and calculates the relative distance by using the placement positional information and the state information.

(Supplementary Note 10)

The stereoscopic image display device as depicted in any one of Supplementary Notes 5 to 9, wherein the stereoscopic display panel module includes:

a display panel in which a plurality of pixels each including at least a first sub-pixel for displaying a first-viewpoint image and a second sub-pixel for displaying a second-viewpoint image are disposed in matrix; and a light-ray separation module which distributes light rays emitted from each of the sub-pixels to different directions from each other.

(Supplementary Note 11)

The stereoscopic image display device as depicted in Supplementary Note 10, wherein:

the light-ray separation module is formed with an active element that is capable of changing a light-ray separating direction; and the display setting adjusting module (170) adjusts a stereopsis region range by controlling distribution of a refractive index of the light-ray separating module in accordance with the relative distance.

(Supplementary Note 12)

The stereoscopic image display device as depicted in any one of Supplementary Notes 5 to 11, wherein the display setting adjusting module (170) changes a parallax value or a luminance value of the stereoscopic image in accordance with the relative distance.

(Supplementary Note 13)

A stereoscopic image display device which displays a stereoscopic image by being placed on a movable object, which includes:

a stereoscopic display panel module (120) which projects images of different parallaxes for each of neighboring spatial regions;

an imaging module (280) which captures an image of a front side of a display surface of the stereoscopic display module (120) along with an observer and records the image as captured image data;

a relative position calculation module (observing position calculation module: 290, 390, 490) which calculates a relative position of the observer with respect to the stereoscopic display panel module (120) by using the captured image data;

a device characteristic data saving module (160) which saves device characteristic data regarding the stereoscopic display panel module (120); and a display setting adjusting module (270) which adjusts display setting of the stereoscopic image by referring to the relative position and the device characteristic data.

(Supplementary Note 14)

The stereoscopic image display device as depicted in Supplementary Note 13, which further includes a movable object state detecting module (110) which detects state information regarding a position state of the movable object, wherein the relative position calculation module (290, 390) uses the captured image data and the state information when calculating the relative position.

(Supplementary Note 15)

The stereoscopic image display device as depicted in Supplementary Note 14, wherein:

the movable object is a seat for the observer, and a backrest part of the seat is reclinable; and the movable object state detecting module (110) is placed at the backrest part of the seat, and detects information regarding an inclined state of the backrest part as the state information.

(Supplementary Note 16)

The stereoscopic image display device as depicted in Supplementary Note 15, wherein the relative position calculation module (290, 390) detects a proportion of a face image region of the observer with respect to an image region of the backrest part of the seat where the observer is sitting from the captured image data, and calculates the relative position by using information regarding the proportion and the state information.

(Supplementary Note 17)

The stereoscopic image display device as depicted in Supplementary Note 16, which includes:

an observer state detecting module (310) which detects observer state information regarding a sitting state of the observer; and an observer data saving processing module (350) which detects and saves observer data showing size information of the observer by using the observer state information and the captured image data, wherein:

the relative position calculation module (390) includes a detection module (390A) which detects the face image region of the observer from the captured image data and a judging module (390B) which judges whether or not the observer is in a state of being closely fitted with the backrest part based on the observer state information; and the relative position calculation module calculates the relative position by using the state information and the face image region when judged by the judging module (390B) to be in a closely fitted state, and calculates the relative position by using the observer data and the face image region when judged that the observer is sitting away from the backrest part.

(Supplementary Note 18)

The stereoscopic image display device as depicted in Supplementary Note 17, wherein the observer data saving processing module (350) uses the captured image data that is acquired when the observer is in a closely fitted state with the backrest part, when detecting the observer data.

(Supplementary Note 19)

The stereoscopic image display device as depicted in Supplementary Note 13, wherein the relative position calculation module (490) detects state information regarding a positional state of the movable object by using the captured image data, and calculates the relative position based thereupon.

(Supplementary Note 20)

The stereoscopic image display device as depicted in Supplementary Note 13, wherein:

the movable object is a seat for the observer, and a backrest part of the seat is reclinable; and the relative position calculation module (490) detects a proportion of a face image region of the observer with respect to an image region of the backrest part of the seat where the observer is sitting from the captured image data, and calculates the relative position by using information regarding the proportion.

(Supplementary Note 21)

The stereoscopic image display device as depicted in any one of Supplementary Notes 13 to 20, wherein the stereoscopic display panel module includes:

a display panel in which a plurality of pixels each including at least a first sub-pixel for displaying a first-viewpoint image and a second sub-pixel for displaying a second-viewpoint image are disposed in matrix; and a light-ray separation module which distributes light rays emitted from each of the sub-pixels to different directions from each other.

(Supplementary Note 22)

The stereoscopic image display device as depicted in Supplementary Note 21, wherein:

the light-ray separation module is formed with an active element that is capable of changing a light-ray separating direction; and the display setting adjusting module (270) adjusts a stereopsis region range by controlling distribution of a refractive index of the light-ray separating module in accordance with the relative position.

(Supplementary Note 23)

The stereoscopic image display device as depicted in any one of Supplementary Notes 13 to 22, wherein the display setting adjusting module (270) changes a parallax value or a luminance value of the stereoscopic image in accordance with the relative position.

(Supplementary Note 24)

The stereoscopic image display device as depicted in any one of Supplementary Notes 5 to 12, wherein the device characteristic data is information corresponding to the relative distance.

(Supplementary Note 25)

The stereoscopic image display device as depicted in any one of Supplementary Notes 13 to 23, wherein the device characteristic data is information corresponding to the relative position.

(Supplementary Note 26)

A stereoscopic image display method used in a stereoscopic image display device which includes a stereoscopic display panel module (120) for projecting images of different parallaxes for each of neighboring spatial regions and displays a stereoscopic image by being placed on a movable object, and the method includes:

a movable object state detecting step which detects state information regarding a position state of the movable object;

a relative distance calculating step which calculates a relative distance between the stereoscopic display panel module (120) and a specific observer located on a display surface side thereof based on the state information;

a device characteristic data receiving step which receives device characteristic data regarding the stereoscopic display panel module (120);

a display setting adjusting step which adjusts display setting of the stereoscopic image by referring to the relative distance and the device characteristic data; and a stereoscopic image display step which displays the stereoscopic image by projecting the images of the different parallaxes for each of the spatial regions based on the display setting after being adjusted.

(Supplementary Note 27)

A stereoscopic image display method used in a stereoscopic image display device which includes a stereoscopic display panel module for projecting images of different parallaxes for each of neighboring spatial regions and displays a stereoscopic image by being placed on a movable object, and the method includes:

an imaging step which captures an image of a front side of a display surface of the stereoscopic display module (120) along with an observer and records the image as captured image data;

a relative position calculating step which calculates a relative position of the observer with respect to the stereoscopic display panel module (120) by using the captured image data;

a device characteristic data receiving step which receives device characteristic data regarding the stereoscopic display panel module (120);

a display setting adjusting step which adjusts display setting of the stereoscopic image by referring to the relative position and the device characteristic data; and a stereoscopic image display step which displays the stereoscopic image by projecting the images of the different parallaxes for each of the spatial regions based on the display setting after being adjusted.

(Supplementary Note 28)

The stereoscopic image display method as depicted in Supplementary Note 27, which further includes a movable object state detecting step which detects state information regarding a position state of the movable object, wherein the relative position calculating step calculates the relative position by referring to the state information along with the captured image data.

(Supplementary Note 29)

The stereoscopic image display method as depicted in Supplementary Note 27, which includes, prior to the relative position calculating step, when the movable object is a seat for the observer and a backrest part of the seat is reclinable:

a movable object state detecting step which detects state information regarding a positional state of the movable object; and an observer state detecting step which detects observer state information regarding a sitting state of the observer, wherein:

the relative position calculating step detects a face image region of the observer from the captured image data and judges whether or not the observer is in a state of being closely fitted with the backrest part based on the observer state information; and the relative position calculating step calculates the relative position by using the state information and the face image region when judged to be in a closely fitted state.

(Supplementary Note 30)

The stereoscopic image display method as depicted in Supplementary Note 27, which includes, prior to the relative position calculating step, when the movable object is a seat for the observer and a backrest part of the seat is reclinable:

a movable object state detecting step which detects state information regarding a positional state of the movable object;

an observer state detecting step which detects observer state information regarding a sitting state of the observer; and an observer data saving processing step which detects and saves observer data showing size information of the observer by using the observer state information and the captured image data, wherein the relative position calculating step detects a face image region of the observer from the captured image data, and includes a judgment calculating step which judges whether or not the observer is in a state of being closely fitted with the backrest part based on the observer state information and calculates the relative position by using the observer data and the face image region when judged that the observer is sitting away from the backrest part.

(Supplementary Note 31)

The stereoscopic image display method as depicted in Supplementary Note 27, which includes, prior to the relative position calculating step, when the movable object is a seat for the observer and a backrest part of the seat is reclinable:

a movable object state detecting step which detects state information regarding a positional state of the movable object;

an observer state detecting step which detects observer state information regarding a sitting state of the observer; and an observer data saving processing step which detects and saves observer data showing size information of the observer by using the observer state information and the captured image data, wherein:

the relative position calculating step detects a face image region of the observer from the captured image data and judges whether or not the observer is in a state of being closely fitted with the backrest part based on the observer state information; and the relative position calculating step calculates the relative position by using the state information and the face image region when judged to be in a closely fitted state, and calculates the relative position by using the observer data and the face image region when judged that the observer is sitting away from the backrest part.

(Supplementary Note 32)

The stereoscopic image display method as depicted in Supplementary Note 27, wherein the relative position calculating step detects state information regarding a positional state of the movable object based on the captured image data, and calculates the relative position based thereupon.

(Supplementary Note 33)

The stereoscopic image display method as depicted in Supplementary Note 27, wherein the relative position calculating step detects a proportion of a face image region of the observer with respect to an image region of the backrest part of the seat where the observer is sitting from the captured image data, and calculates the relative position by using information regarding the proportion.

(Supplementary Note 34)

A stereoscopic image display program applied to a stereoscopic image display device which includes a stereoscopic display panel module (120) for projecting images of different parallaxes for each of neighboring spatial regions and displays a stereoscopic image by being placed on a movable object, and the program causes a computer provided in advance within the stereoscopic image display device to execute:

a movable object state detecting function which detects state information regarding a position state of the movable object;

a relative distance calculating function which calculates a relative distance between the stereoscopic display panel module (120) and a specific observer located on a display surface side thereof based on the state information;

a device characteristic data receiving function which receives device characteristic data regarding the stereoscopic display panel module (120);

a display setting adjusting function which adjusts display setting of the stereoscopic image by referring to the relative distance and the device characteristic data; and a stereoscopic image display function which displays the stereoscopic image by projecting the images of the different parallaxes for each of the spatial regions based on the display setting after being adjusted.

(Supplementary Note 35)

A stereoscopic image display program applied to a stereoscopic image display device which includes a stereoscopic display panel module (120) for projecting images of different parallaxes for each of neighboring spatial regions and displays a stereoscopic image by being placed on a movable object, and the program causes a computer provided in advance within the stereoscopic image display device to execute:

an imaging function which captures an image of a front side of a display surface of the stereoscopic display module (120) along with an observer and records the image as captured image data;

a relative position calculating function which calculates a relative position of the observer with respect to the stereoscopic display panel module (120) by using the captured image data;

a device characteristic data receiving function which receives device characteristic data regarding the stereoscopic display panel module (120);

a display setting adjusting function which adjusts display setting of the stereoscopic image by referring to the relative position and the device characteristic data; and a stereoscopic image display function which displays the stereoscopic image by projecting the images of the different parallaxes for each of the spatial regions based on the display setting after being adjusted.

(Supplementary Note 36)

The stereoscopic image display program as depicted in Supplementary Note 35, which, when the movable object is a seat for the observer and a backrest part of the seat is reclinable, causes the computer to execute:

a movable object state detecting function which detects state information regarding a positional state of the movable object;

an observer state detecting function which detects observer state information regarding a sitting state of the observer;

a face image region detecting function which detects a face image region of the observer from the captured image data; and a fitting state judging function which judges whether or not the observer is in a closely fitted state with the backrest part based on the observer state information, wherein:

the fitting state judging function includes a fitting state dependence calculating function which calculates the relative position by using the state information and the face image region when judged to be in a closely fitted state, and calculates the relative position by using the observer data and the face image region when judged that the observer is sitting away from the backrest part.

INDUSTRIAL APPLICABILITY

The present invention can be applied to a stereoscopic image processing system and a stereoscopic image display system having a function of displaying stereoscopic image contents to a stereoscopic image display device. Further, the present invention is not limited only to the contents of each of the above-described exemplary embodiments, and various changes and modifications can be applied as appropriate without departing from the scope of the appended claims.

What is claimed is:

1. A stereoscopic image display device which displays a stereoscopic image by being placed on a movable object, comprising:

a stereoscopic display panel module which projects images of different parallaxes for each of neighboring spatial regions;

a movable object state detecting module which detects state information regarding a position state of the movable object;

a relative distance calculation module which calculates a relative distance between the stereoscopic display panel module and an observer facing the screen of the stereoscopic display panel module based on the state information;

a device characteristic data saving module which saves device characteristic data, which comprises information corresponding to the relative distance, regarding the stereoscopic display panel module; and a display setting adjusting module which changes a parallax value or a luminance value of the stereoscopic image displayed on the stereoscopic display panel module in accordance with the relative distance by referring to the relative distance and the device characteristic data, wherein:

the movable object is a seat, and a backrest part of the seat is reclinable;

the movable object state detecting module is placed at the backrest part of the seat, and detects information regarding an inclined state of the backrest part as the state information;

the relative distance calculation module carries placement positional information between two seats placed in front and in rear, and calculates the relative distance by using the placement positional information and the state information;

the stereoscopic display panel module is placed on the backrest part of the seat via a joint member;

the placement position information includes: a joint member attached length $L_{sp}$ showing a length from a fulcrum position of a movable part of the backrest part to an attached position of a seat back face part and the joint member; and a backrest width $Z_{sp}$ showing a distance from a position of a display surface of the stereoscopic display panel module to a position of a front face of the backrest part of the seat on which the stereoscopic display panel module is placed, in a direction perpendicular to the display surface of the stereoscopic display panel module;

the state information includes: an inclined angle $\theta_{SO}$ of the seat of the observer from the perpendicular direction; and an inclined angle $\theta_{SP}$ of a front seat of the observer from the perpendicular direction; and when a placing space between the seat of the observer and the seat in front thereof is defined as $Z_{SS}$, the relative distance calculation module calculates an observing distance $Z_{OD}$ by the following expression $Z_{OD}=Z_{SS}-Z_{SP}+L_{SP}(\sin\theta_{SO}-\sin\theta_{SP})$, and calculates the relative distance based on the observing distance $Z_{OD}$.

2. The stereoscopic image display device as claimed in claim 1, wherein:

the movable object state detecting module detects the state information based on an output value of a first tilt sensor placed at the backrest part of the seat and an output value of a second tilt sensor placed at a sitting part of the seat.

3. The stereoscopic image display device as claimed in claim 1, wherein the stereoscopic display panel module comprises:

a display panel in which a plurality of pixels each comprising at least a first sub-pixel for displaying a first-viewpoint image and a second sub-pixel for displaying a second-viewpoint image are disposed in matrix; and a light-ray separation module which distributes light rays emitted from each of the sub-pixels to different directions from each other.

4. A stereoscopic image display device which displays a stereoscopic image by being placed on a movable object, comprising:
   a stereoscopic display panel module which projects images of different parallaxes for each of neighboring spatial regions;
   a movable object state detecting module which detects state information regarding a position state of the movable object;
   a relative distance calculation module which calculates a relative distance between the stereoscopic display panel module and an observer facing a screen of the stereoscopic display panel module based on the state information;
   a device characteristic data saving module which saves device characteristic data, which comprises information corresponding to the relative distance, regarding the stereoscopic display panel module; and
   a display setting adjusting module which changes a parallax value or a luminance value of the stereoscopic image displayed on the stereoscopic display panel module in accordance with the relative distance by referring to the relative distance and the device characteristic data, wherein:
   the stereoscopic display panel module comprises:
   a display panel in which a plurality of pixels each comprising at least a first sub-pixel for displaying a first-viewpoint image and a second sub-pixel for displaying a second-viewpoint image are disposed in matrix; and
   a light-ray separation module which distributes light rays emitted from each of the sub-pixels to different directions from each other, wherein
   the light-ray separation module is formed with an active element that is capable of changing a light-ray separating direction; and
   the display setting adjusting module adjusts a stereopsis region range by controlling distribution of a refractive index of the light-ray separating module in accordance with the relative distance.

5. A stereoscopic image display device which displays a stereoscopic image by being placed on a movable object, comprising:
   a stereoscopic display panel module which projects images of different parallaxes for each of neighboring spatial regions;
   a movable object state detecting module which detects state information regarding a position state of the movable object;
   an imaging module which captures an image of an observer in front of a display surface of the stereoscopic display panel module and records the image as captured image data;
   a relative position calculation module which calculates a relative position of the observer with respect to the stereoscopic display panel module by using the captured image data and the state information;
   a device characteristic data saving module which saves device characteristic data, which comprises information corresponding to a relative distance, regarding the stereoscopic display panel module; and
   a display setting adjusting module which changes a parallax value or a luminance value of the stereoscopic image displayed on the display panel module in accordance with the relative distance by referring to the relative position and the device characteristic data, wherein;
   the movable object is a seat, and a backrest part of the seat is reclinable;
   the movable object state detecting module is placed on the backrest part of the seat, and detects information regarding an inclined state of the backrest part as the state information;
   the relative position calculation module detects a proportion of a face image region of the observer with respect to an image region of the backrest part of the seat where the observer is sitting from the captured image data, and calculates the relative position by using information regarding the proportion and the state information;
   the stereoscopic display panel module is placed on the backrest part of the seat via a joint member;
   the state information includes: an inclined angle $\theta_{SO}$ of the seat of the observer from the perpendicular direction; and an inclined angle $\theta_{SP}$ of a front seat of the observer from the perpendicular direction; and
   the relative distance calculation module calculates the length $L_{SE}$ of the backrest part of the seat corresponding to a height of both eyes of the observer based on the information regarding the proportion; and
   when a length from a fulcrum position of a movable part of the backrest part to an attached position of the seat back face part and the joint member is defined as $L_{SP}$, a distance from a position of a display surface of the stereoscopic display panel module to a position of a front face of the backrest part of the seat on which the stereoscopic display panel module is place in a direction perpendicular to the display surface of the stereoscopic display panel module, is defined as $Z_{SP}$, and a placing space between the seat of the observer and the seat in front thereof is defined as $Z_{SS}$, the relative distance calculation module calculates the observing distance $Z_{OD}$ by the following expression $Z_{OD}=Z_{SS}-Z_{SP}+L_{SE}\sin\theta_{SO}-L_{SP}\sin\theta_{SP}$, and calculates the relative distance based on the observing distance $Z_{OD}$.

6. A stereoscopic image display device which displays a stereoscopic image by being placed on a movable object, comprising;
   a stereoscopic display panel module which projects images of different parallaxes for each of neighboring spatial regions,
   an imaging module which captures an image of an observer in front of display surface of the stereoscopic display panel module and records the image as captured image data,
   a relative position calculation module which calculates a relative position of the observer with respect to the stereoscopic display panel module by using the capture image data and state information,
   a device characteristic data saving module which saves device characteristic data, which comprises information corresponding to the relating distance, regarding the stereoscopic display panel module,
   a display setting adjusting module which changes a parallax value or a luminance value of the stereoscopic image displayed on the display panel module in accordance with the relative distance by referring to the relative position and the device characteristic data, and
   a movable object state detecting module which detects state information regarding a position state of the movable object, wherein the relative position calculation module uses the captured image data and the state information when calculating the relative position, the movable object is a seat, and a backrest part of the seat is reclinable, the movable object state detecting module is placed on the backrest part of the seat, and detects information regarding an inclined state of the backrest part as the state information, the relative position calculation module detects a proportion of a face image region of the observer with respect to an image region of the backrest part of the seat where the observer is sitting from the captured image data, and calculates the relative position by using information regarding the proportion and the state information, the stereoscopic image display device further comprising;

an observer state detecting module which detects observer state information regarding a sitting state of the observer; and an observer data saving processing module which detects and saves observer data showing size information of the observer by using the observer state information and the captured image data, wherein:

the relative position calculation module comprises a detection module which detects the face image region of the observer from the captured image data and a judging module which judges whether or not the observer is in contact with the backrest part based on the observer state information; and the relative position calculation module calculates the relative position by using the state information and the face image region when judged by the judging module that the observer is in contact with the backrest part, and calculates the relative positon by using the observer data and the face image region when judged that the observer is not in contact with the backrest part.

7. The stereoscopic image display device as claimed in claim 6, wherein the observer data saving processing module uses the captured image data that is acquired when the observer is in contact with the backrest part, when detecting the observer data.

8. A stereoscopic image display device which displays a stereoscopic image by being placed on a movable object, comprising;

a stereoscopic display panel module which projects image of different parallaxes for each of neighboring spatial regions, an imaging module which captures an image of an observer in front of a display surface of the stereoscopic display panel module and records the image as capture image data, a relative position calculation module which calculates a relative position of the observer with respect to the stereoscopic display panel module by using the captured image data and the state information, a device characteristic data saving module which saves device characteristic data, which comprises information corresponding to the relative distance, regarding the stereoscopic display panel module, and a display setting adjusting module which changes a parallax value or a luminance value of the stereoscopic image displayed on the display panel module in accordance with the relative distance by referring to the relative position and the device characteristic data, wherein the movable object is a seat and a backrest part of the seat is reclinable, the relative position calculation module detects state information regarding a positional state of the movable object by using the captured image data, detects a proportion of a face image region of the observer with respect to an image region of the backrest part of the seat where the observer is sitting from the captured image data, and calculates the relative position by using information regarding the proportion and the state information, the stereoscopic display panel module is placed at the backrest part of the seat via a joint member, the state information includes: an inclined angle $\theta_{SO}$ of the seat of the observer from the perpendicular direction; and an inclined angle $\theta_{SP}$ of a front seat of the observer from the perpendicular direction, and the relative distance calculation module calculates the length $L_{SP}$ of the backrest part of the seat corresponding to a height of both eyes of the observer based on the information regarding the proportion, and when a length from a fulcrum position of a movable part of the backrest part to an attached position of the seat back face part and the joint member is defined as $L_{SP}$, a distance from a position of the display surface of the stereoscopic display panel module to a position of a front face of the backrest of the seat on which the stereoscopic display panel module is placed, in a direction perpendicular to the display surface of the stereoscopic display panel module, is defined as $Z_{SP}$, and a placing space between the seat of the observer and the seat in front thereof is defined as $Z_{SS}$, the relative distance calculation module calculates the observing distance $Z_{OD}$ by the following expression $Z_{OD}=Z_{SS}-Z_{SP}+L_{SE}\sin\theta_{SO}-L_{SP}\sin\theta_{SP}$, and calculates the relative distance based on the observing distance $Z_{OD}$.

9. The stereoscopic image display device as claimed in claim 5, wherein the stereoscopic display panel module comprises:

a display panel in which a plurality of pixels each comprising at least a first sub-pixel for displaying a first-viewpoint image and a second sub-pixel for displaying a second-viewpoint image are disposed in matrix; and a light-ray separation module which distributes light rays emitted from each of the sub-pixels to different directions from each other.

10. A stereoscopic image display device which displays a stereoscopic image by being placed on a movable object, comprising:

a stereoscopic display panel module which projects images of different parallaxes for each of neighboring spatial regions;

an imaging module which captures an image of an observer in front of a display surface of the stereoscopic display panel module and records the image as captured image data;

a relative position calculation module which calculates a relative position of the observer with respect to the stereoscopic display panel module by using the captured image data;

a device characteristic data saving module which saves device characteristic data, which comprises information corresponding to a relative distance, regarding the stereoscopic display panel module; and a display setting adjusting module which changes a parallax value or a luminance value of the stereoscopic image displayed on the display panel module in accordance with the relative distance by referring to the relative position and the device characteristic data, wherein:

the stereoscopic display panel module comprises:

a display panel in which a plurality of pixels each comprising at least a first sub-pixel for displaying a first-viewpoint image and a second sub-pixel for displaying a second-viewpoint image are disposed in matrix; and a light-ray separation module which distributes light rays emitted from each of the sub-pixels to different directions from each other, wherein the light-ray separation module is formed with an active element that is capable of changing a light-ray separating direction; and the display setting adjusting module adjusts a stereopsis region range by controlling distribution of a refractive index of the light-ray separating module in accordance with the relative position.

11. A stereoscopic image display method applied to a stereoscopic image display device which comprises a stereoscopic display panel module for projecting images of different parallaxes for each of neighboring spatial regions and displays a stereoscopic image by being placed on a movable object, the method comprising:

a movable object state detecting step which detects state information regarding a position state of the movable object;

a relative distance calculating step which calculates a relative distance between the stereoscopic display panel module and an observer facing the screen of the stereoscopic display panel module based on the state information;

a device characteristic data receiving step which receives device characteristic data, which comprises information corresponding to the relative distance, regarding the stereoscopic display panel module;

a display setting adjusting step which changes a parallax value or a luminance value of the stereoscopic image displayed on the display panel module in accordance with the relative distance by referring to the relative distance and the device characteristic data; and a stereoscopic image display step which displays the stereoscopic image by projecting the images of the different parallaxes for each of the spatial regions based on the display setting after being adjusted, wherein:

the movable object is a seat, and a backrest part of the seat is reclinable;

the movable object state detecting step detects information regarding an inclined state of the backrest part as the state information;

the relative distance calculation step calculates the relative distance by using the state information and placement positional information between two seats placed in front and in rear;

the stereoscopic display panel module is placed on the backrest part of seat via a joint member;

the placement position information includes; a joint member attached length $L_{SP}$ showing a length from a fulcrum position of a movable part of the backrest part to an attached position of the seat back face part and the joint member; and a backrest width $Z_{SP}$ showing a distance from a position of a display surface of the stereoscopic display panel module to a position of a front face of the backrest perpendicular to the display surface of the stereoscopic display panel module is placed, in a direction perpendicular to the display surface of the stereoscopic display panel module;

the state information includes; an inclined angle $\theta_{SO}$ of the seat of the observer from the perpendicular direction; and a includes; an inclined angle $\theta_{SP}$ of a front seat of the observer from the perpendicular direction, and when a placing space between the seat of the observer and the seat in front thereof is defined as $Z_{SS}$, the relative distance calculation step calculates the observing distance $Z_{OD}$ by the following expression $Z_{OD}=Z_{SS}-Z_{SP}+L_{SP}(\sin\theta_{SO}-\sin\theta_{SP})$, and calculates the relative distance based on the observing distance $Z_{OD}$.

12. A stereoscopic image display method applied to a stereoscopic image display device which comprises a stereoscopic display panel module for projecting images of different parallaxes for each of neighboring spatial regions and displays a stereoscopic image by being placed on a movable object, the method comprising:

a movable object state detecting step which detects state information regarding a position state of the movable object;

an imaging step which captures an image of an observer in front of a display surface of the stereoscopic display panel module and records the image as captured image data;

a relative position calculating step which calculates a relative position of the observer with respect to the stereoscopic display panel module by using the captured image data and the state information;

a device characteristic data receiving step which receives device characteristic data, which comprises information corresponding to a relative distance, regarding the stereoscopic display panel module;

a display setting adjusting step which changes a parallax value or a luminance value of the stereoscopic image displayed on the display panel module in accordance with the relative distance by referring to the relative position and the device characteristic data; and a stereoscopic image display step which displays the stereoscopic image by projecting the images of the different parallaxes for each of the spatial regions based on the display setting after being adjusted, wherein;

the movable object is a seat, and a backrest part of the seat is reclinable;

the movable object state detecting step detects information regarding an inclined state of the backrest part as the state information;

the relative position calculation step detects a position of a face image region of the observer with respect to an image region of the backrest part of the seat where the observer is sitting from the captured image data, and calculates the relative position by using information regarding the proportion and the state information;

the stereoscopic display panel module is placed on the backrest part of the seat via a joint member;

the state information includes; an inclined angle $\theta_{SO}$ of the seat of the observer from the perpendicular direction; and an inclined angle $\theta_{SP}$ of front seat of the observer from the perpendicular direction; and the relative distance calculation step calculates a length $L_{SE}$ of the backrest part of the seat corresponding to a height of both eyes of the observer based on the information regarding the proportion, and when a length from a fulcrum position of a movable part of the backrest part to an attached position of the seat back face part and the joint member is defined as $L_{SP}$, a distance from a position of a display surface of the stereoscopic display panel module to a position of a front face of the backrest part of the seat on which the stereoscopic display panel module is placed, in a direction perpendicular to the display surface of the stereoscopic display panel module, is defined as $Z_{SP}$, and a placing space between the seat of the observer and the seat in front thereof is defined as $Z_{SS}$, the relative distance calculation step calculates the observing distance $Z_{OD}$ by the following expression $Z_{OD}=Z_{SS}-Z_{SP}+L_{SE} \sin \theta_{SO}-L_{SP} \sin \theta_{SP}$, and calculates the relative distance based on the observer distance $Z_{OD}$.

13. A stereoscopic image display method applied to a stereoscopic image display device which comprises a stereoscopic display panel module for projecting images of different parallaxes for each of neighboring spatial regions and displays a stereoscopic image by being placed on a movable object, the method comprising:

an imaging step which captures an image of an observer in front of display surface of the stereoscopic display panel module and records the image as captured image data:

a relative position calculation step which calculates a relative position of the observer with respect to the stereoscopic display panel module by using the captured image data;

a device characteristic data receiving step which receives device characteristic data, which comprises information corresponding to the relative distance, regarding the stereoscopic display panel module;

a display setting adjusting step which changes a parallax or a luminance value of the stereoscopic image displayed on the display panel module is accordance with the relative distance by referring to the relative position and the device characteristic data; and a stereoscopic image display step which displays the stereoscopic image by projecting the images of the different parallaxes for each of the spatial regions on the display setting after being adjusted, the method further comprising, prior to the relative position calculating step, when the movable object is a seat and a backrest part of the seat is reclinable:

a movable object state detecting step which detects state information regarding a positional state of the movable object;

an observer state detecting step which detects observer state information regarding a sitting state of the observer; and an observer data saving processing step which detects and saves observer data showing size information of the observer by using the observer state information and the captured image data, wherein:

the relative position calculating step detects a face image region of the observer from the captured image data and judges whether or not the observer is in contact with the backrest part based on the observer state information; and the relative position calculating step calculates the relative position by using the state information and the face image region when the observer is judged to be in contact with the backrest part, and calculates the relative position by using the observer data and the face image region when judged that the observer is not in contact with the backrest part.

14. A stereoscopic image display method applied to a stereoscopic image display device which comprises a stereoscopic display panel module for projecting images of different parallaxes for each of neighbor spatial regions and displays a stereoscopic image by being placed on a movable object, the method comprising:

an imaging step which captures an image of an observer in front of a display surface of the stereoscopic display panel module and records the image as captured image data;

a relative position calculation step which calculates a relative position of the observer with respect to the stereoscopic display panel module by using the captured image data;

a device characteristic data receiving step which receives device characteristic data, which comprises information corresponding to the relative distance, regarding the stereoscopic display panel module;

a display setting adjusting step which changes a parallax value or a luminance value of the stereoscopic image displayed on the display panel module in accordance with the relative distance by referring to the relative position and the device characteristic data; and a stereoscopic image display step which displays the stereoscopic image by projecting the images of the different parallaxes for each of the spatial regions based on the display setting after being adjusted, wherein the movable object is a seat, and a backrest part of the seat is reclinable, the relative position calculating step detects information regarding an inclined state of the backrest part as the state information based on the captured image data, detects a proportion of a face image region of the observer with respect to an image region of the backrest part of the seat where the observer is sitting, and calculates the relative position by using information regarding the proportion and the state information, the stereoscopic display panel module is placed on the backrest part of the seat via a joint member;

the state information includes; and inclined angle $\theta_{SO}$ of the seat of the observer from the perpendicular direction; and an inclined angle $\theta_{SP}$ of front seat of the observer from the perpendicular direction, and the relative distance calculation step calculates a length $L_{SE}$ of the backrest part of the seat corresponding to a height of both eyes of the observer based on the information regarding the proportion, and when a length from a fulcrum position of a movable part of the backrest part to an attached position of the seat back face part and the joint member is defined as $L_{SP}$, a distance from apposition of a display surface of the stereoscopic display panel module to a position of a front face of the backrest part of the seat on which the stereoscopic display panel module is placed, in a direction perpendicular to the display surface of the stereoscopic display panel module, is defined as $Z_{SP}$, and the placing space between the seat of the observer and the seat in front thereof is defined as $Z_{SS}$, the relative distance calculation step calculates the observing distance $Z_{OD}$ by the following expression $Z_{OD}=Z_{SS}-Z_{SP}+L_{SE} \sin \theta_{SO}-L_{SO}\sin \theta_{SP}$, and calculates the relative distance based on the observing distance $Z_{OD}$.

\* \* \* \* \*